March 24, 1959
J. H. BURNS ET AL
2,878,872
DATA RECORDING APPARATUS
Filed Feb. 16, 1955
23 Sheets-Sheet 1
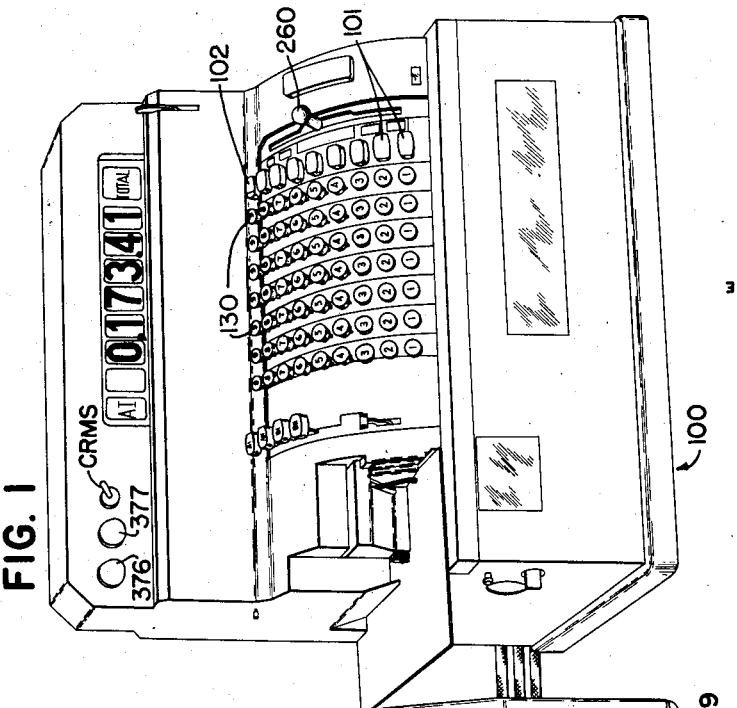
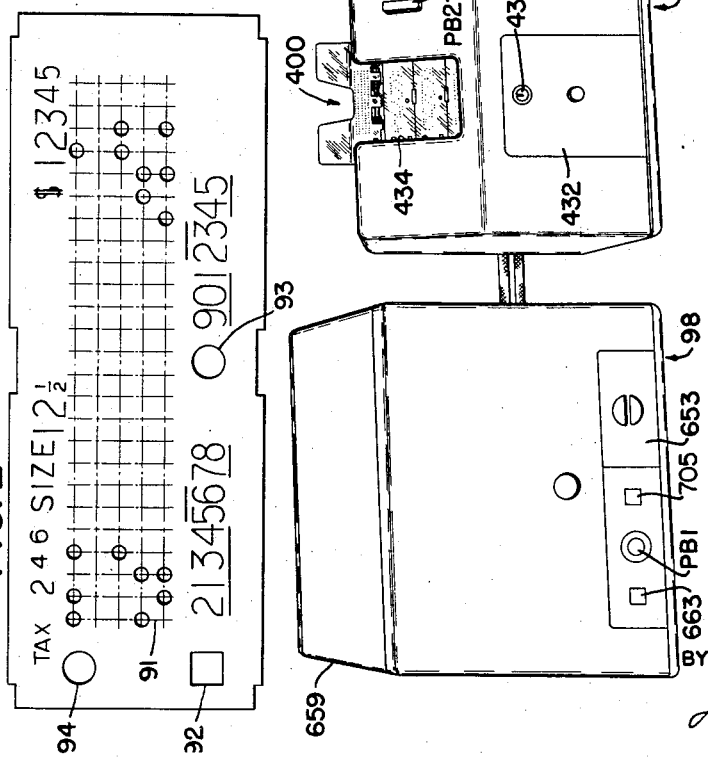
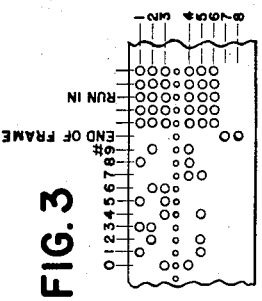
INVENTORS
JOHN H. BURNS
RICHARD L. DITMER
& DONALD L. WEEKS
BY Carl Beust
Louis A Kline
THEIR ATTORNEYS

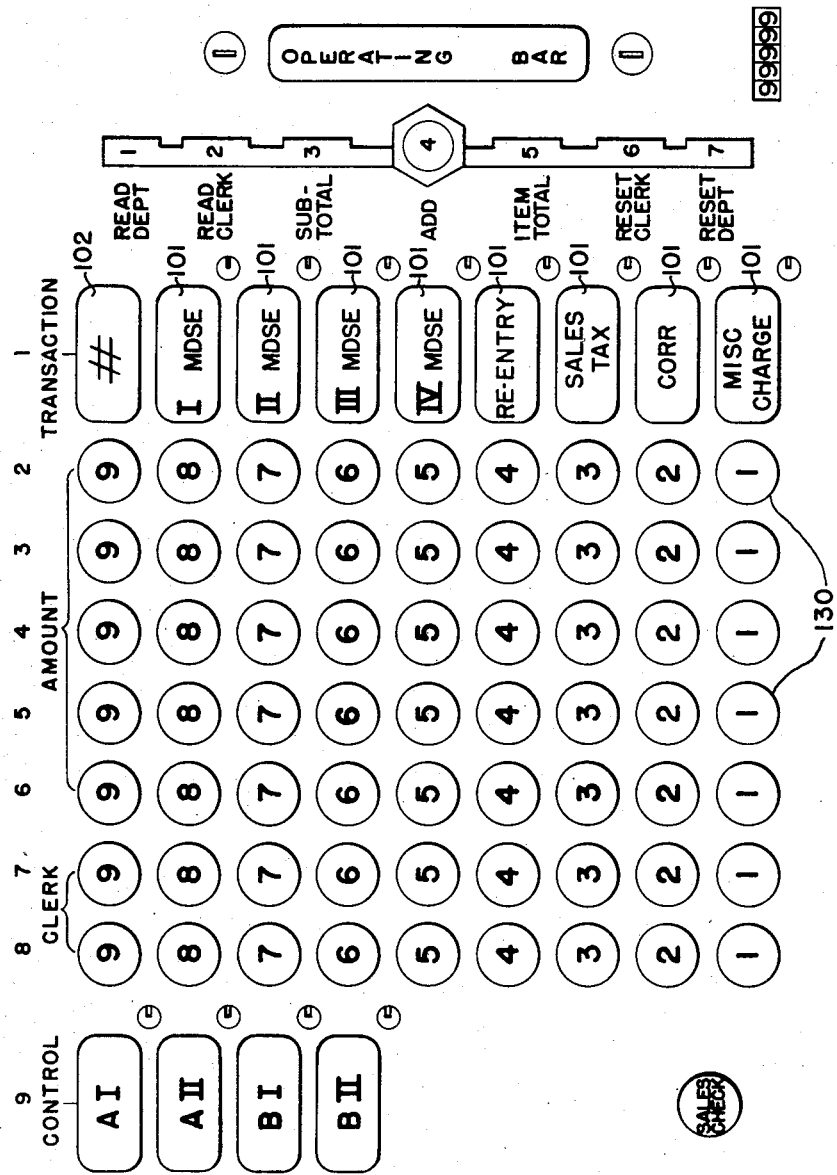

March 24, 1959 J. H. BURNS ET AL 2,878,872
DATA RECORDING APPARATUS
Filed Feb. 16, 1955 23 Sheets-Sheet 3

INVENTORS
JOHN H. BURNS
RICHARD L. DITMER
& DONALD L. WEEKS

BY Earl Benst
Louis A. Kline
THEIR ATTORNEYS

March 24, 1959   J. H. BURNS ET AL   2,878,872
DATA RECORDING APPARATUS
Filed Feb. 16, 1955   23 Sheets-Sheet 5

INVENTORS
JOHN H. BURNS
RICHARD L. DITMER
& DONALD L. WEEKS
BY *Pearl Beust*
*Louis A. Kline*
THEIR ATTORNEYS March 24, 1959 J. H. BURNS ET AL 2,878,872
DATA RECORDING APPARATUS
Filed Feb. 16, 1955 23 Sheets-Sheet 6
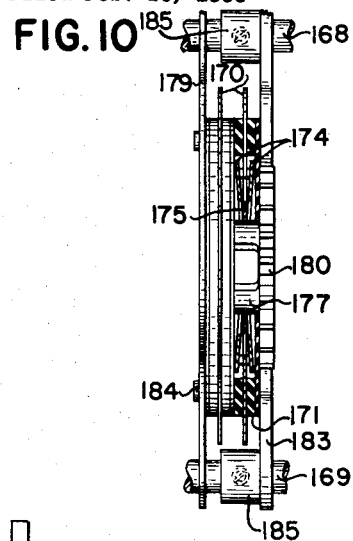
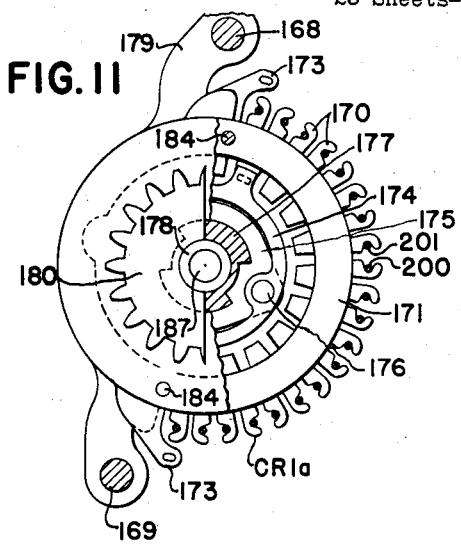
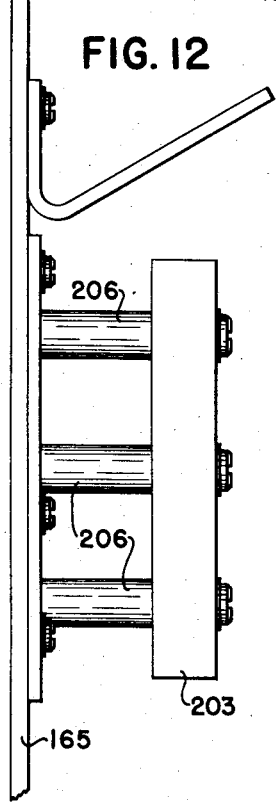
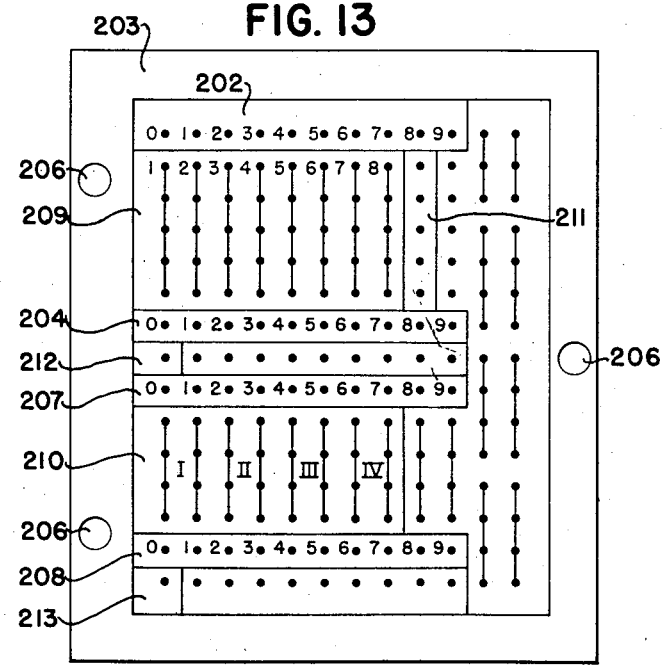
INVENTORS
JOHN H. BURNS
RICHARD L. DITMER
& DONALD L. WEEKS
BY
THEIR ATTORNEYS

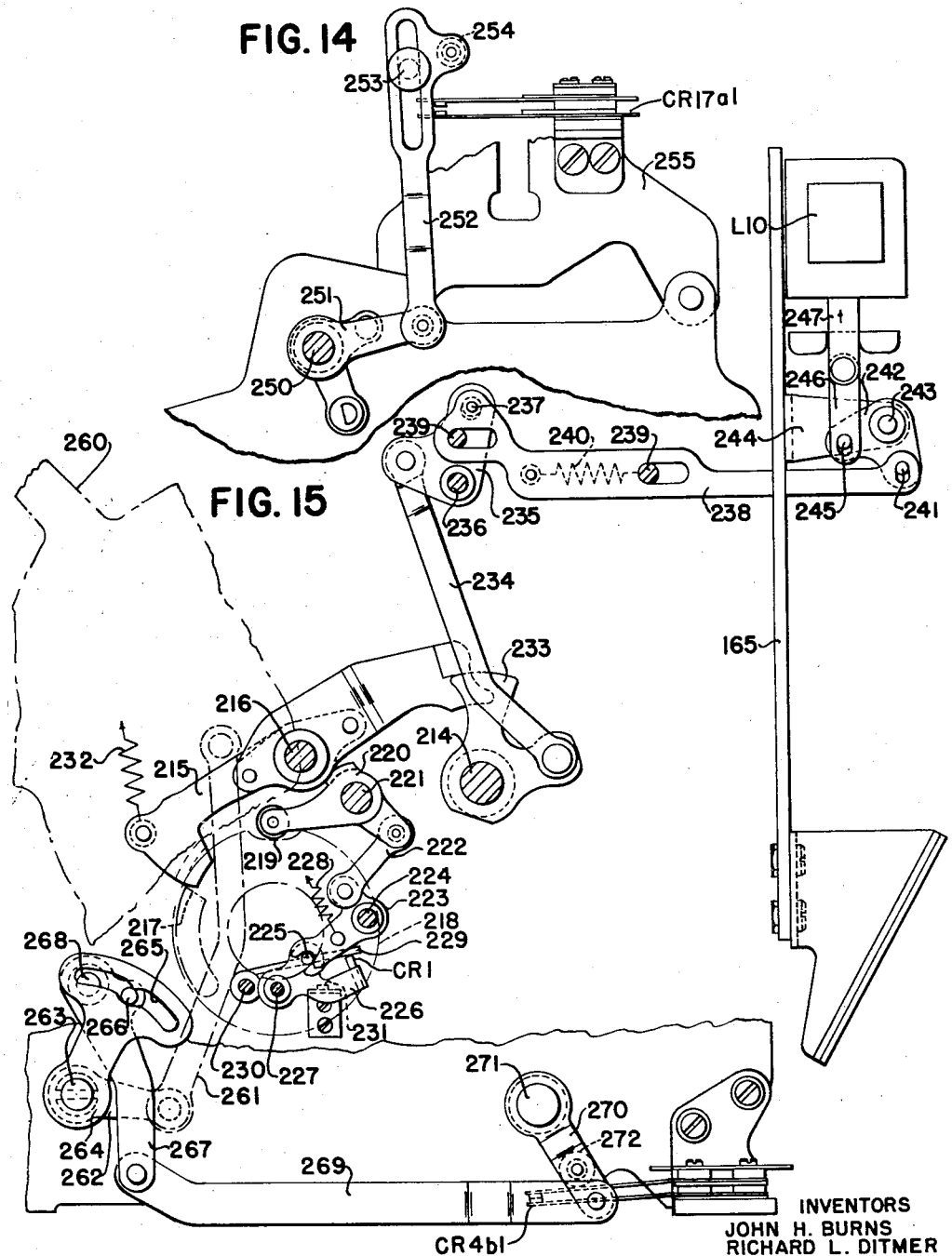

March 24, 1959     J. H. BURNS ET AL     2,878,872
DATA RECORDING APPARATUS
Filed Feb. 16, 1955     23 Sheets-Sheet 8
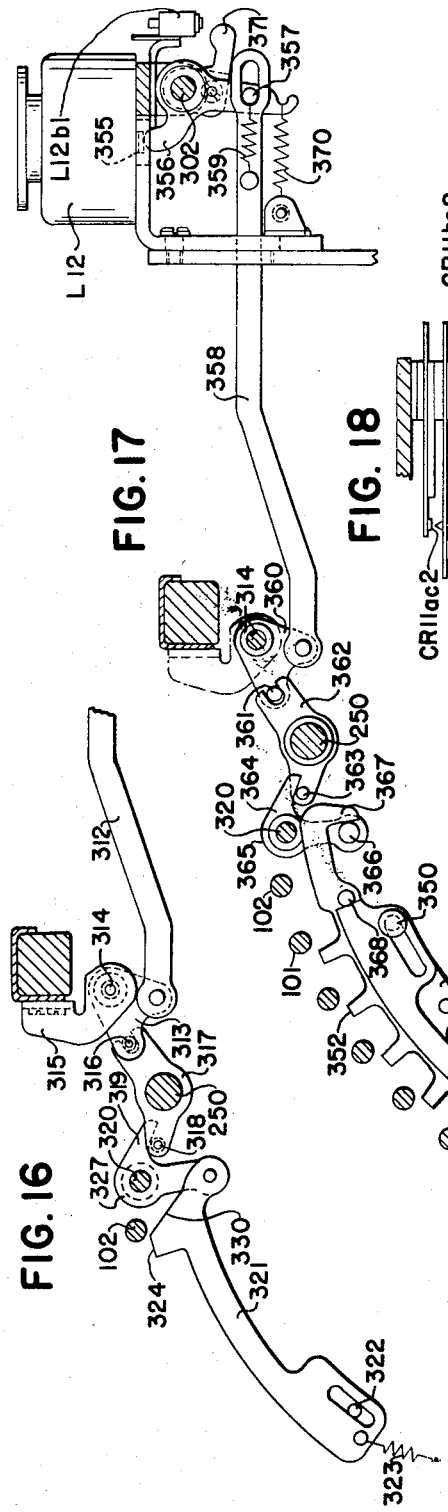
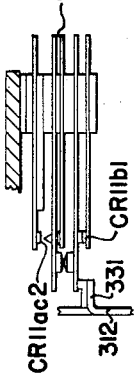
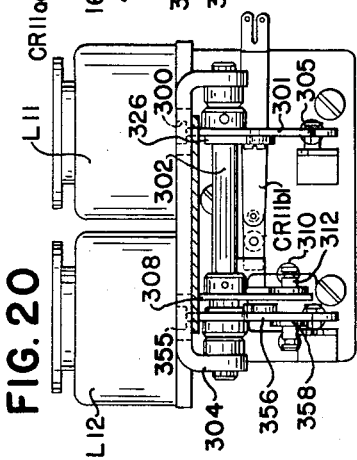
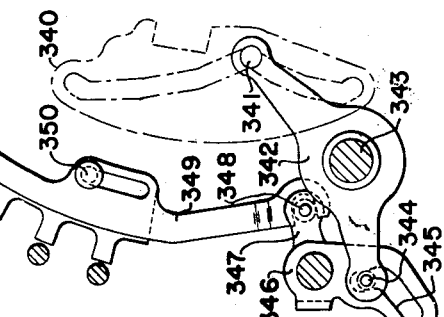
INVENTORS
JOHN H. BURNS
RICHARD L. DITMER
& DONALD L. WEEKS
BY
THEIR ATTORNEYS March 24, 1959 J. H. BURNS ET AL 2,878,872
DATA RECORDING APPARATUS
Filed Feb. 16, 1955 23 Sheets-Sheet 9

INVENTORS
JOHN H. BURNS
RICHARD L. DITMER
& DONALD L. WEEKS

BY *Karl Beust*
*Louis A. Kline*
THEIR ATTORNEYS

March 24, 1959  J. H. BURNS ET AL  2,878,872
DATA RECORDING APPARATUS
Filed Feb. 16, 1955  23 Sheets-Sheet 10

INVENTORS
JOHN H. BURNS
RICHARD L. DITMER
& DONALD L. WEEKS
BY
THEIR ATTORNEYS

March 24, 1959 J. H. BURNS ET AL 2,878,872
DATA RECORDING APPARATUS
Filed Feb. 16, 1955 23 Sheets-Sheet 11
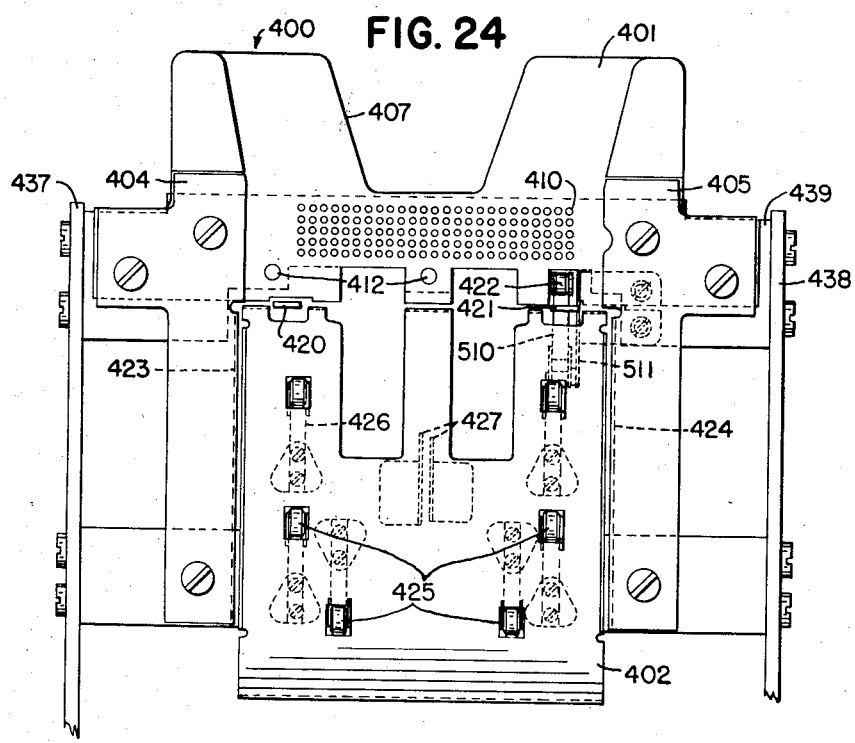
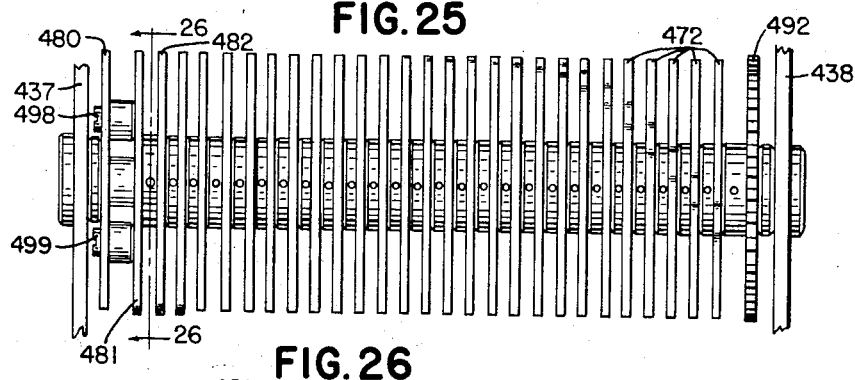
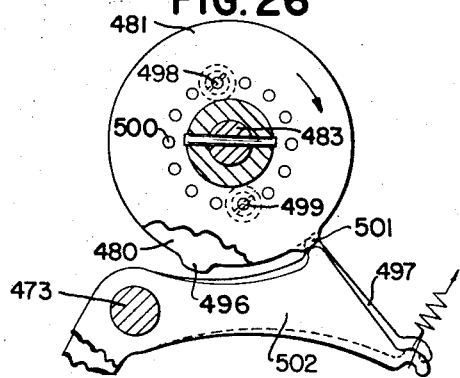
INVENTORS
JOHN H. BURNS
RICHARD L. DITMER
& DONALD L. WEEKS
BY
THEIR ATTORNEYS March 24, 1959
J. H. BURNS ET AL
2,878,872
DATA RECORDING APPARATUS
Filed Feb. 16, 1955
23 Sheets-Sheet 12
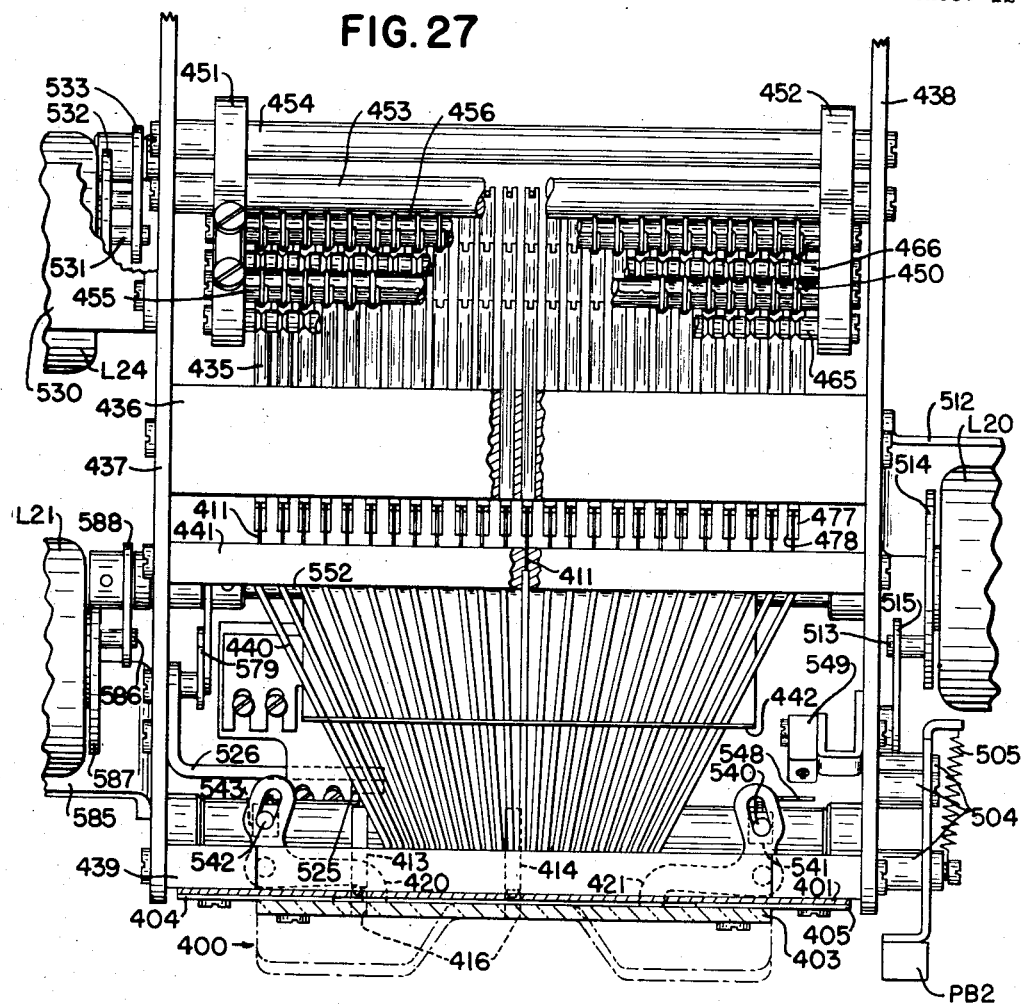
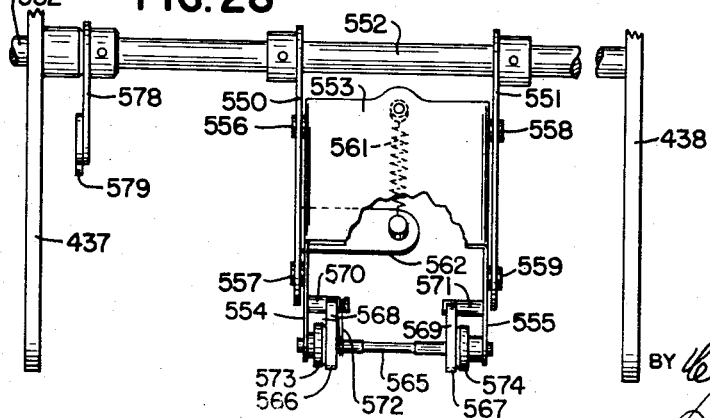
INVENTORS
JOHN H. BURNS
RICHARD L. DITMER
& DONALD L. WEEKS
BY Carl Beust
Louis A. Kline
THEIR ATTORNEYS

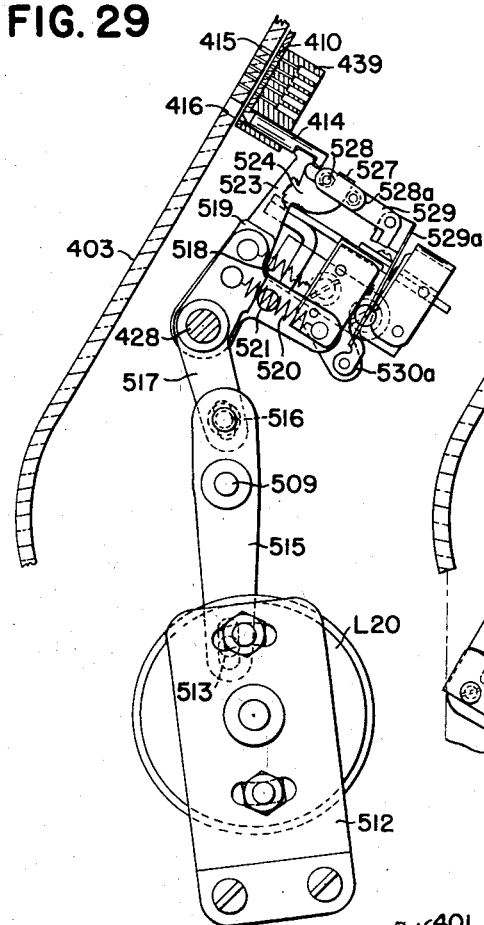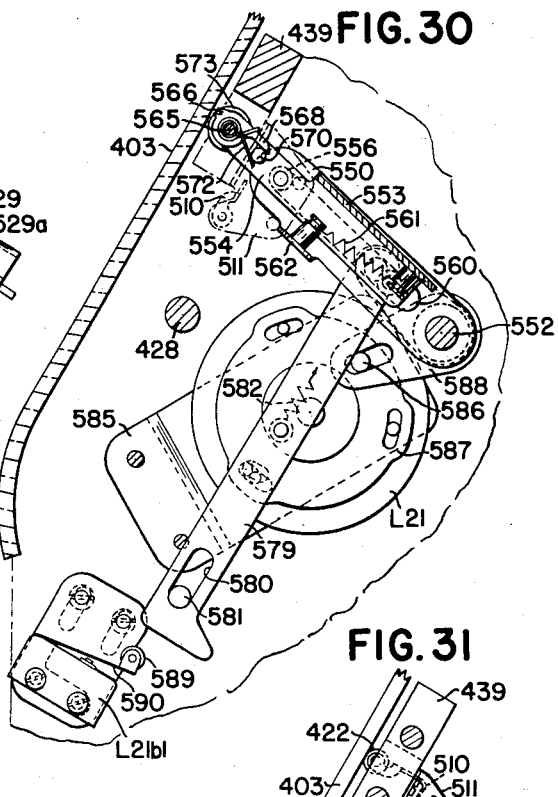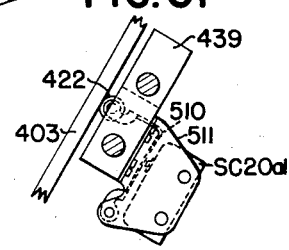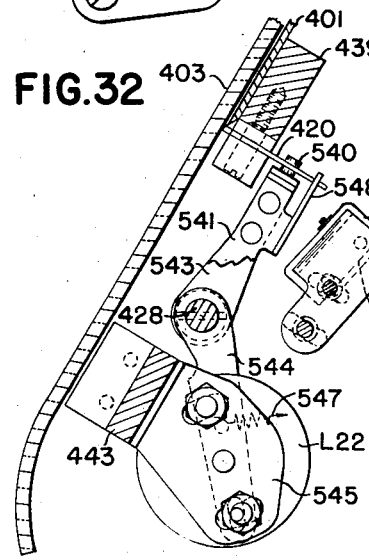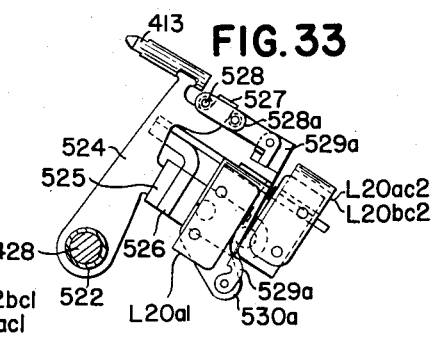

March 24, 1959   J. H. BURNS ET AL   2,878,872
DATA RECORDING APPARATUS
Filed Feb. 16, 1955   23 Sheets-Sheet 14
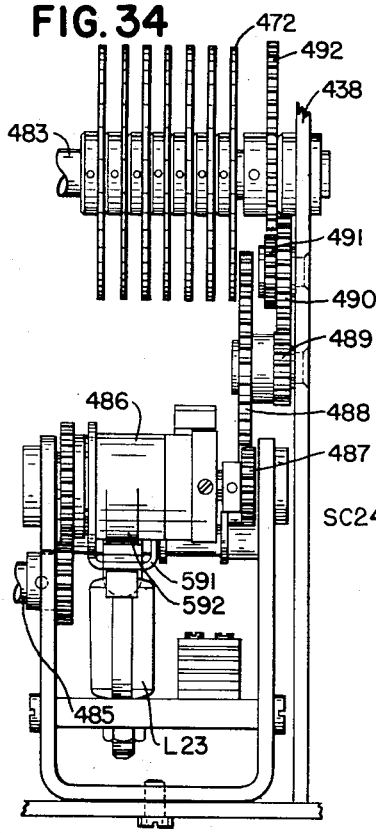
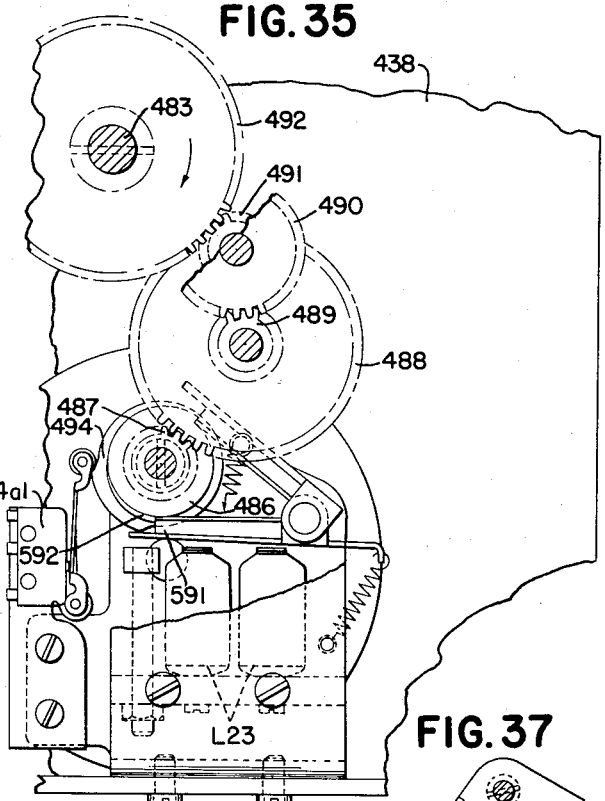
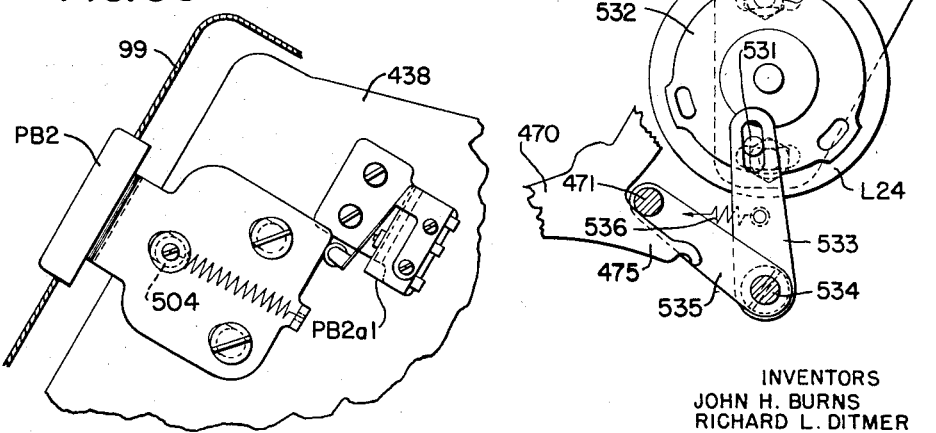
INVENTORS
JOHN H. BURNS
RICHARD L. DITMER
& DONALD L. WEEKS
BY
THEIR ATTORNEYS March 24, 1959   J. H. BURNS ET AL   2,878,872
DATA RECORDING APPARATUS
Filed Feb. 16, 1955   23 Sheets-Sheet 15

INVENTORS
JOHN H. BURNS
RICHARD L. DITMER
& DONALD L. WEEKS
BY
THEIR ATTORNEYS

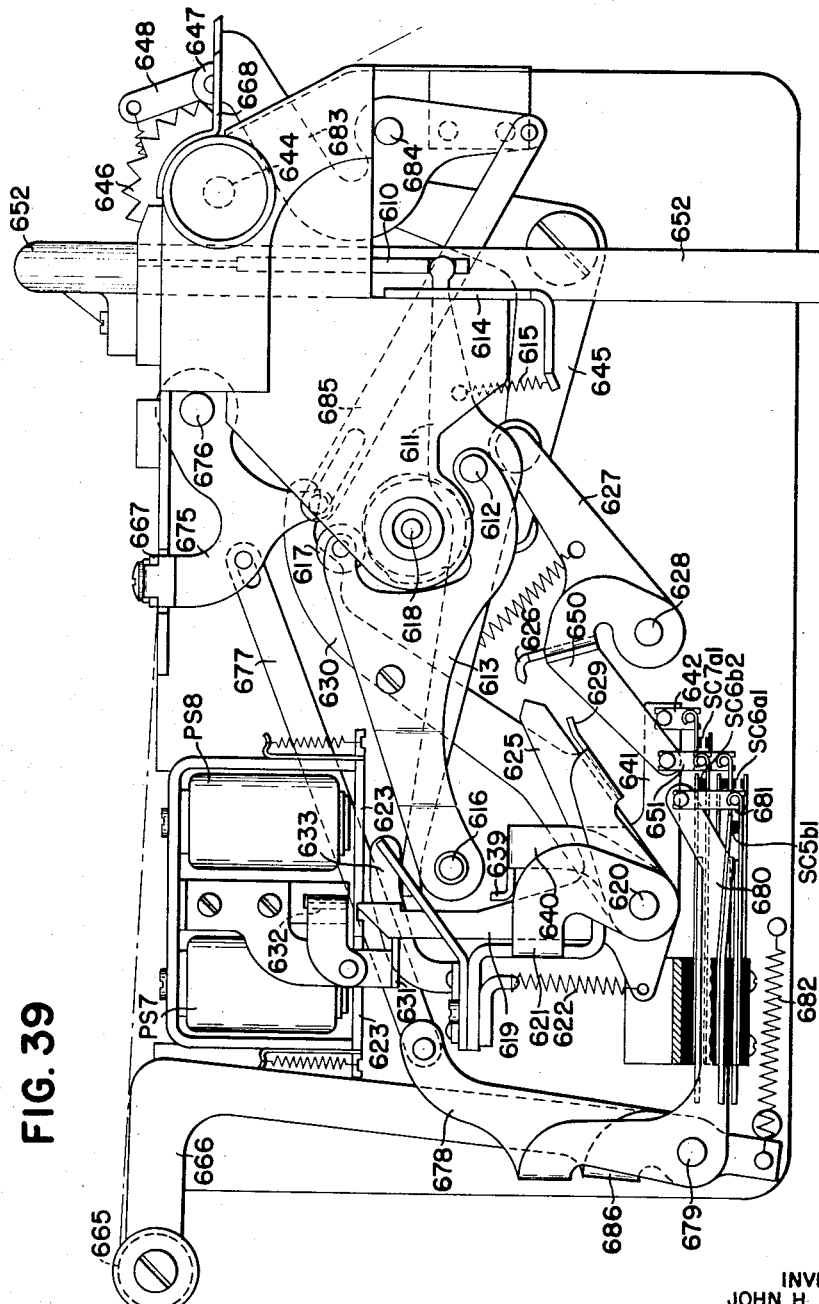

March 24, 1959 J. H. BURNS ET AL 2,878,872
DATA RECORDING APPARATUS
Filed Feb. 16, 1955 23 Sheets-Sheet 17
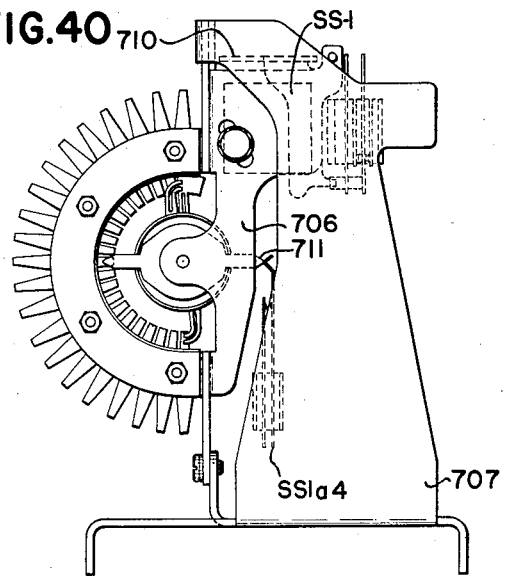
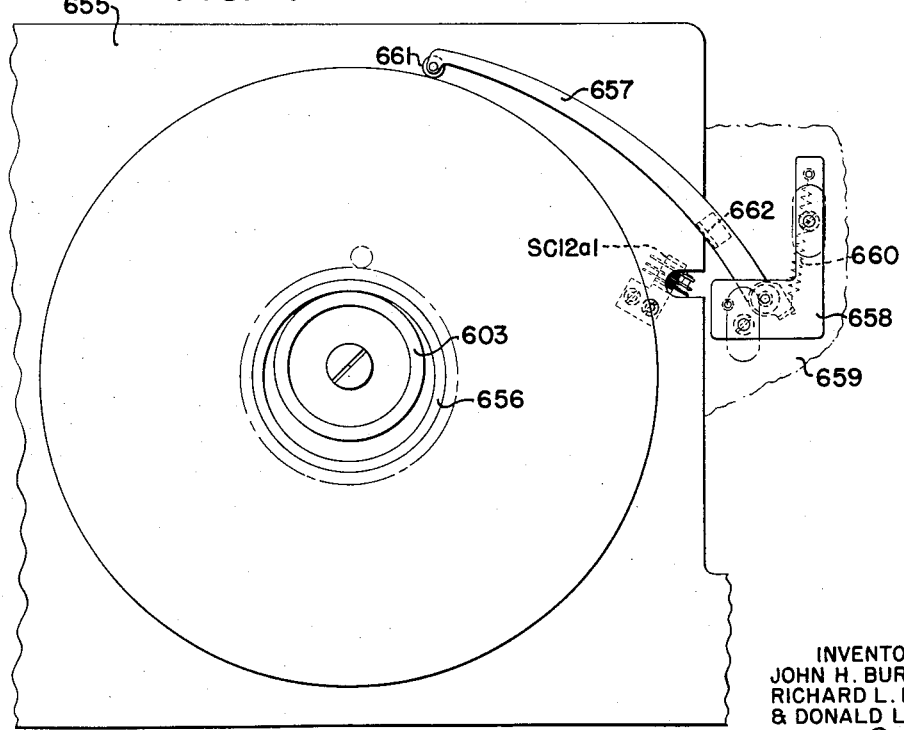
INVENTORS
JOHN H. BURNS
RICHARD L. DITMER
& DONALD L. WEEKS
BY
THEIR ATTORNEYS

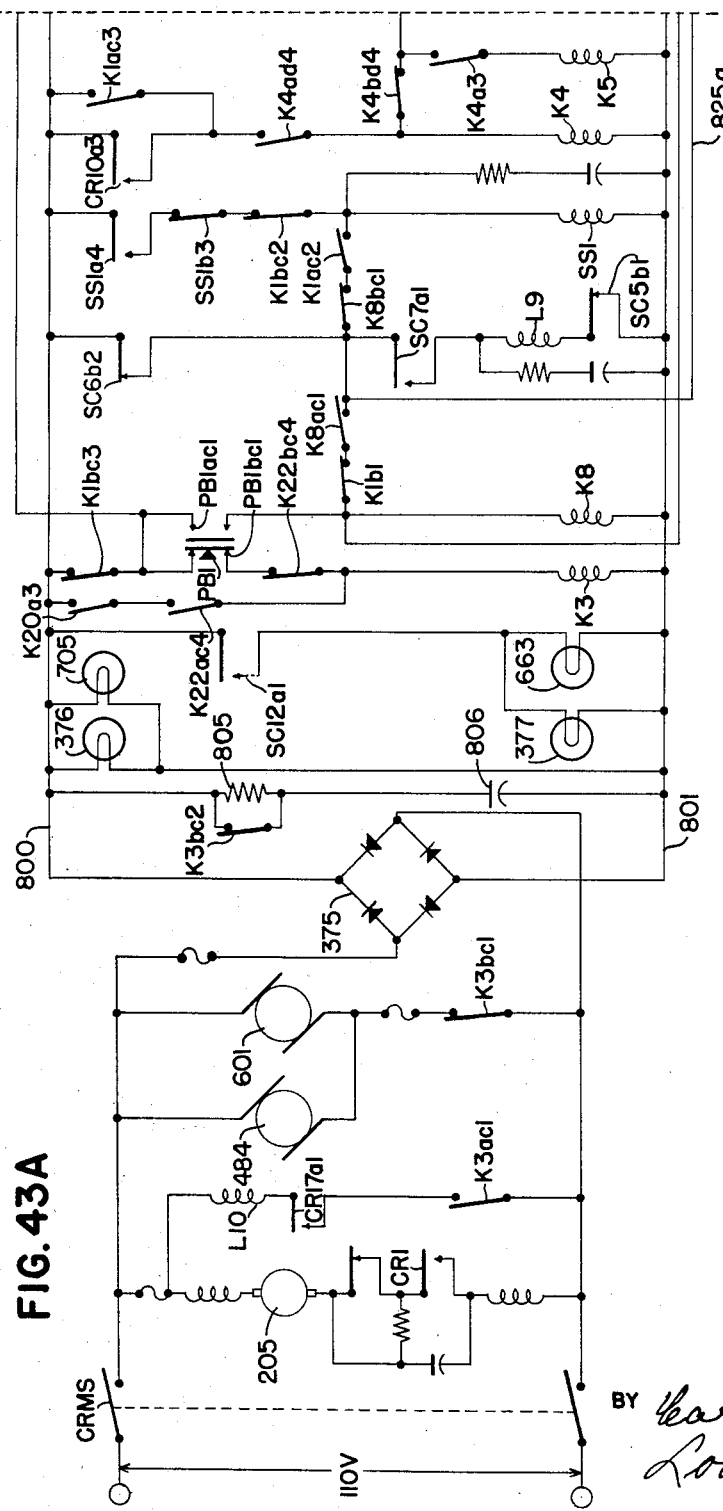

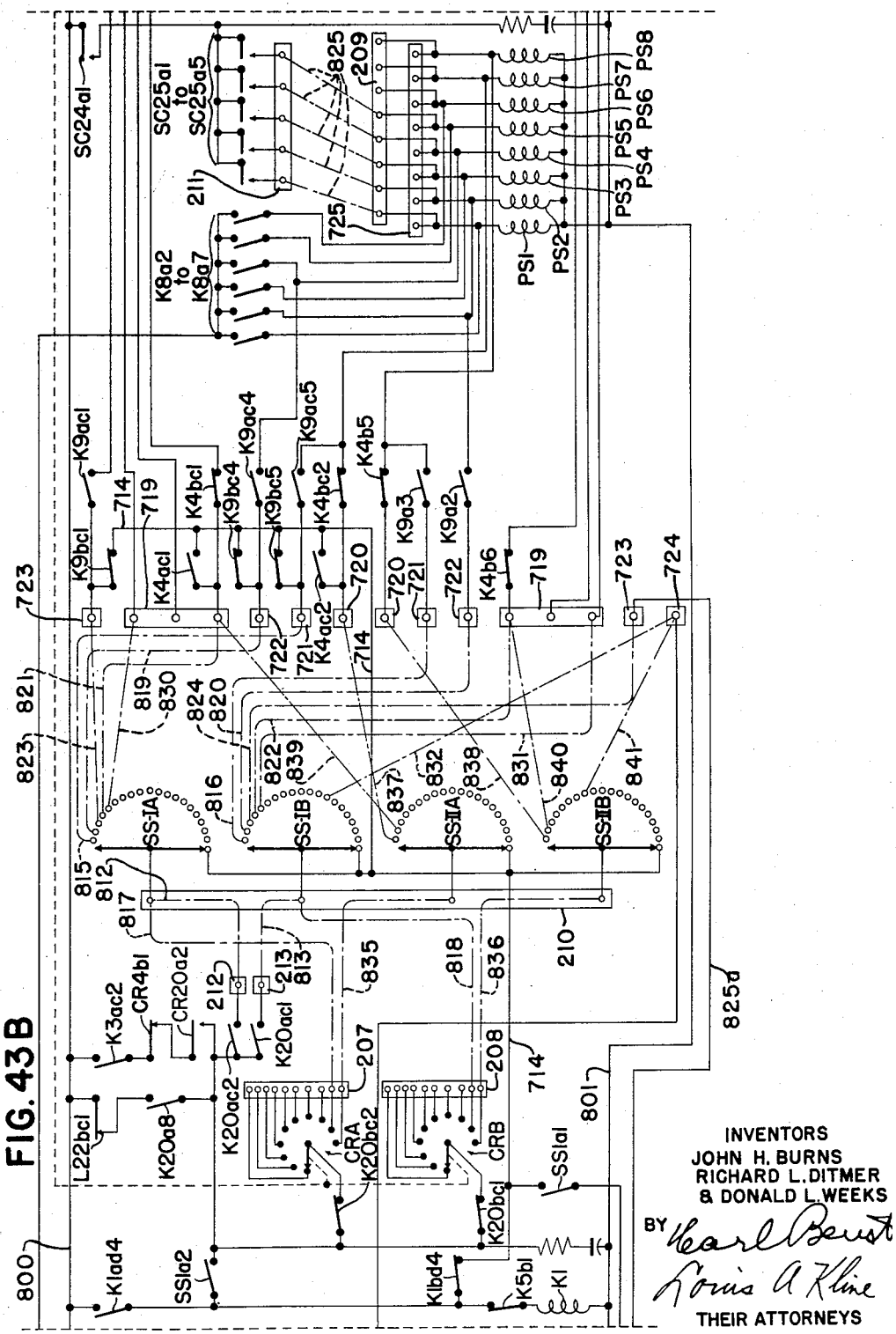

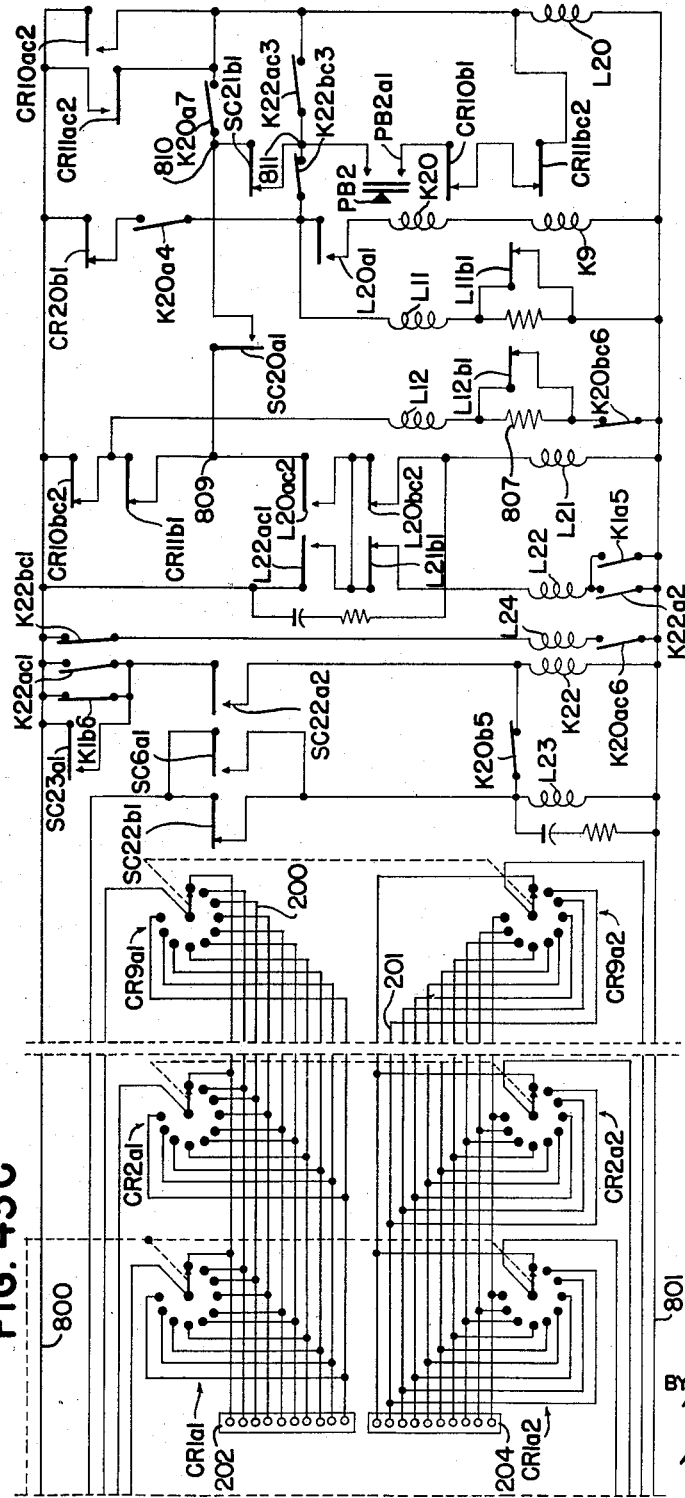

March 24, 1959

J. H. BURNS ET AL 2,878,872

DATA RECORDING APPARATUS

Filed Feb. 16, 1955

INVENTORS
JOHN H. BURNS
RICHARD L. DITMER
& DONALD L. WEEKS

BY

THEIR ATTORNEYS

United States Patent Office 2,878,872
Patented Mar. 24, 1959

2,878,872

DATA RECORDING APPARATUS

John H. Burns, Germantown, Richard L. Ditmer, Brookville, and Donald L. Weeks, Dayton, Ohio, assignors to The National Cash Register Company, Dayton, Ohio, a corporation of Maryland Application February 16, 1955, Serial No. 488,636

7 Claims. (Cl. 164—113)

This invention relates to a tape-perforating apparatus and in particular relates to a tape-perforating apparatus which can be operated in different punching programs to record related data, taken from a card or tag reader and/or a keyboard-controlled machine, in proper relation on the tape.

In order to explain the invention, it will be shown embodied in an apparatus for punching a tape with data related to sales of merchandise at the time the sales are made, which tape can be later analyzed to provide stock control or other statistical data which may be desired. It will be clear that the disclosed embodiment merely illustrates one of the uses to which the novel apparatus of the invention may be put.

High-volume merchandising can be carried out more efficiently and quickly if the data pertaining to sales in a normal sales period can quickly and accurately be tabulated in concise form and made available for use in inventory control.

In the past, information pertaining to the merchandise sold was obtained from sales slips or price tags which were accumulated during the day, and the information was obtained either by directly manually checking off each article from an inventory control sheet or by manually punching tabulating cards with the data, so as to enable the tabulation to be obtained later by tabulating machines. In either case, the direct checking of the articles from the inventory control sheet or the punching of cards occurred long after the sales took place, and its accuracy depended in large part on the accuracy of the manual operations of checking the articles from the control sheets or punching cards, and also on the care taken in preserving and collecting the sales slips, price tags, or other media used to supply the information necessary for stock control or other merchandising controls which may be used.

The most desirable condition in obtaining this information would be to record the identifying data for merchandise sold at the time of the sale and to record it in such a manner that there would be no danger that any of the data would be lost or mislaid before it could be used.

One solution which has been proposed was to set up the merchandise-identifying data on the cash register as a part of the operation of recording the sale and to punch a tape with this identifying data along with other data pertaining to the sale. This would be a satisfactory solution if the identifying data were simple and involved only a few digits. This is not the case, however, because the identifying data, to be most effective, must contain many digits to give such information as the stock number, size, color, manufacturer, date purchased, amount of the merchandise, etc. Such identifying data may require as many as twenty-five digits, and, since the cash registers usually do not have twenty-five rows of keys on the keyboard, multiple operations of the cash register would be required to record the identifying data for each article of merchandise which was sold. While this solution would provide a punched tape with all the merchandise data pertaining to articles which were sold, it would require so many operations of the cash register that the recording of sales would take up too much of the clerk's time.

The instant invention overcomes all these drawbacks by enabling the identifying data to be read directly from a tag by a reader and recorded on the tape while the clerk is setting the cash register according to other data pertaining to the sale, which other data is also recorded on the tape immediately after the identifying data. Hence the long numbers making up the identifying data can be recorded quickly without requiring multiple cash register operations and without taking up too much of the clerk's time in recording the sales.

Suitable interlocks and intercontrols are provided to insure that the operation of the recorder by the reader and the cash register can take place in the proper sequence. These controls as provided by the novel apparatus are extremely flexible and enable the apparatus to be programmed to provide the data necessary for "unit" control or any other system of merchandise control.

It is an object of the invention, therefore, to provide an apparatus for recording data on a tape under joint control of a reader, which reads part of the data from a card or a tag, and a mechanism which can variably set according to the rest of the data.

A further object of the invention is to provide an apparatus which can quickly record data pertaining to a sale at the time of the sale, a certain part of the data being read from a tag by a tag reader, and another part of the data being obtained from the cash register as a by-product of the normal operation of the cash register in the recording of the sale.

A further object of the invention is to provide a recorder for recording data jointly under control of a reader and a keyboard-controlled mechanism by which data may be supplied to the recorder, and to provide interlocks to enforce the operation of the reader and the keyboard-controlled mechanism in a predetermined sequence.

With these and incidental objects in view, the invention includes certain novel features of construction and combinations of parts, a preferred form or embodiment of which will be hereinafter described with reference to the drawings which accompany and form a part of this specification.

Of said drawings:

Fig. 1 is a front elevational view of the novel apparatus, showing the cash register, the reader, and the recorder portions of the apparatus, together with the cables for connecting the three portions of the apparatus together for joint operation.

Fig. 2 is an enlarged facsimile showing a typical card or tag to be read by the reader.

Fig. 3 represents a portion of the tape produced in the recorder and shows the code used to represent the data and the symbols.

Fig. 4 is a diagrammatic view of a typical keyboard arrangement for use on the cash register.

Fig. 10 is an end elevational view, partly in cross section, of one of the selector switch units.

Fig. 11 is a side elevational view, partly broken away for clearness, showing one of the selector switch units.

Fig. 12 is an end elevation of the support for mounting the plugboard on the back of the cash register.

Fig. 13 is a rear elevational view of the plugboard mounted on the cash register.

Fig. 14 is a detail view showing the contacts which are closed upon the operation of certain keys of the cash register for preparing the cash register for release.

Fig. 15 is a side elevational view showing the machine release mechanism, together with certain controls for disabling the recorder during total-taking operations.

Fig. 16 is a detail view of a part of the mechanism for locking out the "#" key under the control of the reader.

Fig. 17 is a detail view of the mechanism for locking out the Merchandise keys after a tag is placed in the reader, together with interlocking mechanism for locking out certain of the keys for total-taking operations.

Fig. 18 is a detail view of the reader-disabling contacts.

Fig. 19 is a side view showing the "#" key lockout solenoid and certain elements actuated thereby.

Fig. 20 is a rear elevational view of the "#" key and the Merchandise key lockout solenoids, together with certain contacts controlled thereby.

Fig. 24 is a front view of the tag chute with the front transparent cover removed.

Fig. 25 shows the cam line which controls when the various columns of the sensing means will be effective and also provides other controls.

Fig. 26 is a section through the cam line, taken along the line 26—26 of Fig. 25, showing several of the cams together with certain contact-operating arms which cooperate therewith.

Fig. 27 is a top plan view of the reader with certain parts broken away to show other parts more clearly.

Fig. 28 is a top plan view of the tag-advancing means.

Fig. 29 is a detail view of the alining-pin-actuating means.

Fig. 30 is a detail view of the operating means for the tag-advancing means.

Fig. 31 is a detail showing the tag-operated contacts which are closed by the tag when the tag is placed in reading position.

Fig. 32 is a detail view of the stop-arm-operating means.

Fig. 33 is a further detail of the alining-pin-positioning means.

Fig. 34 is a front view of the driving means for the reader, showing in particular the clutch and the clutch solenoid for controlling the cycling of the reader.

Fig. 35 is a side view of the driving means for the reader.

Fig. 36 is a detail of the reader motor bar and the contacts controlled thereby.

Fig. 37 is a detail of the operating means for the disabling yoke, which can be rendered operable to disable the sensing means.

Fig. 39 is a side elevation of the punching mechanism used in the recorder.

Fig. 40 is a side elevation of the stepping switch used to provide the controls in the various punching programs which it is possible to carry out with the recorder.

Fig. 41 is a side elevation of the tape supply means and the warning means for causing a signal to indicate when the tape supply is low.

Figs. 43A, 43B, and 43C together make up a circuit diagram of the apparatus.

Figure 44A:
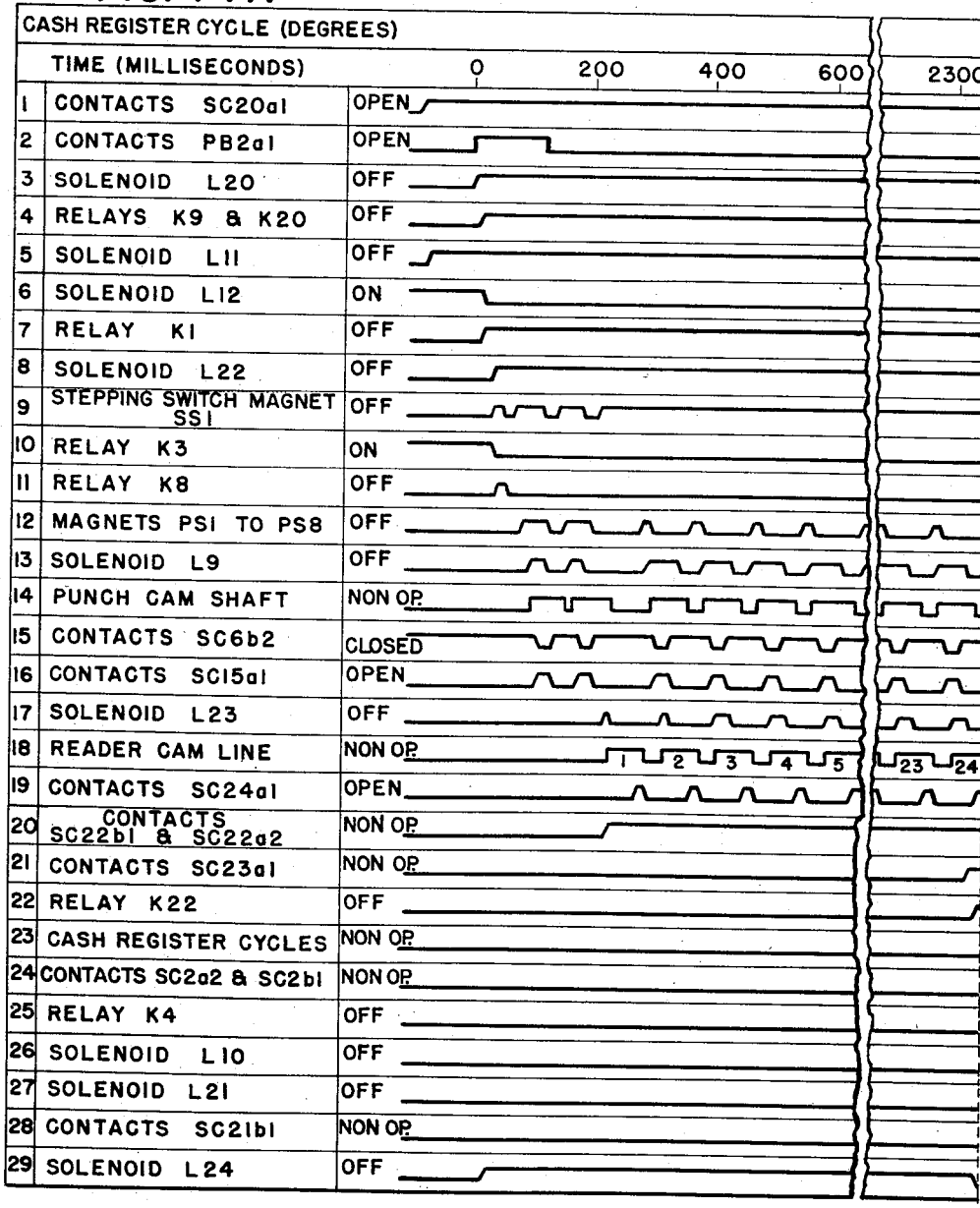
Figure 44B:
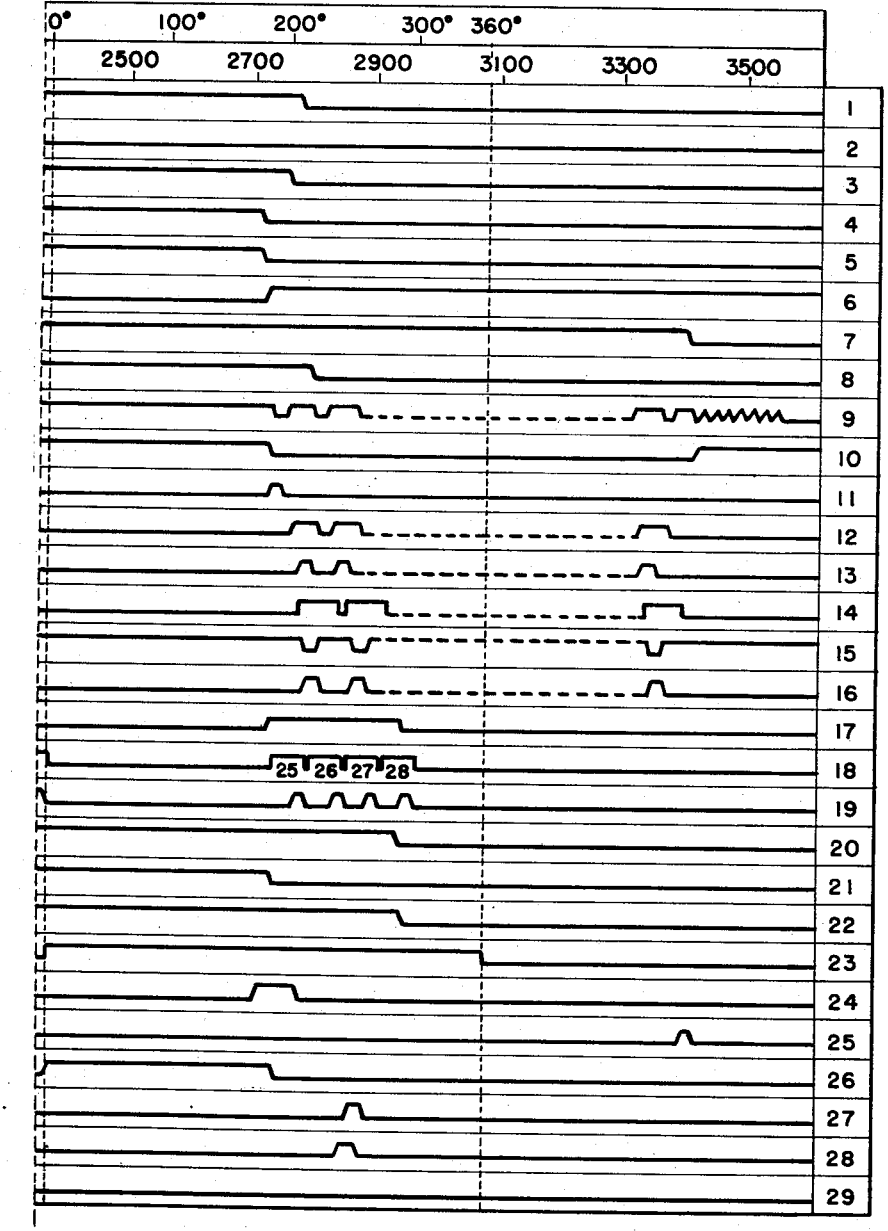

Figs. 44A and 44B form a timing chart illustrating the relative time of operation of the apparatus in recording "#" data from a tag under control of the reader and related Merchandise data under control of a cash register.

GENERAL DESCRIPTION

The invention illustrated herein provides a means for recording in sequential form, on a tape, data derived from a record card or a tag and/or from a key-controlled machine.

The embodiment chosen to illustrate the invention is one by which data related to sales of merchandise can be recorded quickly and accurately on a tape at the time the sale is made. By thus recording the data for each sale on the tape as the sale is made, the data for consecutive sales will appear sequentially along the tape and in such a manner that the tape can readily be used to control computers, or other data-processing apparatus, to quickly produce stock control data, sales data, and statistical information or other reports which might be desired.

In order to have all the information about the sale which would be needed to produce these various control data, statistics, or reports, it is necessary to record merchandise-identifying data as well as sales data for each sale. Accordingly, for each article sold, the tape will be punched with merchandise-identifying data followed by a related set of data giving details pertaining to the nature of the sale. Each merchandise-identifying data and its related sales data are considered as a "frame" of information on the tape and will be separated from other adjacent frames of information by End of Frame symbols. In multiple-item sales, a "frame" of information will be punched on the tape for each article sold.

The novel apparatus, as seen in Fig. 1, includes a recorder 98, which can produce the punched tape; a reader 99, which can control the recorder to cause merchandise-identifying data to be punched on the tape; and a cash register 100, on which sales data can be set to control the recorder to cause sales data to be punched, and on occasion also can control the recorder to cause merchandise data to be punched. The recorder, the reader, and the cash register are connected by cables for joint operation, and, while they are shown as separate units in Fig. 1, it will be clear from the following description that all three units form a unitary apparatus, which could, if desired, be contained in a single cabinet.

The reader is provided to control the recorder to supply the merchandise-identifying data. This data is read from a tag (Fig. 2) on which the pertinent merchandise-identifying data pertaining to an article is punched at the receiving department when the article is received. The tag is suitably attached to the article and remains with the article until the time of sale, when it is detached and placed in the reader.

The tag, as shown in Fig. 2, has provisions for twenty-five columns 91 of punched data, has two alining holes 92 and 93, and has a further hole 94, through which an attaching string may be passed. As an example of the data which may be punched on the tag, the first four columns may be punched with a four-digit code identifying the manufacturer, 2134; the fifth and sixth columns may be punched with digits identifying the color of the article, 56; the seventh and eighth columns may be punched with a code identifying when the article was purchased, 78; the ninth, tenth, and eleventh columns may be punched to indicate the size, 12½; the twelfth, thirteenth, and fourteenth columns may be punched with data to indicate the style of the article, 901; the fifteenth and sixteenth columns may be punched to identify the fabric of which the article was made, 23; the seventeenth and eighteenth columns may be punched to identify the season for which the article was suited, 45; and columns nineteen through twenty-three may be punched with the amount which is the price of the article, $123.45. In order to simplify the showing of the tag in Fig. 2, it is shown punched in columns one to four and nineteen to twenty-three. It is to be understood that the tag will be punched with the required data in columns five through eighteen, as indicated above.

The digits which are punched in the various columns are also printed on the tag and are grouped by underlining for ready separation of the component parts of the identification number to assist in the visual reading of the data. The amount on the tag is used merely to provide a comparison between the original price of the article and the price at which the article actually was sold, as indicated by the amount which is set up on the cash register as a part of the recording of the sales data.

In addition to the identifying data which is punched and printed thereon, the tag may also have printed thereon any other desired additional data, such as tax data, which may be of assistance to the clerk in making the sale.

The tag reader 99 is provided with a tag chute, which has a transparent cover through which the printed data on the tag can be read.

Since the merchandise-identification data is usually merely a code number, it will be referred to hereinafter as "#" data to distinguish it from sales data.

The cash register is provided to control the recorder to perforate sales data which is set up on the cash register. This data will contain such information as the clerk's number, the amount of the sale, the classification of the sale, and other data pertaining thereto.

The recorder 98, which is controlled by the reader and the cash register, is operable to produce a perforated tape of the type shown in Fig. 3. The tape, as shown in Fig. 3, illustrates the code which will be used to represent data and symbols in the embodiment being described. It will be clear that the particular code shown in Fig. 3 is merely illustrative and that other codes may be used to represent the data.

The control of the recorder by the reader and the cash register is coordinated by programming means which can be set up to provide several punching sequences which may cause the recorder to be controlled by the reader and the cash register jointly or by the cash register alone as required to record the necessary data on the tape.

In the use of the system, a main switch CRMS (Fig. 1), located on the indicator cover of the cash register, is closed to supply operating power to the three portions of the apparatus. After the switch CRMS is closed at the beginning of a day's business, the clerk, in completing a sale, will remove the pre-punched price tag from the article and detach the pre-punched section therefrom along a perforated line. This detached section of the tag is placed in the throat of the chute of the tag reader and is depressed until the tag contacts retractable tag stop arms, which arrest the tag in reading position. Thereafter, the reader motor bar PB2 is depressed to cause the "#" data on the tag to be read and to be punched in the tape by the recorder.

During the time the data is being read and recorded, the clerk can operate the keys on the keyboard of the cash register to set up the amount and other pertinent sales information related to the data being read from the tag, but the cash register is not operated until all the data has been read from the tag in the reader and re-corded by the recorder onto the tape, after which the cash register is automatically released and operated. During this operation of the cash register, the data set up on the cash register keyboard is transmitted to the recorder and punched on the tape immediately following the "#" data.

Interlocking devices are provided in the cash register, the reader, and the recorder to enforce proper operating sequences, all of which interlocks will be described when the several portions of the apparatus are described and when the electrical circuits are explained.

There is a possibility that a price tag may be lost or mutilated beyond use. Under this circumstance, the "#" data usually read directly from the tag by the reader must be entered by means of the cash register keyboard. In such circumstance, the operator reads the data from the mutilated tag, or, if the tag is missing, from a stock information sheet. In the present disclosure, the "#" data on the tag contains twenty-three digits. Since the keyboard does not have the capacity to set up the entire twenty-three digits, it is necessary to make a plurality of index operations on the keyboard, and a plurality of cash register operations to enter the "#" data, the number of operations being determined by the number of digits to be entered, divided by the number of key banks of the machine which are to be used for setting up this data. The number of key banks used must always be the same for each operation, as will be explained more fully when the circuit diagram is described. In making these entries, a "#" key, which is provided in row 1 of the cash register keyboard, is used to control the machine operations. Depression of the "#" key in these "#" data entering operations conditions the electrical circuits, so that the cash register can be operated without operating the reader.

Interlocks and interconnections are provided, which, upon depression of the "#" key, disable the reader. The controls also lock the "#" key against depression when a tag has been positioned in the reader, and before a Mechandise key is depressed, after a tag-reading operation.

The operation of the cash register, the reader, and the recorder, and the programming and the interconnection of these mechanisms to produce a tape with the required information, will be clear from the following detailed description.

*Cash register*

The cash register which forms part of the apparatus is illustrated in Fig. 1 and in Figs. 4 to 22 and is of the type shown and described in the United States patent to John B. Greers and Arthur R. Colley, No. 2,209,771, issued on July 30, 1940, and in the United States patent to Mayo A. Goodbar et al., No. 2,698,139, issued on December 28, 1954.

The cash register 100 (Fig. 1) is provided with a transaction row of keys comprising eight keys 101 (see also Fig. 4) for controlling the register according to the significance of various entries, and a "#" key 102 for controlling the register to enter the "#", or mechandise-identifying, data. The keys 101 and 102 are slidably mounted in a frame 103 (Fig. 5), carried by cross rods 104 and 105, supported in frames 106 of the machine. Upon operation of the machine with a key in the transaction row depressed, a latch mechanism 107 will be controlled by the depressed key and cause a latch to be disengaged from a driver 108 in the position represented by the depressed key. The driver 108 is connected to an operating lever 109 by a link 110, and the lever 109 is pivoted on a stud 111, carried by hanger frames 112. The hanger frames are supported on a pair of rods 113 and 114. The operating lever 109 is driven by two rollers 115, coacting with a pair of cam plates 116, secured to the main cam shaft 117.

Rotation of the cam plates 116 first rocks the lever 109 clockwise (Fig. 5), which, through the link 110, rotates the driver 108 clockwise to carry with it the latch mechanism 107. When the latch mechanism 107 engages the depressed key of the transaction bank, the latch is disengaged from the driver 108, and the driver 108 continues its fullest extent of movement. Thereafter, the cams 116 reverse the operation of the mechanism by rocking the lever 109 counter-clockwise, which, through the link 110, restores the driver 108 counter-clockwise.

The latch mechanism 107 is mounted on an arm 119, pivoted on a sleeve 120, carried by the hanger frames 112. When the latch mechanism in disconnected from the driver 108, the arm 119 will also be arrested in a position representing the depressed key.

In the clockwise restoration of the driver 108, it will engage a stud on the arm 119 and restore the arm and the latch mechanism to home position. At the time the driver 108 engages the stud on the arm 119 and begins to return it, a spring 118 restores the latch back into driving relation with a driving shoulder on the driver 108.

The arm 119, which is positioned according to the depressed key, has pivoted thereto the left end of a beam 121, bifurcated at its right-hand end to engage a roller 122 on a link 123. The lower end of the link 123 is pivoted to an arm 124, mounted on a shaft 125. The upper end of the link 123 is pivoted to an indicator-setting segment 126, secured to a sleeve 127 on a shaft 128. The indicator-setting segment 126 is provided with teeth 129 for adjusting the usual indicator mechanism to visibly indicate the symbol indicating which transaction key was depressed during the operation of the register. All of the above mechanism is old and well known in the art and is fully described in the above-mentioned patents.

*Amount differential mechanism*

As indicated in Fig. 4, the cash register is provided with five rows of amount keys and two rows of clerks' keys 130. The amount keys and the clerks' keys 130 of each row are slidably mounted in the key frame 131 (Fig. 6), supported on the cross rods 104 and 105. Depression of a key 130 projects its end into the path of movement of the latch mechanism 134, carried by a totalizer actuator and resiliently coupled to a driver 135. The driver 135 is connected to an operating lever 136 by a link 137. The operating lever 136 is pivoted on a stud 133, carried by a pair of hangers 138, supported on the rods 113 and 114. The lever 136 is driven by two rollers 141, coacting with a pair of cams 142, secured to the main cam shaft 117.

Rotation of the cams 142 rocks the lever 136 first clockwise, which, through the link 137, rocks the driver 135 clockwise and carries the latch mechanism 134 and the actuator 146 therewith until the latch mechanism engages the end of a depressed key 130, whereupon the latch of the latch mechanism is disconnected from the driver 135, and the actuator is positioned according to the depressed key, the driver continuing its full clockwise movement. Thereafter, the cams 142 reverse the operation of this mechanism and restore the driver 135 counter-clockwise to home position. In this return movement, the driver 135 will engage a stud on the totalizer acuator 146 and will restore the actuaor 146 and the latch mechanism 134 to home position. As the driver engages the stud on the actuator 146, the driving shoulder on the driver will be opposite the latch mechanism, and a spring 143 will restore the latch of the latch mechanism into driving engagement with the driver 135.

The usual zero stop pawl 144 arrests the latch mechanism in the zero position when no amount or clerk's key is depressed in the associated rows of keys.

The left end of a beam 145 is pivoted to a totalizer actuator 146. When the latch mechanism is arrested in the position corresponding to the depressed key, the actuator 146 and the left end of the beam 145 are positioned in accordance with the value of the key depressed. The lever 136 is provided with a roller 147, which engages the beam 145 to move the right-hand end of the beam into a position commensurate with the value of the depressed key. The right-hand end of the beam 145 is bifurcated to engage a stud 148 on a link 149. The lower end of the link 149 is pivoted to an arm 150, mounted on the shaft 125. The upper end of the link 149 is pivoted to an indicator-setting segment 152, supported on the sleeve 153, surrounding the shaft 128. The segment 152 is provided with teeth 155, which adjust the usual indicator mechanism in the usual manner to indicate the value of the depressed key.

Before the totalizer actuator 146 is restored to its home position, selected totalizers 156 or 157 are moved into engagement with the teeth of the totalizer actuator 146, and, during the restoring movement of the totalizer actuator 146, the actuators enter the value of the depressed key into the respective totalizers 156 and 157 in a manner well known in the art.

The beams 121 (Fig. 5) and 145 (Fig. 6) and the indicator-setting segments 126 and 152 remain in their set positions at the end of the machine operation, where they are held by an aliner 158, engaging with the alining teeth on the various indicator-setting segments 126 and 152. The aliner 158 is carried on a plurality of arms 159, pinned to a shaft 160, which is operated during the machine operation to disengage the aliner 158 from the teeth of the indicator-setting segments before they are readjusted to their new position, and to engage the teeth again after the segments have been positioned into their new positions. For a more detailed disclosure of the above mechanisms, reference may be had to the above-mentioned patents.

*Control keys row 9*

The control keys in row 9 (Fig. 4) control a differential mechanism, which, in addition to setting up controls which are fully set forth in the above-noted patents, also sets an indicator through an indicator-setting segment, which remains in its set position at the end of an operation of the cash register, as is also fully described in said patents.

*Selector switches*

The transaction, amount, clerk, and control differential mechanisms actuate selector switches, certain of which control the selection of punches in the recorder to punch the data set up on the keys according to a predetermined code, and others of which select a punching program according to the significance of the data.

Figure 5:
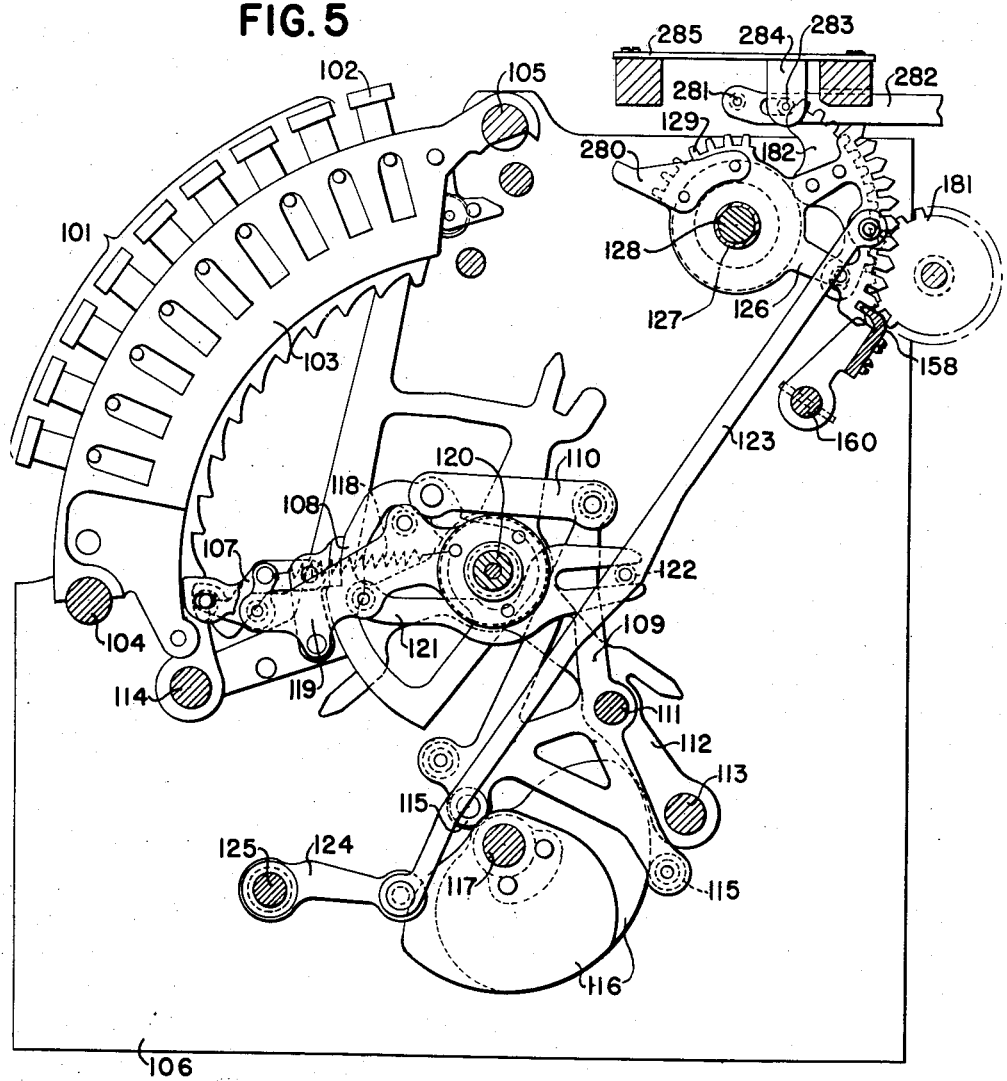
Fig. 5 is a cross-sectional view of a transaction bank in the cash register.
Figure 6:
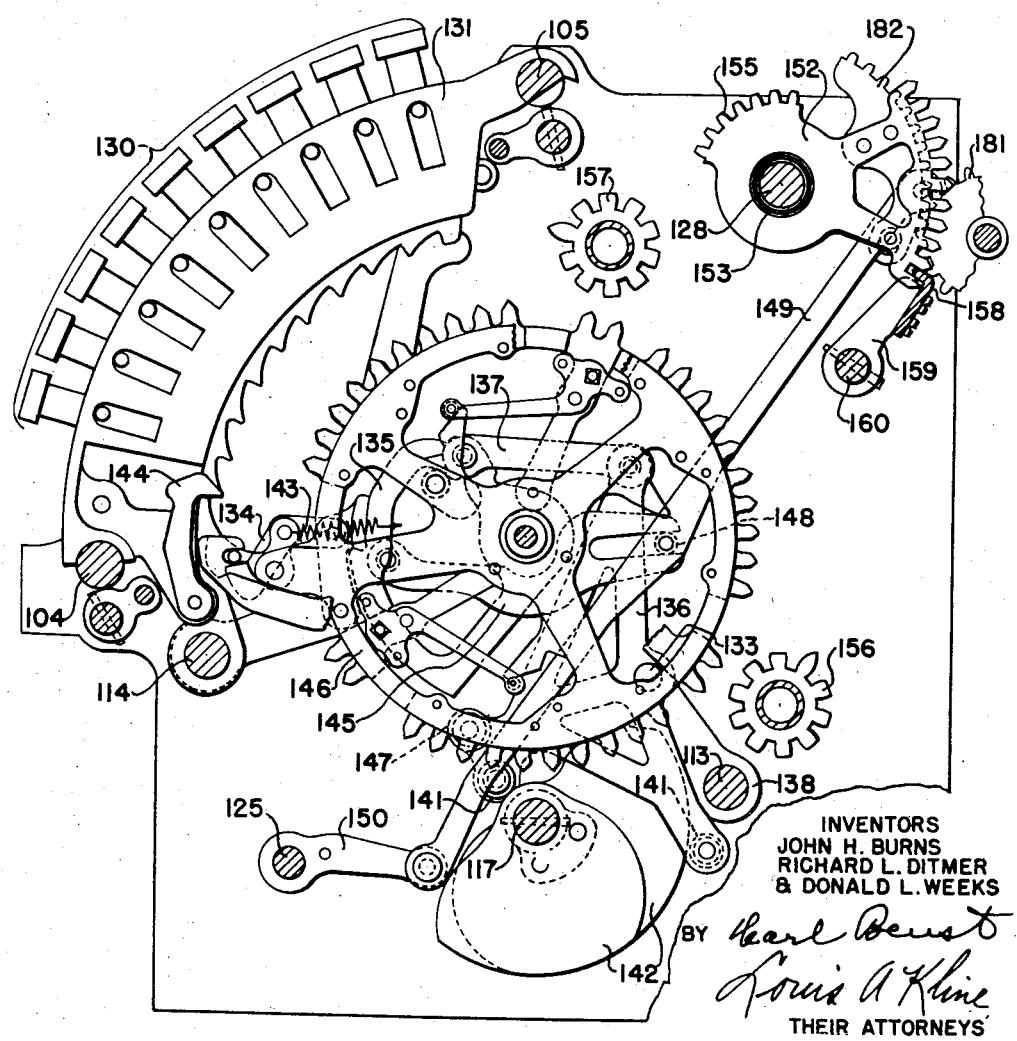
Fig. 6 is a side cross-sectional view showing an amount bank differential in the cash register.
Figure 7:
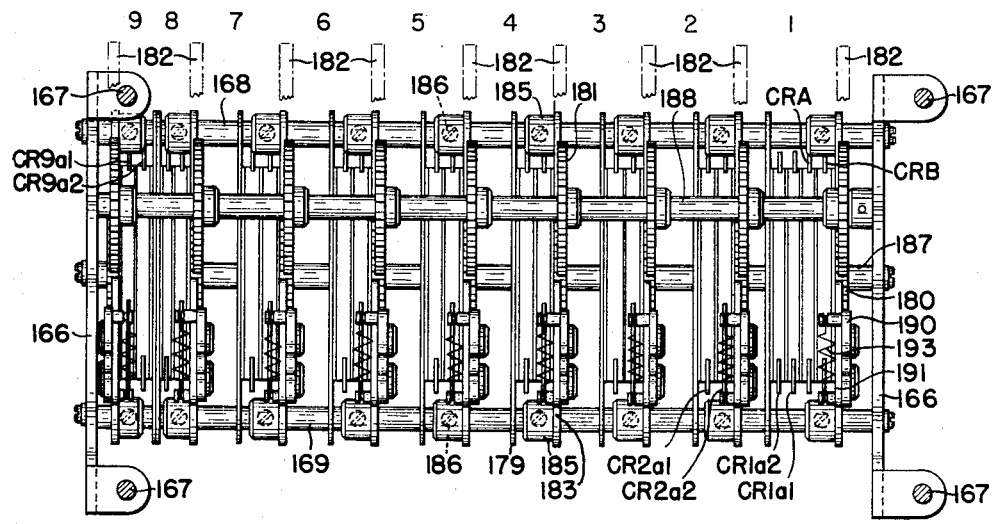
Fig. 7 is a front elevational view of the selector switches which are adjusted under control of the various differential mechanisms of the cash register.
Figure 8:
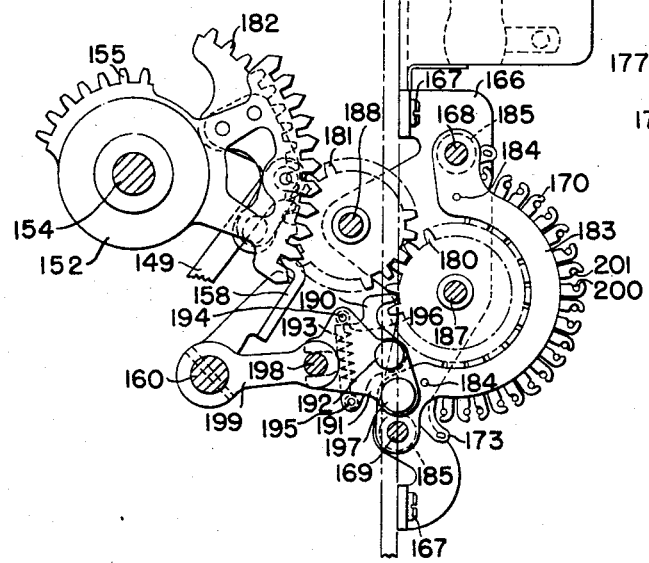
Fig. 8 is a side elevational view of one of the selector switches and shows the connection by which the selector switches are set by the indicator-setting mechanisms of the cash register differential mechanisms.
Figure 9:
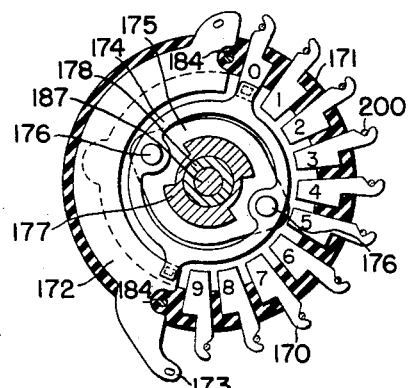
Fig. 9 is a detail view of one of the selector switches shown in Figs. 7 and 8.

Referring to Fig. 7, it will be seen that the transaction differential row has four selector switches associated therewith, and that each differential of rows 2 to 9 has two selector switches associated therewith.

The selector switches are designated by the reference numerals CRA, CRB, CR1a1, and CR1a2, which are set by the transaction differential (Fig. 5) row 1 (Figs. 1 and 4) of the keyboard, and CR2a1 to CR9a1, and CR2a2 to CR9a2, which are set by the amount, clerk, and control differentials, rows 2 to 9 (Figs. 1 and 4).

The construction and mounting of the selector switches are illustrated in Figs. 7, 8, 9, 10, and 11. Mounted on a back frame 165 (Fig. 8) of the cash register are two brackets 166, secured to the back frame by screws 167. Mounted between the brackets 166 are three shafts 168, 169, and 187, which form the main support for the selector switches.

Each selector switch includes ten contacts 170 (Fig. 9), one for each differential position of the differential mechanism, which contacts are imbedded in an insulating ring 171. Also imbedded in the insulating ring 171 is a common 172, having a terminal connection 173. Each selector switch is provided with a rotatable wiper comprising two rings 174 of resilient conducting material, each ring being formed with contact extensions, which are located 180 degrees apart and engage the contacts 170 and the common 172 in different positions of the wiper. The two rings are so arranged that their contact extensions engage opposite sides of the contacts 170 and 172. The rings 174 are spaced apart by a disk 175, having two ears, through which rivets 176 pass, which rivets also project through the two rings 174, whereby the rings 174 and the disk are riveted together to form a unitary wiper. The contact extensions of the rings 174 are provided with oppositely-facing contact points, which bear against the opposite sides of the contacts 170 and the common 172. The contact points of the wiper are urged against the contacts 170 and the common 172 due to the resiliency of the rings, and the tension thereon can be varied by selecting separating disks 175 of various thicknesses.

The disk 175 is provided with inwardly-projecting lugs, which are positioned in notches of an insulating hub 177, carried by a short sleeve 178 on a plate 179, mounted on the shafts 168 and 169. The hub 177 may be molded of nylon or other plastic material having insulating qualities. Rotatably mounted on the sleeve 178 is a gear 180, having lugs projecting into recesses of the hub 177 in such a manner that the gear 180 can rotate the hub 177 and the wiper. The gear 180 meshes with a gear 181, rotatable on a shaft 188, supported by the brackets 166. The gear 181 meshes with a rack 182, one being riveted to the side of each indicator-setting segment 152 of rows 2 to 9, and to indicator-setting segment 126 of row 1.

As before mentioned, each differential of rows 2 to 9 sets two selector switches. Therefore, two switch assemblies, each comprising contacts 170 and 172 and a wiper, are provided for each of these rows, and the hub 177 is made long enough to span both sets of contacts, so as to operate the two wipers simultaneously. As shown most clearly in Fig. 8, the sets of contacts 170 for the two switches of an assembly are offset. The assembly of the two sets of contacts are riveted between the plate 179 and the plate 183 by two rivets 184. The plate 183 is provided with two hubs 185, by which it is mounted on the shafts 168 and 169. The switch assemblies are held on the shafts 168 and 169 and on the center shaft 187, passing through the sleeves 178, in the proper lateral alinement by set screws 186 in the hubs 185.

The selector switches for row 1 are like those for rows 2 to 9 except that four sets of contacts 170 and 172 and four wipers 174 are provided.

After being set differentially by the differential mechanisms of rows 1 to 9, the wipers are alined and held in set position by aliner pawls 190, which are rocked into engagement with the gears 180 when the aliner shaft 160 is rocked to aline the indicator-setting segments 126 and 152 in the manner hereinbefore described. The aliner pawls 190 are pivoted on levers 191 by a stud 192, carried thereby, and each is flexibly connected to the lever 191 by a spring 193. The spring 193 is connected to a stud 195 on the pawl and a stud 194 on the lever 191 and holds the stud 194 in contact with a shoulder 196 on the pawl 190. The lever 191 is pivoted on a stud 197, carried by the plate 183, and is bifurcated to engage a rod 198, carried between a plurality of arms 199, secured to the rock shaft 160.

When the rock shaft 160 is operated at the beginning of a machine operation, the arms 199 and the rod 198 rock all of the levers 191 counter-clockwise (Fig. 8) to disengage the aliner pawls from the gears 180. Thereafter, the differential mechanisms of rows 1 to 9 adjust the wipers, through the racks 182, the gears 181 and 180, and the hubs 177, in accordance with the key depressed in each of these rows of the keyboard. After being differentially moved into their new positions, the gears 180 are alined and locked in position by the reverse movement of the shaft 160 to engage the aliner pawls 190 with the respective gears 180.

Corresponding digit contacts 170 of the selector switches CR1a1 to CR9a1 are connected to corresponding wires of a set of bus wires 200; that is, all the contacts in the "0" position are connected to the same bus wire, all the contacts in the "1" position are connected together to the same bus wire, etc. Similarly, the corresponding digit contacts 170 of the selector switches CR1a2 to CR9a2 are connected to the corresponding wires of a set of bus wires 201. The offsetting of the two sets of contacts in each assembly enables the contacts to be conveniently connected to the two sets of bus wires. The bus wires 200 are connected to the terminals in a section 202 (Fig. 13) of a plugboard 203, and the bus wires 201 are connected to the terminals in a section 204 of the plugboard.

The plugboard 203 is mounted on the back frame 165 (Figs. 12 and 14) of the register. The back frame carries three studs 206, on which the plugboard 203 is mounted.

The contacts 170 of program selector switches CRA and CRB are also connected to terminals of the plugboard 203. The several contacts of the program selector switch CRA are individually connected to terminals of a section 207 of the plugboard, and, similarly, the several contacts of the program selector switch CRB are directly connected to the terminals of a section 208 of the plugboard 203.

A section 209 of the plugboard contains terminals which are connected to the eight punch selector magnets PS1 to PS8 in the punching apparatus, which magnets control the selection of the punches to make perforations in channels 1 to 8, respectively, on the tape.

By means of plugboard connectors, digit terminals in sections 202 and 204 can be connected to the terminals in section 209 according to the code to be punched, as shown in Fig. 3; that is, a connection can be made from the "1" digit terminal in section 202 to a terminal in section 209 which is connected to the punch selector magnet PS1, and a connection can be made from the "1" digit terminal in section 204 to the terminal in section 209 which is connected to the punch selector magnet PS5, enabling the "1" position of the selector switches CR1a1—CR1a2 to CR9a1 to CR9a2 to cause perforations to be made in channels 1 and 5 on the tape to represent the digit "1." Similarly, by connecting the other digit positions in sections 202 and 204 by plugboard connectors to the required terminals of section 209, the other digits can be encoded for punching the tape according to the code shown in Fig. 3.

It is to be noted that this arrangement provides extremely flexible means for encoding the data, because, simply by providing proper connections from the digit terminals of sections 202 and 204 of the plugboard to the desired ones of the terminals of section 209, the digits can be represented by any code which does not require more than two perforations to represent any digit.

A further section 210 of the plugboard contains terminals which are connected to the wipers of different levels of a stepping switch in the recorder which are used to set up the punching sequences and other controls in four programs, I, II, III, and IV, which may be had in the apparatus as desired.

By means of plugboard connectors, corresponding terminals in sections 207 and 208 of the plugboard can be connected to the two rows of terminals in section 210 which are related to the desired program and enable the program selector switches CRA and CRB to select the program according to the significance of the data as indicated by the particular key which has been operated in row 1 of the cash register.

Another section of the plugboard, section 211, has five terminals which are connected to the sensing means in the reader, and these terminals can be connected by plugboard connectors to terminals in section 209 to enable the reader to control the recorder to punch on the tape the data which is read.

Sections 212 and 213 have terminals which are connected to the control circuits of the reader. Plugboard connectors can connect these terminals to proper terminals in section 210 to enable the reader to control certain steps in the punching program.

Examples of programming and interconnecting the above sections for enabling the various portions of the apparatus to control each other will be explained in detail when the circuit diagram in Figs. 43A, 43B, and 43C is described.

*Cash register release controls*

As fully described in the above-mentioned patents, the cash register, which is motor-driven, is normally held in an unoperated condition by a clutch arm 215 (Fig. 15) pivotally mounted on a stud 216 on the side frame of the register. Clockwise rotation of the clutch arm 215 releases a clutch member 217 to the action of a spring, in a manner well known in the art, which actuates a cam 218, engaging a roller 219 on a yoke 220, mounted on the stud 221. The yoke 220 is connected to a link 222, pivoted to a bell crank 223, mounted on a stud 224, carried by the register side frame. The bell crank 223 is bifurcated to engage a stud 225 of a switch-operating arm 226, pivoted on a stud 227, carried by the machine side frame. A spring 228, connected to the bell crank 223, tends to rock the switch arm 226 counter-clockwise (Fig. 15) to maintain a motor switch CR1 (Figs. 15 and 43A) in open position by engagement of the switch arm 226 with a pivoted switch blade 229. The switch blade 229 is pivoted on a stud 230.

Rocking of the cam 218 upon release of the clutch arm 215 lowers the switch arm 226 to permit the switch blade 229 of the motor switch CR1 to be lowered into contact with a switch contact 231 to close the circuit through the cash-register-operating motor 205, as illustrated in Fig. 43A of the circuit diagram.

The clutch arm 215 is urged clockwise by a spring 232 and is normally held in the position shown in Fig. 15 by a segment 233, mounted on a stud 214. The segment 233 has connected thereto a link 234, the upper end of which is pivoted to a bell crank 235, mounted on a stud 236. The bell crank 235 is provided with a slot, into which projects a stud 237 of a link 238. The link 238 is slidably mounted on two studs 239, carried by the cash register side frame. A spring 240 urges the link 238 to the right (Fig. 15), where it is arrested by the studs 239 contacting the ends of the slots in the link 238. The right-hand end of the link 238 is slotted to engage a stud 241 on a bell crank 242, pivoted on a stud 243 on a bracket 244 on the back frame 165. The bell crank 242 is provided with a stud 245, which projects into a slot in a link 246, pivotally connected to an armature 247 of the clutch release solenoid L10 (Figs. 15 and 43A).

When the solenoid L10 is energized, the armature 247 is raised, which, through the link 246, rocks the bell crank 242 clockwise (Fig. 15) to shift the link 238 leftwardly. Leftward movement of the link 238, through the stud 237, rocks the bell crank 235 counter-clockwise (Fig. 15) to lower the link 234 and rock the segment 233 clockwise to release the clutch arm 215.

Two controls are provided to govern the energization of the solenoid L10. One control involves relay contacts K3ac1 (Fig. 43A), which are open whenever the reader and the recorder are operating and prevent any cash register operation at this time.

The other control involves the contacts CR17a1 (Figs. 14 and 43A), which are closed when the proper keys of the cash register keyboard have been operated. As is well known, and as fully described in the above-mentioned patents, the cash registers of the type to which the invention is shown applied are provided with a release shaft 250, which is rocked clockwise (Fig. 14) upon depression of certain keys on the keyboard. Secured to the release shaft 250 is an arm 251, which has pivoted thereto a link 252, slidably mounted on a stud 253, supported in the side frame of the cash register. The link 252 is provided with a contact roller 254 for closing the contacts CR17a1, which are mounted on a bracket 255, carried by the cash register side frame.

Accordingly, when the proper keys on the cash register keyboard have been operated to allow the cash register release shaft 250 to rock clockwise, the link 252 will be lowered, and the roller 254 will close the contacts CR17a1 in the circuit to cause energization of the solenoid L10 if the relay contacts K3ac1 are closed. Energization of the solenoid L10 will rock the segment from beneath the clutch arm 215 to release the clutch and close the motor switch CR1 to cause the cash register to operate through a cycle of operation.

The relay contacts K3ac1 in the energizing circuit for the solenoid L10, which are so controlled by the reader and the recorder controls as to open the energizing circuit to the solenoid L10 whenever the reader or the recorder is operating, provide a means for delaying operation of the cash register until the reader or the recorder has performed its function. During the time the reader or the recorder is operating, the data can be set up on the cash register keyboard, and the cash register release key can be depressed to cause contacts L17a1 to be closed, but the cash register will not be released for operation until the reader or the recorder has completed its operation and contacts K3ac1 have closed.

*Total-taking control switch*

As described in the above-mentioned patents, the cash register illustrated here is provided with a total-taking control lever 260. When the total lever 260 is moved out of "Add" position, contacts CR4b1 (Figs. 15 and 43B) are opened to disable the recorder to prevent punching on the tape during total-taking operations. As explained in the above-mentioned patent, the total lever 260 may be moved either clockwise or counter-clockwise out of "Add" position to condition the cash register for total-taking operations. Clockwise or counter-clockwise movement of the total lever 260 actuates a link 261, connected thereto, to rock an arm 262, secured to a shaft 263, carried by the cash register frames. Also secured to the shaft 263 is a cam arm 264, having a cam slot 265, into which projects a stud 266 on the lever 267, pivoted on a stud 268. The lower end of the lever 267 has connected thereto a link 269, the right-hand end of which is pivoted to a contact-operating arm 270, pivoted on a stud 271, mounted on the framework of the cash register. The arm 270 is provided with a roller 272, which normally holds the contacts CR4b1 in closed position.

When the total lever 260 is moved out of "Add" position, the link 261 rocks the arm 262, the shaft 263, and the cam arm 264 either clockwise or counter-clockwise (Fig. 15). Either clockwise or counter-clockwise rotation of the cam arm 264 rocks the lever 267 counter-clockwise (Fig. 15) to shift the link 269 rightwardly to rock the switch arm 270 counter-clockwise to raise the roller 272 and permit the contacts CR4b1 to open.

The contacts CR4b1 are in a control circuit (Fig. 43B) for initiating operations of the recorder. Therefore, as long as the total lever 260 is in its "Add" position and the contacts CR4b1 are closed, the operation of the recorder may be initiated. However, when the total lever 260 is moved out of "Add" position into one of its total-taking positions the contacts CR4b1 are opened, thus disabling the operation of the recorder 98 until the total lever 260 again is restored to its "Add" position. The contacts and their controls are described further in the consideration of the circuit diagram.

Reader unit restoring contacts and recorder unit starting contacts

Figure 21:
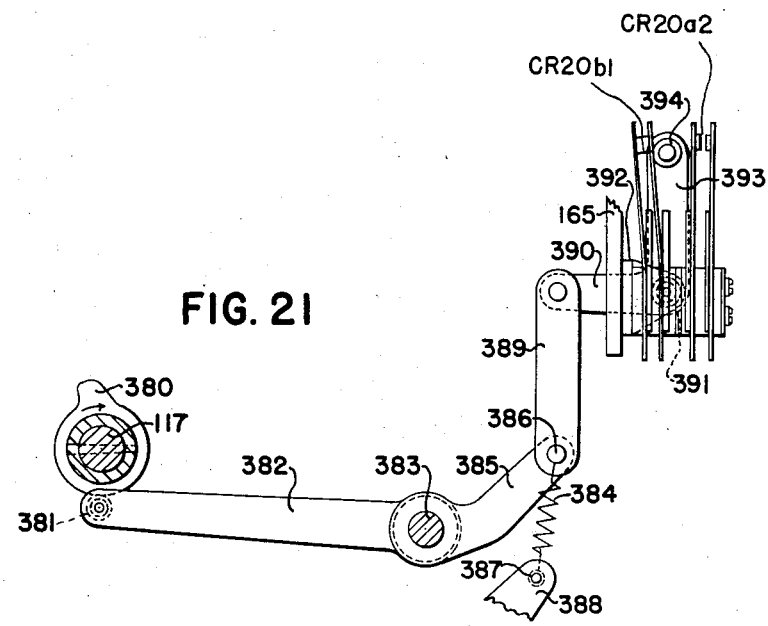
Fig. 21 is a detail view of the mechanism for controlling the time of operation of the recorder, so as to delay its operation until after the certain data has been set in the selector switches of the cash register, and for controlling the reader in certain operations of the apparatus.

Fig. 21 illustrates two contacts—namely, CR20b1 and CR20a2—and their operating means. The contacts CR20b1 (Figs. 21 and 43C) are opened at 175 degrees of operation of the cash register to release certain controls which have been set up in the reader 99 and allow the reader to be restored to home position after a reading operation. The contacts CR20a2 (Figs. 21 and 43B) are closed at 175 degrees of operation of the cash register to initiate an operation of the recorder 98 to punch the tape according to data set up on the cash register selector switches CR1a1 to CR9a1 and CR1a2 to CR9a2.

These two control contacts, CR20b1 and CR20a2, (Fig. 21) are operated by a cam 380, secured to the main cam shaft 117 of the cash register. A roller 381 on a lever 382, pivoted on a shaft 383, is normally held in engagement with the cam 380 by a spring 384. The lever 382 is hubbed to an arm 385, having a stud 386, to which one end of the spring 384 is attached. The other end of the spring 384 is attached to a stud 387 on a lug 388, carried by the base of the register. Also pivoted to the stud 386 is a link 389, the upper end of which is pivoted to a bell crank 390. The bell crank 390 is pivoted on a stud 391, carried by a bracket 392, secured to the back frame 165. An upwardly-extending arm 393, which is a part of the bell crank 390, is provided with a roller 394, normally held in engagement with the contacts CR20b1 to maintain the contacts in closed position.

After the cash register has completed 175 degrees of its cycle of operation, the cam 380 engages the roller 381 to rock the lever 382 and the arm 385 counter-clockwise (Fig. 21) to raise the link 389 and rock the bell crank 390 clockwise. Clockwise movement of the bell crank 390 shifts the roller 394 from engagement with the contacts CR20b1 and into engagement with the contacts CR20a2 to close the latter.

The cam 380 is so formed that it will maintain the contacts CR20b1 momentarily in open position and the contacts CR20a2 momentarily in closed position, whereupon the bell crank 390 restores to its normal position, in which the contacts are in the position shown in Fig. 21.

The effect of this momentary opening and closing of the two contacts is fully described in the consideration of the circuit diagram.

"#" key interlock

Contacts CR10b1, CR10ac2, CR10bc2, and CR10a3 (Figs. 22, 43A, and 43C) are provided to enable the cash register to control the operation of the reader. These contacts are operated from their normal position whenever the transaction differential has set the transaction indicator, row 1, to its "#" position, and they will remain in their operated position until the transaction indicator is moved to another position. This control is provided to prevent the reader from being operated after the cash register has been operated in a "#" operation and to maintain this control effective until the cash register has been operated in another kind of operation, as a Merchandise operation, to cause the transaction differential for row 1 to be set in a new position.

As is well known in the cash register art, the indicator-setting segment 126, when operated to set the indicator to display a transaction symbol, remains in the adjusted position at the end of the operation of the cash register until readjusted by the depression of another key in the same row to display a different symbol.

Figure 22:
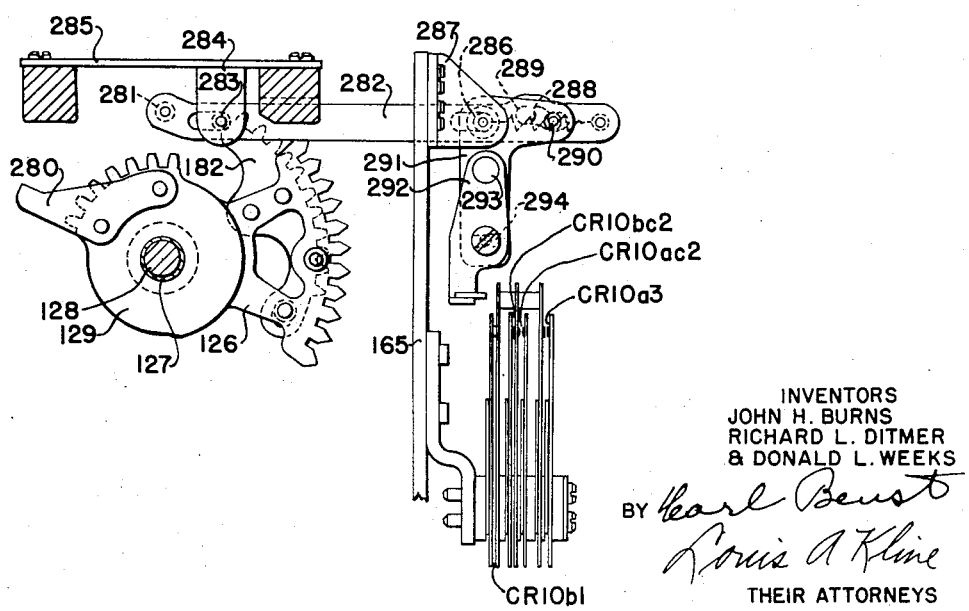
Fig. 22 is a detail view of the mechanism actuated by the transaction differential upon being adjusted to the "#" position to disable the reader.

The indicator-setting segment has secured to its side an operating finger 280 (Fig. 22). When the indicator-setting segment 126 is moved to the "9" position or to the "#" position during an operation in which the "#" key 102 is depressed, the finger 280 engages a stud 281 on the end of a slide 282, slidably mounted on a stud 283, carried by a flange 284, formed on a plate 285, mounted at the top of the cash register. The slide 282 is also slidably mounted on a stud 286, carried by a bracket 287 on the back frame 165 of the register. A spring 288 urges the slide 282 leftwardly, and its leftward movement is limited by the studs 283 and 286. The link 282 is provided with a cam slot 289, engaging a stud 290 on a bell crank 291, pivoted on the stud 286. A contact-operating arm 292 is pivotally mounted on a stud 293, carried by the bell crank 291, and the set screw 294 provides a means for adjusting the contact-operating arm 292 thereon.

When the indicator-setting segment 126 reaches its "9" position or its "#" position, and the finger 280 engages the stud 281 to shift the slide 282 rightwardly (Fig. 22), the stud 290 on the bell crank 291 is rocked upwardly to rock the bell crank counter-clockwise (Fig. 22) to cause the contact-operating arm 292 to open contacts CR10b1 and CR10bc2 and to close the contacts CR10ac2 and CR10a3. These contacts remain in this adjusted position until the transaction differential of row 1 is positioned under control of any key other than the "#" key 102 in row 1, such as a Merchandise key 101. In such latter operation, the indicator-setting segment is adjusted into a new position, whereupon the finger 280 is retracted from engagement with the stud 281, allowing the spring 288 to restore the slide 282 to its normal position, and causing the contact-operating arm 292 to be rocked clockwise (Fig. 22) to permit the contacts to restore to the positions shown in Fig. 22.

The functions of these four contacts are fully described in the consideration of the circuit diagram.

"#" key lockout

The "#" key 102 is locked against depression whenever a tag is in reading position in the reader 99. This interlock is operated by a solenoid L11 (Figs. 19 and 43C), which is energized by a circuit in the reader whenever the tag is in reading position or when the reader is being operated.

When the solenoid L11 is energized, it depresses its armature 300, which rocks an arm 301 counter-clockwise (Fig. 19). The arm 301 is secured to a short shaft 302, carried by the bracket 304, mounted on the back frame 165 of the cash register. A spring 305, stretched between a stud 306 on a bracket on the frame 304 and the end 307 of the arm 301, normally holds the arm 301 in contact with the armature 300. Also secured to the shaft 302 is an arm 308, having a stud 309, to which is attached a spring 310 to normally maintain the left end of a slot 311 in engagement with the stud 309. The slot 311 is formed in the right-hand end (Fig. 19) of a link 312 (see also Fig. 16), the left-hand end of which is pivotally mounted on one arm of a bell crank 313. The bell crank 313 is pivotally mounted on the stud 314 of a bracket 315, carried by the framework of the cash register. The bell crank 313 is provided with a stud 316, which projects into the bifurcated end of the lever 317, pivoted on the release shaft 250. The lever 317 is provided with a stud 318, engaging a finger 319 on a bell crank 327, pivoted on a stud 320, carried by the cash register framework. Also pivoted to the bell crank 327 is an interlocking slide 321, which is slidably mounted on a stud 322 of the row 1 key band, and a spring 323 normally maintains the slide 321 and the finger 319 in the normal position, wherein the finger 319 engages the stud 318. The slide 321 is provided with a locking ledge 324, which is moved beneath the pin on the "#" key 102 when the solenoid L11 is energized.

Energization of the solenoid L11 (Figs. 19 and 43C) rocks the bell crank 301 and the arm 308 counter-clockwise (Fig. 19) to pull the link 312 toward the right (Figs. 16 and 19), whereupon the bell crank 313 rocks the lever 317 clockwise and, through the stud 318, lifts the finger 319 to rotate the bell crank 327 counter-clockwise, to shift the slide 321 to position the ledge 324 beneath the pin on the key 102.

As long as the solenoid L11 remains energized, the slide 321 holds the ledge 324 beneath the stud on the key 102, thus preventing operation of the "#" key. As fully explained in the consideration of the circuit diagram, the solenoid L11 will remain energized until after the reading operation has been completed with a tag in the machine, and until a Merchandise key 101 is depressed.

Mounted on a bracket 325 (Fig. 19), carried on the bracket 304, are contacts L11b1 (Figs. 19 and 43C), which are in the energizing circuit for the solenoid L11 and are operated to reduce the current through the solenoid after the solenoid has operated. Operation of the solenoid rocks an arm 326, pivoted on the shaft 302 and adjustably connected to the arm 301. When the arm 301 is rocked counter-clockwise (Fig. 19) upon energization of the solenoid L11, the arm 326 engages the contacts L11b1 and opens a circuit which is fully described in the consideration of the circuit diagram.

Reader unit disabled by "#" key

Depression of the "#" key 102 causes the pin thereon to engage a cam edge 330 (Fig. 16) on the slide 321, thus lowering the slide and rocking the bell crank 327 clockwise. Clockwise movement of the bell crank 327 rocks the lever 317 and the bell crank 313 to shift the link 312 leftwardly (Figs. 16 and 19). The right-hand end of the link 312 is provided with a flange 331 (see also Fig. 18) for operating three contacts CR11b1, CR11bc2, and CR11ac2. These three contacts are fully described in the consideration of the circuit diagram and are used for disabling the reader when the "#" key 102 has been depressed.

Row 1 interlock

As is well known, and as described in the above-mentioned patents, an interlock is provided in row 1, which interlock is actuated by the total lever 260 to prevent depression of certain of the keys in row 1, according to the setting of the total lever. To effect this interlock, a cam 340, mounted on the total lever 260, coacts with a stud 341, carried by a lever 342, pivoted on a shaft 343. A stud 344 on the lever 342 projects into a cam slot 345 of a yoke 346. An arm 347 on the yoke 346 is provided with a stud 348, engaging a notched end of a slide 349. The slide 349 is slotted to slide on two studs 350, carried by the key frame of row 1. An interlocking slide 351, also slotted to slide on the studs 350, is provided with spaced interlocking ledges 352.

As is well known in the cash register art, movement of the total lever 260 and the cam 340 out of "Add" position, either up or down, selects certain totalizer lines for total-taking.

These movements will select, for depression, certain keys which correspond to the totalizer line selected by the total lever. In the cash register, the two slides 349 and 351 are made as a single unit. The interlocking slide 351 described herein is made as a separate unit with respect to the slide 349, so that the Merchandise keys 101 can be locked out under certain conditions independently of the total lever 260.

In the present disclosure, it is desired to lock out the Merchandise keys 101 until a "#" operation of the cash register or a tag-reading operation has taken place, to insure that "#" data has been recorded before the Merchandise keys 101 can be depressed.

When the power switch CRMS (Figs. 1 and 43A) is closed to start the various units in operation, a solenoid L12 (Figs. 17 and 43C) is energized immediately. Energization of the solenoid L12 actuates its armature 355 (Figs. 17 and 20) to rock a lever 356, mounted on the shaft 302, counter-clockwise (Fig. 17). The lower end of the lever 356 is provided with a stud 357, which projects into a slotted end of a link 358. A spring 359 maintains the slot in the right-hand end of the link in contact with the stud 357. The left end of the link 358 is pivoted to a bell crank 360, pivoted on the stud 314. The bell crank 360 is provided with a stud 361, engaging the bifurcated end of a lever 362, pivoted on the shaft 250. A stud 363 is mounted on the lever 362 and is engaged by a finger 364 of a bell crank 365, pivoted on the stud 320. The bell crank 365 is provided with a stud 366, lying in the path of a finger 367 of the interlocking slide 351. A stud 368 in the interlocking slide 351 is held in engagement with the end of the slide 349 by a spring 369.

Energization of the solenoid L12 by closing the switch CRMS actuates the armature 355 to rock the lever 356 counterclockwise (Fig. 17) to cause the link 358 to shift rightwardly (Fig. 17), under action of the spring 359, to rock the bell crank 360, the lever 362, and the bell crank 365 to cause the stud 366, engaging the finger 367, to move the interlocking slide 351 against the tension of the spring 369 to move the ledges 352 into the path of the studs of the Merchandise keys 101. The solenoid L12 remains energized until after a "#" data-recording operation, either under control of the reader or under control of the cash register in an operation when the "#" key 102 is operated, as will be fully described in the consideration of the circuit diagram. When the solenoid L12 is deenergized, a spring 370 (Fig. 17) restores the lever 356 to its normal position, which, through the stud 357, restores the link 358, the bell crank 360, the lever 362, and the bell crank 365 to home positions, thus permitting the spring 369 to restore the interlocking slide 351 to its normal position, wherein the Merchandise keys 101 can be depressed.

An arm 371, adjustably mounted on the lever 356, actuates by-pass contacts L21b1 (Figs. 17 and 43C) in the energizing circuit for relay L12. The purpose of these contacts will be fully explained in the consideration of the circuit diagram.

Two lights, 376 and 377, are mounted on the cash register cabinet (Fig. 1) to indicate to the operator various operating conditions of the machine. The light 376 will be lighted when switch CRMS has been closed and a rectifier 375 is operating properly, so that the control circuits are operable, and the other light 377, will be lighted under control of a contact in the recorder whenever the supply of tape to be punched is running low, to signal to the operator that the tape supply should be replenished. The lights 376 and 377 may be of different colors, such as green and red, in order to be more distinctive. The circuits for lighting these lights will be discussed when the circuit diagram is explained.

READER

The reader 99 is shown in Figs. 1 and 23 to 37 and is operable to read data from the cards or tags inserted therein and to control the recorder to reproduce this data on the tape. The reader also can control the operation of the cash register to coordinate its operation with that of the reader in order that data read from a tag and data taken from the cash register will be punched in proper relation on the tape.

The reader of the instant embodiment has the capacity for reading up to twenty-five columns on a card or a tag, each column of which may have perforations in any of five positions. It will be obvious from the following description that the capacity of the reader, as to the number of columns and as to the number of positions per column which may be read, is merely exemplary and that the capacity can be varied without departing from the invention.

Tag chute

As best shown in Figs. 1, 23, 24, and 27, the reader is provided with a card or tag chute 400 for receiving cards or tags to be read.

This chute is formed by an upper rear guide plate 401, a lower rear guide plate 402, a transparent front cover 403, and a pair of side guides 404 and 405. The upper edges of the guide plate 401 and the front cover 403 are cut away at 406 and 407 in the central portion to enable the tags to be pushed down far enough in the chute to insure that they will be in position to be sensed. The upper ends of the guide plate 401, the side guides 404 and 405, and the cover 403 are flared outwardly to form a throat, which facilitates the placing of tags in the chute and guides them into proper position relative to the sensing means.

The upper rear guide plate 401 of the chute is provided with twenty-five columns of holes 410 (Figs. 1, 23, and 24), each column containing five holes, which holes allow the ends of sensing pins 411 to move into engagement with the tag in reading position. The upper rear plate 401 is also provided with two larger holes 412, through which pass alining pins 413 and 414, which serve to aline the tag properly in reading position. The pins 413 and 414 also pass through alining holes 92 and 93 in the tag to lock it against removal from reading position until the operation of the reader has been completed. In a similar manner, the upper portion of the chute cover 403 is provided with twenty-five columns of holes 415 and with two holes 416 in alinement with holes 410 and 412, respectively, to allow the sensing pins, which pass through the holes in the tag, to make the full amount of movement necessary to sense the tag, and to allow the alining pins to pass completely through the holes 92 and 93 in the tag.

The upper rear guide plate 401 (Figs. 24, 31 and 32) is also notched to allow tag stops 420 and 421 and a roller 422, which operates the tag contacts SC20a1, to extend into the tag chute and to allow the tag-advancing mechanism (Fig. 30) to engage the tag and move it downwardly after it has been sensed.

The guides 404 and 405 not only form the sides of the chute but also serve to space the chute cover 403 from the guide plate 401 by a distance which is only slightly more than the thickness of a single tag, so as to allow only one tag to be in sensing position at a time.

The lower rear guide plate 402 carries three pairs of pressure rollers 425, which extend into the chute and are mounted on the plate by means of springs 426. The plate 402 is guided in position to form the lower part of the chute by inwardly-extending flanges 423 and 424 (Figs. 23 and 24) on side guides 404 and 405, respectively, and by bifurcated arms, as 427 (Fig. 23), which extend from its rear face and straddle a sleeve 522 on the shaft 428 to support the plate for movement toward and away from the chute cover 403. A lever 429, which is pivoted on a stud 430 on a bracket 430a secured to a cross bar 443 between the reader side frames, has its upper end connected to the arms 427 and has its lower end connected to a spring 431, which urges the lever 429 counterclockwise (Fig. 23) to move the plate 402 toward the chute cover 403 until the pressure rollers 425 engage the cover. The tension in the spring 431 is such that the pressure rollers 425 engage the cover with just enough force to hold the tags in position but not enough to prevent the tags from being fed downwardly in the chute.

The lower ends of the chute cover 403 and the lower rear guide plate 402, which together form the lower end of the chute, are curved to guide the tags from the chute into a tag drawer 432 (Figs. 1 and 23), which drawer is normally locked by a lock 433 and can only be removed from the reader by an authorized person.

The cabinet of the reader is formed with a sufficiently large opening 434 (Fig. 1) that the tag in reading position, as well as the last three tags which were read, can be seen, and printed data thereon can be read from the tags, if desired.

When it is desired to remove the lower three tags from the chute, the lower rear guide plate 402 can be shifted away from the chute cover 403 to allow the tags to drop by gravity through the chute. The plate 402 is shifted by manually rocking the lever 429 clockwise (Fig. 23) after the tag drawer has been removed to allow access to the lever.

*Sensing means*

The sensing means operates to read the data from the tag, column by column, while the tag remains stationary in reading position in the chute.

As explained earlier, sensing means are provided for sensing up to twenty-five columns on the tag, each column of which may contain perforations in any of five positions. Since the sensing means for reading each column on the tag is duplicated for each of the twenty-five columns, the sensing means for the various columns will be clear from a description of the sensing means for one of the columns.

The five sensing pins 411, for sensing data in a column of the tag, are arranged one above the other and are of similar construction. Each sensing pin 411 is in the form of a Bowden wire which has its forward end operating in its respective hole 410 in the upper rear guide plate 401 of the card chute and has its rear end connected to an enlarged contact control section 435 of non-conducting material, which section 435 is supported and guided for longitudinal movement in a cross bar 436, which is mounted between reader side frames 437 and 438.

Intermediate its ends, the sensing pin 411 is mounted for longitudinal movement through a front supporting cross bar 439, mounted between the reader side frames, a sheath 440, and a further supporting cross bar 441, mounted between the reader side frames, the sheath 440 having its forward end extending into the cross bar 439, its rear end extending into the cross bar 441, and its center portion supported by a plate 442, secured to the cross bar 441.

Each sensing pin 411 is urged to the left (Fig. 23) by its individual spring, as 450, which spring forms part of the contact means by which the recorder can be controlled to duplicate the data on the tag.

Figure 23:
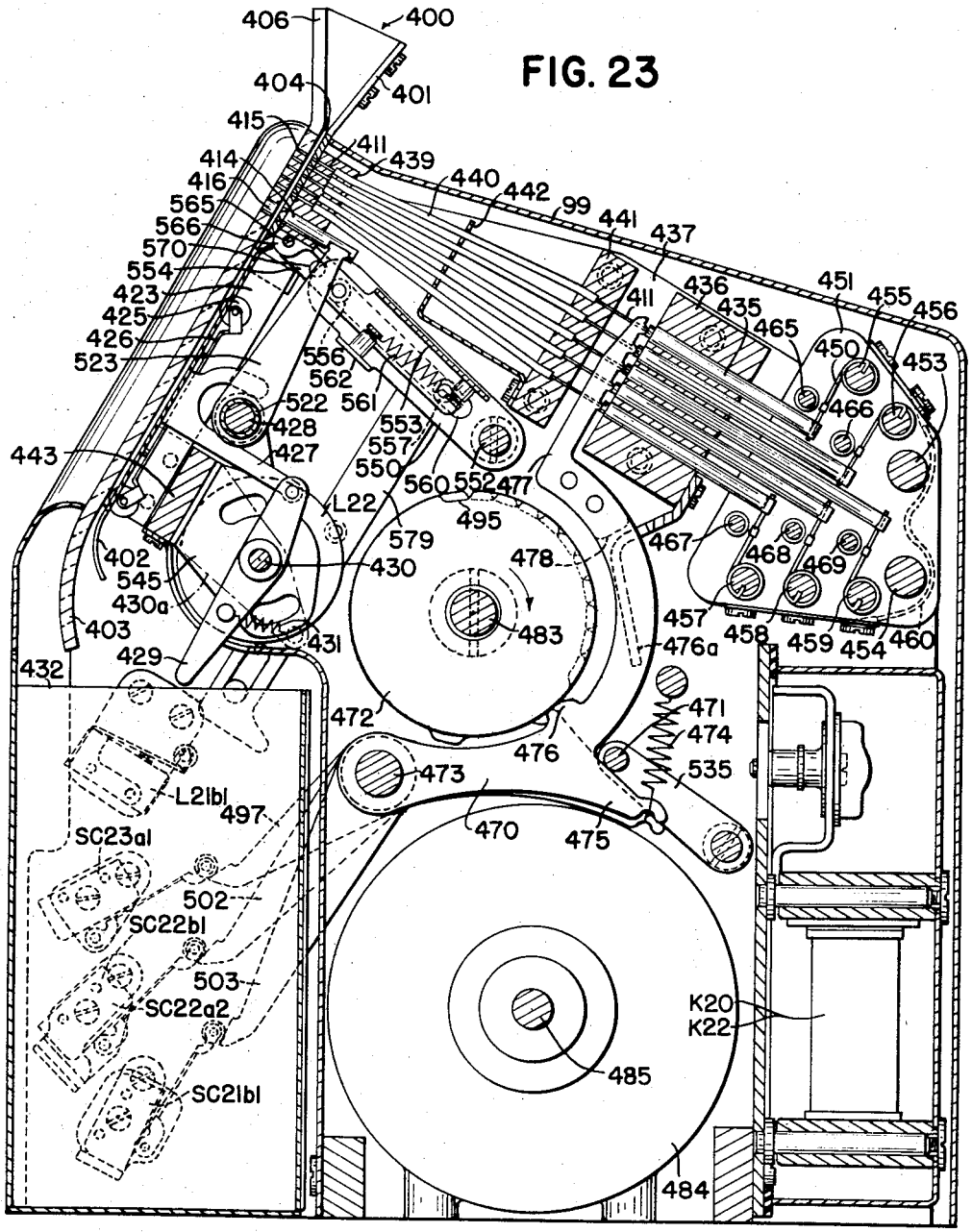
Fig. 23 is a vertical section through the reader.

The contact means is common to the sensing pins for all the columns on the tag and is shown most clearly in Figs. 23 and 27. The contact means is mounted between end frames 451 and 452, which are supported in the reader side frames 437 and 438 by means of two cross rods 453 and 454.

Supported between the end plates 451 and 452 are five input buses, 455, 456, 457, 458, and 459, one for each possible perforation in a column, which buses are electrically connected together by a strap 460.

As is clear from Figs. 23 and 27, one end of each of the springs 450 is connected to its related input bus. One spring is secured to each bus for each column on the tag; that is, there is a row of twenty-five springs secured to bus 455, each one of which will urge its related sensing pin to the left, to enable the top row of pins to sense the top row of perforations in the tag. Similarly, twenty-five springs will be mounted on each of the four other buses to urge their related sensing pins to the left.

Mounted to the left of each row of springs, and common thereto, is an output bus, the output buses 465, 466, 469, 468 and 467 being related to the top to bottom hole positions, respectively.

The springs 450 have thereon contact portions, which are in position to engage their related output buses to selectively complete circuits from the common input buses to various ones of the output buses. Hence, the springs 450 serve two functions; that is, to supply the force to move the sensing pins to the left, and also to serve as contacts in the circuits controlled by the sensing means.

The five output buses 465, 466, 467, 468, and 469 are connected to the five terminals in section 211 of the plugboard 203 on the cash register, which terminals can be connected by plugboard connectors to terminals in section 209 of the plugboard to select the punches to be operated according to the data which is read. In order to simplify the circuit diagram, the twenty-five contacts which connect an input bus to an output bus will be shown as a single contact, contacts SC25a1 representing the twenty-five contacts which connect the buses 457 and 467 when a perforation at the bottom of any column is sensed, contacts SC25a2 representing the twenty-five contacts which connect buses 458 and 468, contacts SC25a3 representing the twenty-five contacts which connect the buses 459 and 469, contacts SC25a4 representing the twenty-five contacts which connect buses 456 and 466, and contacts SC25a5 representing the twenty-five contacts which connect buses 455 and 465. Hence, contacts SC25a1, SC25a2, SC25a3, SC25a4, and SC25a5 in Fig. 43B represent the various contacts which can be controlled in the sensing of any column on the tag.

In the normal, retracted, position of the sensing pins, their front ends will be flush with the rear surface of the tag chute, and the enlarged rear portions 435, which are notched to receive the springs 450, will hold the springs out of engagement with their related output buses.

As each column of sensing pins is released to sense the tag, those sensing pins which are in positions where there are holes in the tag will be allowed to move to the left to allow the springs to engage the output buses and complete a circuit from the input bus to the output bus; while those sensing pins which are in positions where there are no perforations will be prevented from moving to the left and will keep their related springs from engaging the output buses.

The movement of the sensing pins from their retracted position to their sensing position is controlled by a series of arms 470 (Figs. 23 and 27), one for each column on the tag, which arms are controlled by a disabling yoke 471, which is common to all the arms, and by individual cams 472 of a cam line. The arms are pivotally mounted on a cross rod 473, are urged counter-clockwise (Fig. 23) by individual springs 474, which are connected to rearward extensions 475 of the arms, and are guided laterally by a comb-plate 476a, secured to the cross bar 436.

Each arm 470 is formed with a cam-engaging projection 476 and with an upwardly-extending finger 477, which engages the enlarged portions 435 of the five sensing pins for its related column. The finger 477 of the arm 470 extends along one side of the sensing pins of the column, as seen most clearly in Figs. 23 and 27, and a similar finger 478, which is secured to the arm 470, extends along the other side of the sensing pins to insure that the arm 470 will always remain in controlling position relative to the sensing pins.

The disabling yoke 471 normally extends across all the rearward extensions 475 of the arms and rocks the arms 470 clockwise to maintain the sensing pins in their right-hand positions. The yoke is rocked away from the arms at the beginning of the operation of the reader to free the arms 470 to the control of the cams 472 on the cam line.

The cam line (Figs. 23, 25, 26, 34, and 35) contains twenty-eight cams, twenty-five cams 472 for controlling the operation of the sensing means, and three cams, 480, 481, and 482, for providing additional controls for the reader, which cams are secured to a shaft 483 journaled in the reader side frames 437 and 438.

A driving motor 484, operating through a shaft 485 (Figs. 23 and 34), a clutch 486, and gears 487, 488, 489, 490, 491, and 492, drives the cam line through one twenty-eighth of a revolution clockwise (Fig. 23) each time the clutch 486, which is a single-revolution clutch, is tripped. Hence, the clutch 486 will be tripped twenty-eight times for each complete operation of the reader.

The cams 472 are formed with a notch 495 of such a length as to be opposite the projection 476 on its related arm 470 only in one of the positions of the cam line and are so proportioned that, while the projection 476 is riding on the periphery of the cam, the arm will be in position to maintain the sensing pins ineffective, but, when the notch 495 is opposite the projection 476, the arm can rock counter-clockwise to move the fingers 477 and 478 to the left to free the sensing pins for movement to the left to sense the perforations of its related column and close the required ones of the contacts SC25a1 to SC25a5.

In order to prevent arcing at the contacts SC25a1 to SC25a5 when they are opened and closed under control of the sensing means, contacts SC24a1 (Figs. 35 and 43B) are provided, which contacts close after the contacts SC25a1 to SC25a5 have been closed under control of the sensing means and open before the contacts SC25a1 to SC25a5 open. The contacts SC24a1 are controlled by a cam 494 on the clutch 486, which closes the contacts at 285 degrees and opens the contacts at 345 degrees in the revolution of the clutch.

The notches 495 on the cams 472 are arranged spirally about the shaft 483, so that in each of the first twenty-five positions of the cam line a different arm 470 will be allowed to operate to free its related sensing pins. In the instant embodiment, when the clutch 486 is tripped for the first time in a tag-reading operation, the first column at the left of the tag will be sensed; when the clutch is tripped the second time in the tag-reading operation the second column from the left of the tag will be sensed; and, as the clutch is tripped further in the reading operation, the other columns will be read from left to right.

While, in the instant embodiment, the notches 495 are so arranged about the shaft 483 that the tag is read column by column from left to right, it is obvious that, by properly locating the notches on the various cams, the columns on the tag can be read in any sequence which may be desired.

The reader can be controlled to read all twenty-five columns on the tag or any desired number of columns. This control is effected by the "end-of-tag" cam 480 on the cam line. Cam 480 is formed with a projection 496 and is so adjustable about the cam line to position the projection 496 relatively to the cam line position that, after any desired number of operations in reading a tag, the projection will rock a related lever 497 about the cross rod 473 to close contacts SC23a1 (Figs. 23 and 43C) and control the operation of the reader to inhibit further reading from the tag. The manner in which contacts SC23a1 effect their control will be explained fully when the circuit diagram is described.

The adjustment of the cam 480 to desired positions about the cam line is obtained by securing it to the cam 481 by set screws 498 and 499, which may be screwed into the proper ones of a series of threaded openings 500 around the cam 481. As shown in Fig. 26, cam 480 is set to terminate reading after twenty-three columns have been read.

The cam 481 has thereon a projection 501, which will rock its related lever 502 about the cross rod 473 to open contacts SC22a2 (Figs. 23 and 43C) and allow contacts SC22b1 to close when the cam line is in position twenty-eight, or home position.

The remaining control cam 482 has thereon a projection which will operate its related lever 503 about the cross rod 473 to open contacts SC21b1 in position twenty-seven of the cam line.

The manner in which contacts SC22a2, SC22b1, and SC21b1 are utilized to control the operation of the reader and the recorder will be explained when the circuit diagram is described.

*Motor bar*

A motor bar PB2 (Figs. 1 and 36) is provided to initiate an operation of the reader. The motor bar PB2 is formed with slots which cooperate with three studs 504 on the side frame to guide the motor bar when it is operated. A spring 505, connected between one of the lugs 504 and an ear on the bottom of the motor bar, restores the motor bar to undepressed position. When the motor bar PB2 is operated, it will close contacts PB2a1 to initiate an operation of the reader if a tag is properly in reading position and if the last preceding operation of the cash register has not been a "#" operation. Two means are provided to test whether the tag is at the reading position in the chute and whether the tag is properly in position in the chute.

Tag contacts

One of the testing means for testing whether the tag is properly in the chute includes tag contacts SC20a1, which are closed only if the tag is in reading position. As shown in Figs. 24 and 31, a roller 422, which is mounted on an arm 510, pivoted on a bracket 511, secured to the cross bar 439, extends into the tag chute in such a way that the insertion of a tag into the chute will rock the arm 510 clockwise (Fig. 31) to close contacts SC20a1.

Tag-aligning means

The other of the testing means for testing whether the tag is properly positioned in the chute utilizes the alining pins 413 and 414. If the tag is inserted improperly into the chute, so that the locating and alining holes 92 and 93 in the tag are not opposite the alining pins 413 and 414, the pins will be blocked against movement. The operating means for the alining pins is a rotary type of solenoid L20, which is adjustably mounted on a bracket 512, secured to the reader side frame 438 (Figs. 27 and 29). A stud 513 on an armature 514 extends into a slot in the lower end of a lever 515, pivoted on a stud 509 on the side frame 438. A stud 516 in the upper end of the lever 515 works in a slot in the lower end of a further lever 517, pivoted on the shaft 428. The upper part of the lever 517 is yieldably coupled to an arm 519, pivotally mounted on the shaft 428, the coupling including a spring 520, which urges the arm and the lever in opposite directions until a stud 521 on the arm engages the edge of the lever. The arm 519 is connected by a sleeve 522 (Figs. 23 and 33) to arms 523 and 524, which operate alining pins 414 and 413, respectively. The upper part of the lever 517 is urged to the right (Fig. 29) by a spring 518 and, through the arm 519 and the sleeve 522, rocks the arms 523 and 524 clockwise about the shaft 428 until a projection on the rear edge of the arm 524 engages a stop 525 (Figs. 27 and 33) on a bracket 526.

When the motor bar PB2 has closed contacts PB2a1, and the tag has closed contacts SC20a1, the solenoid L20 will be energized to rotate its armature counter-clockwise (Fig. 29), and the levers 515 and 517 will operate, through the yieldable connection with arm 519, to drive the arms 523 and 524 counter clockwise (Figs. 23, 29, and 33) about the shaft 428 to move the alining pins 413 and 414 through the alining holes 92 and 93 in the tag if the tag is properly positioned.

The arm 524 can be rocked counter-clockwise only if the tag is in proper position and the alining pins can pass through the alining holes 92 and 93 in the tag, and this counter-clockwise movement of the arm 524 is used to close contacts L20a1 and L20ac2 (Figs. 33 and 43C) and open contacts L20bc2. The upper end of the arm 524 is enlarged to form an extension 527 and is notched to receive a stud 528 in a link 529, which is pivotally connected to a contact-operating lever 529a, pivoted on a contact-supporting bracket 530a. The extension 527 lies between the link 529 and a plate 528a, which is secured to the link by the stud 528 and by another stud and retains the link 529 in operating engagement with the extension 527. The stud 528 is so located with respect to the extension 527 that the link 529 will not be moved to the left (Figs. 29 and 33) to close contacts L20a1 and L20ac2 and open contacts L20bc2 unless the alining pins have been moved through the alining openings in the tag.

If the tag is improperly positioned, then the forward movement of the pins 413 and 414 will be blocked, causing the coupling between the lever 517 and the arm 519 to yield, and the contacts L20a1, L20ac2 will remain open and the contacts L20bc2 will remain closed. Under these circumstances, the operation of the reader will not be started, and the solenoid L20 will be de-energized immediately when the motor bar is released, thereby allowing the tag to be removed in order that it might be properly inserted into the chute.

The manner in which the contacts L20a1, L20ac2, and L20bc2 exert their controls will be explained fully when the circuit diagram is explained.

Disabling yoke

When the tag reader is set into operation, the disabling yoke 471 (Figs. 23 and 37) is immediately moved away from the extensions 475 on the arms 470 by means of a rotary-type solenoid L24 (Figs. 27 and 37), which is adjustably mounted on a bracket 530, secured to the reader side frame 437. A stud 531 on the armature 532 of the solenoid works in a slot in an arm 533, secured to a shaft 534, journaled in the reader side frames 437 and 438. Also secured to the shaft 534 are a pair of arms 535 (only one shown), which support the disabling yoke 471. A spring 536, which is connected to the arm 533, urges the shaft 534 counter-clockwise (Fig. 37) to force the yoke 471 against the extensions to maintain the arms 470 in their sensing-pin-retracting positions. When the solenoid L24 is energized, it will rock its armature 532 counter-clockwise (Fig. 37) to move the disabling yoke 471 away from the extensions 475 and free the arms 470 to the control of the cams 472.

Tag stops

As explained earlier, the tag is inserted into the chute until it is stopped in proper position by a pair of tag stops 420 and 421 (Figs. 24, 27, and 32). Near the end of a tag-reading operation, it is necessary to withdraw the stops in order that the tag may be moved from tag-reading position. As is most clearly shown in Fig. 27, the stops 420 and 421 are in the form of bell cranks pivoted on the cross bar 439. One arm of the bell crank 421 projects into the tag chute and acts as the stop, and the other arm is formed with an oblique slot, which engages a stud 540 in the end of an arm 541, pinned to the shaft 428. Similarly, the bell crank 420 is formed with an oblique slot, which cooperates with a stud 542 in an arm 543, which also is pinned to the shaft 428. An operating arm 544, which also is pinned to the shaft 428, has a slot cooperating with a pin on an armature of a rotary-type solenoid L22, mounted on a bracket 545, secured to the cross bar 443, which is carried by the reader side frames 437 and 438. A spring 547 urges the arm 544, the shaft 428, and the arms 541 and 543 to move the stops into blocking position in the chute. When the solenoid L22 is energized, it will rock the shaft 428 clockwise (Fig. 32) to move the studs 540 and 542 to the rear of the slots to rock the bell cranks to remove the stops from the chute.

The arm 541 has a flange 548, which engages a switch 549 to open contacts L22bc1 and close contacts L22ac1 when the stops have been completely withdrawn from the chute.

Tag-advancing means

Near the end of the tag-reading operation, and after the stops have been withdrawn, a tag-advancing means operates to feed the tag out of reading position in the chute. The feeding of the tag from reading position pushes the lower tags downwardly in the chute and causes the lowest one to be forced out of the chute and into the locked tag drawer. The tag-advancing means, which is operated by a rotary solenoid L21, is shown in Figs. 23, 28, and 30.

Two arms, 550 and 551, are secured to a shaft 552, journaled in the reader side frames 437 and 438. A feed-pawl-supporting yoke, having a spacer plate 553 and two down-turned side flanges 554 and 555, is mounted between the arms 550 and 551 for movement longitudinally of the arms, the mounting being effected by studs 556, 557, 558, and 559 on the flanges 554 and 555, which work in slots, as 560 (Figs. 23 and 30), in the arms. A spring 561, connected between a lateral extension 562 of the arm 550 and a stud on the spacer plate 553, urges the feed-pawl-supporting yoke to the left, as seen in Figs. 23 and 30.

The flanges 554 and 555 have a shaft 565 journaled therein, which shaft has secured thereto a pair of toothed feed pawls 566 and 567, which can cooperate with a tag to feed it from reading position. The pawls have tails 568 and 569, which engage stop studs 570 and 571 in the flanges 554 and 555 to limit the clockwise movement (Fig. 30) of the pawls. A spring 572, connected between the pawl 566 and the stop 570, urges the tails to engage the stops. A pair of spacer rollers 573 and 574, loose on the shaft 565, cooperate with the chute cover 403 to determine the longitudinal movement of the yoke in the return movement of the tag-advancing means. In the normal position of the yoke on the arms 550 and 551, the rollers 573 and 574 and the pawls 566 and 567 will be spaced a slight distance from the cover 403 to allow the tag to be inserted freely into the chute.

An arm 578, secured to the shaft 552, has the upper end of a link 579 pivoted thereto. The lower end of the link 579 is provided with a slot 580, which cooperates with a stud 581 to guide the lower end of the link. A spring 582 urges the link 579 upwardly to locate the tag-advancing means in its normal, or home, position, as shown in Figs. 23 and 30.

The operating solenoid L21 for the tag-advancing means is of the rotary type and is mounted on a bracket 585 (Figs. 27 and 30) secured to the reader side frame 437. A stud 586 on the armature 587 of the solenoid works in a slot in an arm 588, pinned to the shaft 552, to cause the shaft to be rocked counter-clockwise (Fig. 30) each time the solenoid is energized.

When the shaft 552 is thus rocked counter-clockwise, the feed pawls 566 and 567 will be moved downwardly, and, since they are stopped from moving clockwise by the studs 570 and 571, their teeth will bite into the tag and carry the tag downwardly in the chute to move it out of reading position.

Near the end of the downward movement of the feed pawls, the link 579 will engage a roller 589 to operate a contact-operating lever 590 to open contacts L21b1. The control exerted by contacts L21b1 will be explained fully when the circuit diagram is explained.

Upon the deenergization of the solenoid L21, the spring 582 will return the various parts of the tag-advancing means to home position, and, in their return movement, the pawls 566 and 567 can rock counter-clockwise to allow the rollers 573 and 574 to control the position of the yoke on the arms 550 and 551 during the restoring movement of the tag-advancing means.

*Clutch*

The clutch 486, which renders the motor effective to move the cam line through one twenty-eighth of a revolution, is tripped by a clutch solenoid L23 (Figs. 34 and 35), which, when energized, removes a blocking member 591 from in front of a tooth 592 on the clutch to allow the clutch to make a single revolution. The circuits for energizing the solenoid L23 will be fully described when the circuit diagram is described.

A suitable chamber is provided in the reader for housing control relay K20 and reset relay K22, which are provided to coordinate the operation of the reader with the operation of the cash register and the recorder. Also provided in the reader are suitable receptacles for receiving plugs on the ends of the cables which connect the cash register, the reader, and the recorder for joint operation.

The operation of the various components of the reader and the relation and the intercontrols between the reader, the register, and the recorder will be made clear when an operation of the entire apparatus to record the various data of a transaction is explained in connection with a description of the circuit diagram.

RECORDER

The recorder which forms a part of the apparatus is shown in Figs. 1 and 38 to 42 and is operable to punch the tape with data under control of program control means in the recorder, under control of the reader, and under control of the cash register. The recorder can in turn control the operation of the reader and the cash register so that they will exert their controls at the proper time. Inter-controls between the recorder, the reader, and the cash register prevent the sending of further data to the recorder if the recorder has not recorded data previously sent thereto.

Figure 38:
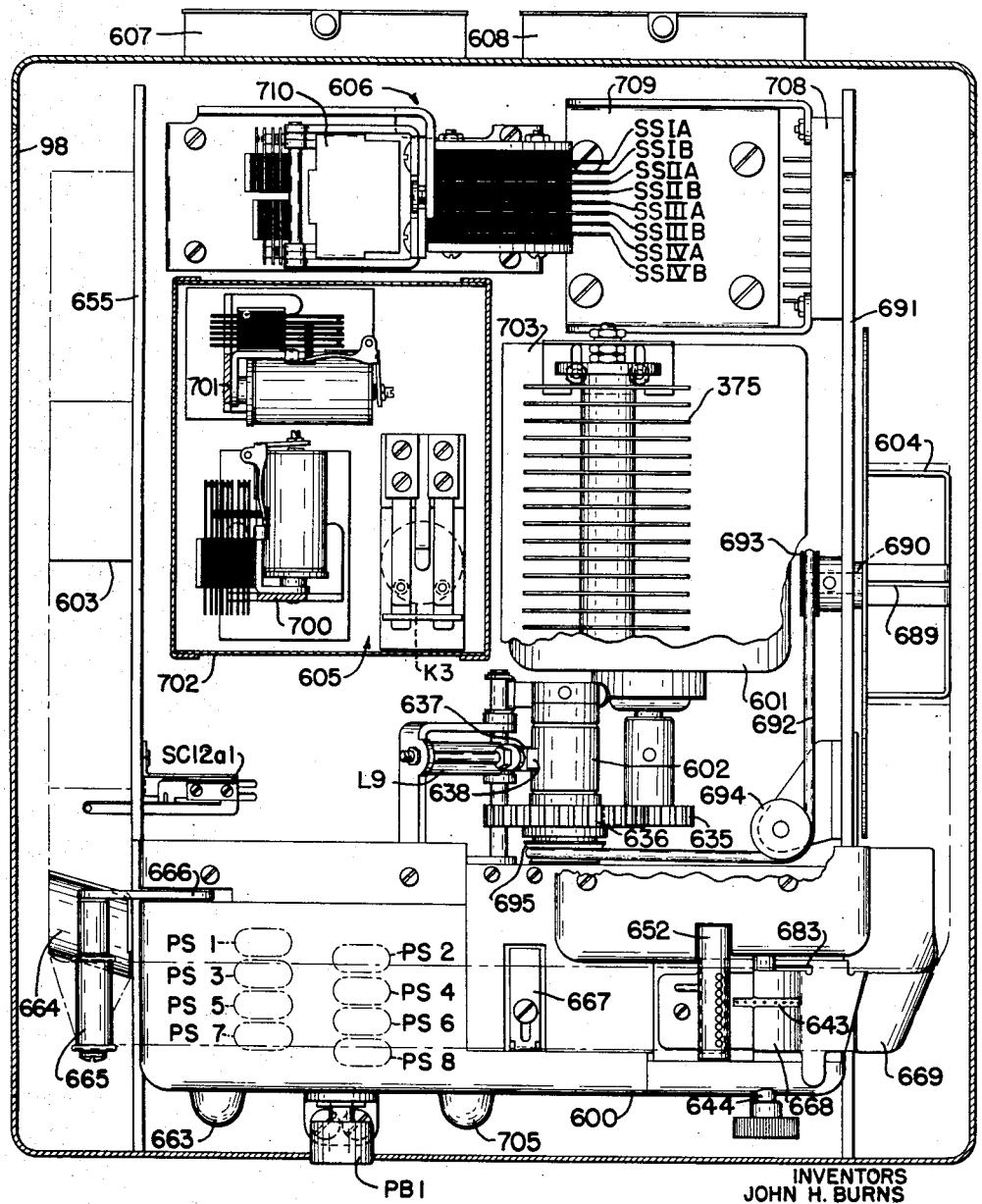
Fig. 38 is a top plan view of the recorder with the cabinet removed and with the wiring and certain parts of the recorder omitted in order that other parts may be seen more clearly.

As shown most clearly in Fig. 38, the recorder includes a punching mechanism 600; a motor 601, for driving the punching mechanism; a clutch 602, for connecting the motor to the punching mechanism; a tape-supporting arbor 603, on which a supply of tape can be mounted; a take-up reel 604, on which the punched tape can be wound as it is punched; a control relay section 605, which houses control relays used to coordinate the operation of the cash register, the reader, and the recorder; and a programming means 606, including a stepping switch and plugboard for providing the various programs or punching sequences necessary to coordinate the recording of data in proper sequence on the tape under control of the reader and the cash register.

The recorder is provided with two receptacles, 607 and 608, in which plug connectors on cables which connect the recorder to the cash register and to the reader can be inserted.

A Leader Advance push button PB1, which is provided at the front of the recorder, is effective, when operated, to cause the recorder to operate and perforate the tape with the Leader Advance pattern of perforations. The manner in which the Leader Advance push button PB1 controls the operation of the recorder will be fully explained when the circuit diagram of Figs. 43A, 43B, and 43C is described.

*Punching Mechanism*

The punching mechanism, which is shown in Figs. 38 and 39, is a tape-punching mechanism of the type shown in the patent to Francis E. Hamilton et al., No. 2,540,029.

The punching mechanism includes nine punches 610 for punching the rows of perforations across the tape, one for each of the eight channels on the tape, which are used in combinations to encode data, and one for punching the feed holes.

Fig. 3 shows a fragment of the tape in which an End-of-Frame symbol and the digits "0" to "9" have been perforated and in which a Leader Advance portion has been punched.

The End-of-Frame symbol is used to indicate the end of the information pertaining to the sale of an article of merchandise in order to separate the various bits of information carried by the tape. As explained earlier, the symbols and numbers above the tape in Fig. 3 correspond to the data punched on the tape, and the numbers at the side of the tape identify the channels across the tape.

Each operation of the punching apparatus, whether punching data or a Leader Advance pattern on the tape, causes a feed hole to be perforated in the tape. These feed holes assist in feeding the tape through the punching apparatus and also through the sensing means which analyzes the tape.

The manner in which the punches are selected and operated will now be explained with reference to Fig. 39. Each punch 610 is pivotally connected to the right end of an actuating lever 611, which is pivoted intermediate its ends on a rod 612 in an actuating frame 613. The right ends of the levers 611 are guided in a comb plate 614 and are urged downwardly by springs 615.

The actuating frame 613 is pivoted at 616 and has rollers 617, which engage cams on a cam shaft 618 to rock the actuating frame 613 counter-clockwise from home position and then back to home position to raise and lower the rod 612, upon which the actuating levers 611 are pivoted.

The effectiveness of the actuating levers to operate the punches is controlled by a plurality of magnetically-controlled punch-selecting levers 619, which are pivoted on a rod 620, carried by a bracket 621, and which are urged clockwise by springs 622. The selecting levers 619 are normally retained in their retracted, or non-effective, position, as shown in Fig. 39, by notches in the armatures 623 of punch-selecting magnets PS1 to PS8. When the lever is in its retracted position, it is out of engagement with the left end of the actuating lever 611, and this end is free to rise when the frame 613 raises the rod 612, causing the actuating lever 611 to pivot about its right end, the right end of the actuating lever being loaded by the spring 615. In this operation, the punch 610 will not be operated to punch the tape.

When a punch-selecting magnet PS1 to PS8 is energized, it moves its armature 623 away from the punch-selecting lever 619, freeing the lever 619 for clockwise movement by the spring 622 until the end of the selecting lever engages over the left end of the actuating lever 611 to prevent the left end from rising when the actuating frame 613 raises the rod 612. Since the left end of the actuating lever is positively held by the punch-selecting lever against upward movement, the spring 615 will yield when the frame 613 is rocked, and the right end of the actuating lever 611 and the punch 610 will be forced upwardly to perforate the tape. One or more punch-selecting magnets may be energized in each punching operation according to the encoding of the symbol or numeral being punched.

Each of the selecting levers 619 has a forwardly-extending portion 625, with which a locking plate 626 can engage. The plate 626 is carried by a lever 627, which is pivoted on a rod 628 and is operated by a cam on the shaft 618 to lock the levers from 90 degrees to 230 degrees of the operation of the cam shaft 618, the actual punching portion of the operation of the punching mechanism. When operated, the plate 626 engages the forwardly-extending portions 625 of the selecting levers to lock those levers in normal position which have not been released by the punch selector magnets and lock those levers in moved position which have been released to select their related punches for operation.

The forwardly-extending portions 625 of those levers which have been released and have rocked downwardly will engage a restoring plate 629. The plate 629 is pivoted on the rod 620 and is rocked counter-clockwise by a cam-actuated arm 630 near the end of the punch operation. In order to insure that the selecting levers will be properly restored to the control of the punch-selecting magnets PS1 to PS8, the restoring plate 629 provides a slight overthrow movement to the levers, and one of the levers engages a flange 631 on one arm of a bail 632 to rock the bail clockwise, which bail forces all the armatures away from the magnets and into engaging relation with the selecting levers.

Since a feed hole is punched in each operation of the machine, regardless of the selection of punches by the magnets, the punch-actuating lever for the feed hole punch has its left end blocked against upward movement at all times. An arm 633, which is secured to the bracket 621, extends over the end of the actuating lever to cause the lever to force the punch upwardly in each operation of the punching apparatus.

The driving means for the punching mechanism is shown in Fig. 38. The motor 601, which is constantly rotating whenever the recorder is operable, is connected by gears 635 and 636 to the input of clutch 602, which, when tripped, will connect the drive to the cam shaft 618 of the punching mechanism to cause the cam shaft to make one revolution. A punch clutch trip magnet L9 is provided and, when energized, will remove a block 637 from a projection 638 on the clutch to allow the clutch to operate to drive the punching mechanism.

The punch clutch trip magnet L9 is energized each time one or more of the punch-selecting levers 619 is released. A bail 639 (Fig. 39) extends across the selecting levers 619 and is carried by a pair of arms 640 pivoted on the rod 620. One of the arms is formed with an extension 641, which is connected by a link 642 to operate contacts SC7a1. When any one of the punch-selecting levers 619 is rocked, upon its release by its related armature 623, it will rock the bail clockwise to close the contacts SC7a1. This will energize the clutch trip magnet L9 to render the clutch effective to connect the motor to the cam shaft 618 to drive it through one revolution.

A tape-feeding pin-wheel 643 (Fig. 38) is mounted on a shaft 644 (Fig. 39) and has, in its periphery, pins which engage the feed holes in the tape to advance the tape after it is punched, the pin-wheel being driven by a pawl-and-rachet drive from a lever 645 (Fig. 39), which is rocked by a cam on the cam shaft 618. A detent wheel 646, also mounted on the shaft 644, cooperates with a roller 647 on a lever 648 to accurately position the pin-wheel 643.

An extension 650 on the locking-plate-actuating lever 627 is connected by a link 651 to the contacts SC6b2 and SC6a1. At 90 degrees in the operation of the punching mechanism, when the locking plate 626 is rocked to lock the selecting levers 619 in position, contacts SC6b2 will be opened, and contacts SC6a1 will be closed. These contacts will remain in this condition until 230 degrees of the operation of the punching mechanism, when the lever 627 is rocked to unlock the punch-selecting levers, at which time contacts SC6b2 will be closed, and contacts SC6a1 will be opened. The controls exerted by contacts SC6a1 and SC6b2 will be explained fully when the circuit diagram of Figs. 43A, 43B, and 43C is explained.

The particles of tape which are removed from the tape as perforations are made are guided by a chute 652 to a drawer 653 (Fig. 1), which can readily be removed from the recorder.

*Tape-handling means*

The various means for handling the tape in the recorder are seen in Figs. 38, 39, and 41.

The tape-supporting arbor 603 is secured to a side frame 655 of the recorder and is smaller than the inside diameter of the core 656 of a roll of tape. Since the arbor 603 does not rotate, the friction between it and the inside of the core provides enough drag on the tape to maintain the proper tension on the tape as it is supplied to the punching mechanism.

A lever 657 (Fig. 41), pivoted on a bracket 658, secured to the cabinet 659 of the recorder, is urged counter-clockwise (Fig. 41) by a spring 660 to maintain a roller 661 on the end of the lever 657 in contact with the roll of tape on the arbor. The roller 661 will descend as the diameter of the roll of tape on the core decreases, allowing the lever 657 to rock counter-clockwise until, when the roller 661 reaches the position shown in dot-and-dash lines, a bracket 662 on the lever closes the contacts SC12a1, which are mounted on the side frame 655. Contacts SC12a1 close a circuit to the red signal light 377 on the cash register and to a similar signal light 663 on the recorder, to provide a warning signal to the operator to indicate that the tape supply is low.

The tape is guided from the bottom of the supply roll, under a guide plate 664 (Fig. 38), over a roller 665 on a tension control lever 666, under a tape feeler 667, through the punching section of the punching mechanism, over the pin-wheel 643, and under a cooperating pressure plate 668, around a guide 669 to the take-up reel 604.

The tension control arm 666, the tape feeler 667, and the pressure plate 668 cooperate to open contacts SC5b1 in the circuit to the punch clutch trip magnet L9 to prevent an operation of the punching mechanism under the following conditions, which would contribute to an improper punching of the tape.

The tape feeler 667 is carried by an arm 675, which is pivoted on a stud 676. With a supply of tape in the punching mechanism, the feeler 667 will be supported by the tape; but, as soon as the tape breaks or the end of the tape passes the feeler, the feeler will drop downwardly and rock the arm 675 counter-clockwise (Fig. 39) about the stud 676. A link 677 connects the arm 675 to an arm 678 of a yoke pivoted on a stud 679, the other arm, 680, of which yoke is connected by a link 681 to the contacts SC5b1. A spring 682 normally urges the yoke counter-clockwise to maintain the contacts SC5b1 closed. When the arm 675 rocks counter-clockwise, it will pull the link to the right (Fig. 39) and will rock the yoke clockwise to open the contacts SC5b1.

The contacts SC5b1 are also opened when the pressure plate 668 is moved away from the pin-wheel 643. The pressure plate 668 is mounted on a lever 683, pivoted on a stud 684. A link 685 is connected to the lever 683 and has a pin-and-slot connection with the arm 675, so that, whenever the lever 683 is rocked to move the pressure plate away from the pin-wheel, the link 685 will rock the arm 675 clockwise to raise the feeler 667 above the tape. The clockwise rocking of the arm 675 will pull the link 677 to the right and rock the yoke to open the contacts SC5b1.

A further control of the contacts SC5b1 prevents punching if there is too much tension on the tape and improper punching would result. The roller 665 is supported at the upper end of the lever 666, which is pivoted on the stud 679 and is formed at its lower end with a yoke 686, which straddles the arm 678. If the feeding of the tape from the storage reel becomes blocked and the feeding of the tape by the pin-wheel 643 continues, the tension on the tape will be increased and will shift the roller 665 to the right (Figs. 38 and 39), rocking the lever 666 clockwise. The yoke 686 will rock the arm 678 and its connecting arm 680 clockwise to open the contacts SC5b1. As soon as the tension has been relieved, the spring 682 will return the arms 680, 678, and 666 to their normal position and will allow contacts SC5b1 to reclose.

After the tape has been punched, it passes around the guide plate 669 and around the under side of the take-up reel 604, which reel is slotted at 689 to receive the end of the tape. The take-up reel is mounted on a shaft 690 journaled in the recorder side frame 691 and is yieldably driven by a belt 692, which runs over a pulley 693 on the shaft 690, over a pair of guide pulleys 694, and over a driving pulley 695 on the punching mechanism cam shaft 618 and gives the reel an increment of movement each time the punching mechanism operates. The tension in the belt 692 is such that the take-up reel will be driven with enough force to take up the tape as it is punched but will not apply sufficient force to the tape to pull the tape improperly through the punching mechanism.

The tape, therefore, will be pulled from the supply roll as needed by the punching mechanism and will be wound on the reel 604 as it is punched.

Control relay section

The control relay section 605 houses the relay K3, which interlocks the cash register and the reader and the recorder to prevent the cash register from being operated while the reader and the recorder are operating, and also houses several relay racks 700 and 701, which support the control relays K1, K4, K5, K8, and K9, which are shown in the circuit diagram, Figs. 43A, 43B, and 43C. A shielding dust cover 702 surrounds the relays of the relay section.

The D. C. operating power for the control circuits, including the relays K1, K4, K5, K8, K9, K20, and K22, is obtained from the rectifier 375, which is mounted on a supporting platform 703 above the motor 601.

Whenever operating power is properly supplied to the control circuits, a green light 705 on the front of the recorder is lighted. This light corresponds to the light 376 on the cash register and serves to indicate to the operator that the apparatus is in operating condition.

Programming means

Figure 42:
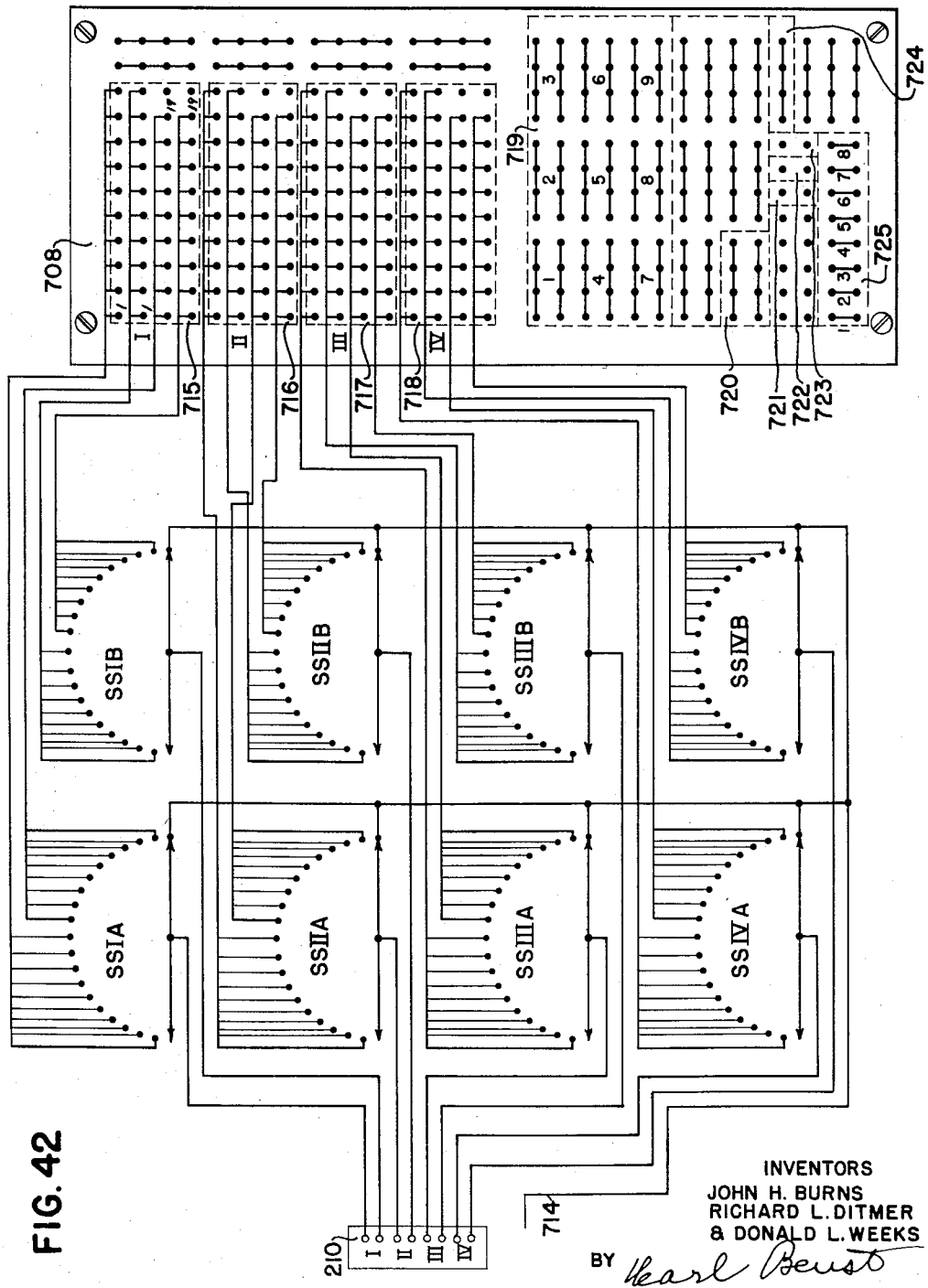
Fig. 42 is a schematic wiring diagram showing the connections between the various levels of the stepping switch and the plugboard.

The programming means 606 is shown particularly in Figs. 38, 40, and 42 and includes a stepping switch 706, mounted on a supporting bracket 707, secured to the base of the recorder, and a plugboard 708, which is also mounted on a bracket 709, secured to the recorder base.

The stepping switch is an eight-level twenty-position switch having a stepping magnet SS1 and the usual wiper driving means, which is operated by the magnet armature 710 and is conditioned when the magnet is energized, and is operated and causes the wipers to be advanced when the magnet is deenergized. A pair of cams 711 (Fig. 40), which are secured to the wipers to rotate therewith, cooperate with Off-normal contacts SS1a4 and allow these contacts to be closed in all positions of the stepping switch except the home position. The armature 710 also operates two banks of contacts including contacts SS1a1 and SS1a2, which are closed when the magnet SS1 is energized; and SS1b3, which are opened when the magnet is energized (see also Figs. 43A and 43B). The manner in which these contacts exert their control will be explained when the circuit diagram, Figs. 43A, 43B, and 43C, is described.

The eight levels of contacts of the stepping switch are used to obtain the necessary controls for four programs, each program being capable of providing up to eighteen steps in a punching sequence. Two levels of the switch are required for each program, the levels SSIA and SSIB being used for program I, levels SSIIA and SSIIB being used for program II, etc.

As shown most clearly in the schematic wiring diagram of Fig. 42, the wipers for levels SSIA and SSIB are connected to the terminals in the portion of section 210 of the cash register plugboard 203 which is related to program I. Similarly, the wipers for levels SSIIA and SSIIB, SSIIIA and SSIIIB, and SSIVA and SSIVB are connected to the terminals in the respective portions of the section 210 of the plugboard which are related to programs II, III, and IV.

The first nineteen contacts of levels SSIA and SSIB are individually connected to terminals in section 715 of the recorder plugboard 708 to enable the circuit to be completed to the various terminals in sequence as the stepping switch wiper is advanced over its related bank of contacts. Similarly, the contacts of levels SSIIA and SSIIB, SSIIIA and SSIIIB, and SSIVA and SSIVB are individually connected to sections 716, 717, and 718, respectively, of the plugboard 708. The twentieth contacts of the several levels are connected together to a conductor 714, which is used to control a circuit to initiate the stepping of the switch from its home position, as will be explained when the circuit diagram of Figs. 43A, 43B, and 43C is described.

The plugboard 708 has a further section 719, containing groups of terminals which are connected to the commons of the selector switches CR1a1—CR1a2 to CR9a1—CR9a2 related to rows 1 to 9 of the cash register. By suitably connecting terminals in sections 715 to 718 to terminals in section 719 by plugboard connectors, any desired number of the selector switches of the cash register can be made effective to control the recorder in any desired sequence as the stepping switch is stepped through its various positions, as will be fully explained when the circuit diagram of Figs. 43A, 43B, and 43C is explained.

A section 720 of the plugboard 708 contains a plurality of terminals which are connected to the contacts of certain control relays to enable the End-of-Frame symbol to be recorded under cash register control.

A section 721 of the plugboard 708 contains a pair of terminals which are connected to the contacts of control relays to enable the End-of-Frame symbol to be recorded under control of the reader at the proper time in a program.

A section 722 of the plugboard contains a pair of terminals which are connected to contacts of a control relay to enable a "#" symbol to be recorded under control of the reader at the proper time in a program.

A section 723 of the plugboard contains a pair of terminals which are connected to circuits for coordinating the operation of the reader with other apparatus during a program.

A section 724 of the plugboard contains a plurality of terminals which are connected together and to a circuit for causing the stepping switch to be reset to home position.

A section 725 of the plugboard has eight sets of contacts which are directly connected to the corresponding punch selector magnets PS1 to PS8 to enable data to be punched directly under control of the program control means merely by connecting terminals in sections 715, 716, 717, and 718 by plugboard connectors to terminals in section 725 according to the coding of the data to be punched in the various positions of the stepping switch.

The remaining terminals of the plugboard are connected together in groups to supply buses which may be used to expand the capacity of the other sections as desired.

The manner in which the various sections of the plugboard are interconnected and exert their controls in building up programs will be explained fully when the circuit diagram is described.

*Circuit diagram*

The circuits involved in coordinating the operations of the cash register, the reader, and the recorder units of the apparatus are shown in Figs. 43A, 43B, and 43C. In these figures, certain switches which are mere duplicates of others, as the differentially-controlled selector switches CR3a1—CR3a2 to CR8a1—CR8a2, certain levels of the stepping switch, and certain portions of the plugboards, have been omitted, as their operation is substantially the same as that of the ones shown and will be clear from the explanation of the operation of the ones which are shown.

In order that the explanation of the circuits will be more clear, they will be described as they function in preparing the apparatus for operation and in carrying out typical operations of the apparatus. In this explanation, it will be assumed that the cash register, the reader, and the recorder have been previously operated through a complete transaction and are in home condition, ready to receive the entries of a new transaction.

Power is turned on by closing the main power switch CRMS (Fig. 1), which is located on the cash register cabinet. The operation of the switch CRMS closes a circuit to make the usual 110 volts 60-cycle A.C. available to the cash register motor 205, the reader motor 484, and the recorder motor 601 and, through the rectifier 375, to supply D.C. operating potential to the control circuits over conductors 800 and 801.

The application of operating potential to conductors 800 and 801 immediately causes the "operate" lamps 376 and 705 on the cash register and on the recorder, respectively, to light to indicate that operating potential is being supplied to the control circuits, putting the apparatus in condition for operation. The tape supply indicator lights 377 and 663 on the cash register and on the recorder, respectively, will also light if the supply of tape is low and contacts SC12a1 in the recorder have been closed.

The application of operating potential to conductors 800 and 801 also causes relay K3 to be energized over relay contacts K1bc3, the normally closed contacts PB1bc1 of the Leader Advance push button PB1, and over relay contacts K22bc4. The energization of relay K3 opens relay contacts K3bc1 to interrupt the circuit to the reader and recorder motors 484 and 601 and closes relay contacts K3ac1 in the circuit to the clutch release solenoid L10 in the cash register, so that the cash register can be tripped for operation if desired. Hence at this time the cash register is made ready, and the reader and the recorder are disabled.

The energization of relay K3 also closes contacts K3ac2 (Fig. 43B) in the "start record" circuit and opens contacts K3bc2 (Fig. 43A) to open a shunt circuit from across a 27,000-ohm resistor 805, which is connected in series with a 60-microfarad filter capacitor 806 between the conductors 800 and 801. The removal of the shunt from across the resistor 805 allows the resistor to become effective with the capacitor 806 to reduce the voltage between conductors 800 and 801 during standby operations when the reader and the recorder are not being operated.

Immediately upon the application of operating potential to the control circuits, a circuit is effective over indicator-controlled contacts CR10bc2 in the cash register (Fig. 43C), which contacts are closed at this time, since the transaction indicator in row 1 is out of "#" position, and over relay contacts K20bc6 to energize the solenoid L12, which operates the interlocking slide 351 to lock the Merchandise keys against depression. The locking of the Merchandise keys insures that a "#" recording operation, either under control of the cash register or under control of the reader, must be made before a Merchandise recording operation can be made under control of the cash register.

When solenoid L12 operates, it opens contacts L12b1 to remove a shunt from across the 850-ohm resistor 807, thereby allowing the resistor to become effective to reduce the current through the solenoid during the time it is operated.

The apparatus is now in condition to record the "#" data from the cash register or the reader as the first step in recording the data for the transaction.

If the transaction is the first one to be recorded on the tape, then it will be necessary to prepare a leader or run-in length of tape to be used in introducing the tape in an apparatus for reading and utilizing the data recorded on the tape. The leader section of the tape is identified by special Leader Advance code perforations on the tape, which, in the embodiment being described, will consist of perforations in channels 1 through 6 across the tape in addition to the feed holes.

The cash register and the reader are not involved in the preparation of the leader section of the tape, which is produced by the operation of the recorder alone when the Leader Advance push button PB1 (Fig. 43A) is operated, to open contacts PB1bc1 and close contacts PB1ac1.

The opening of contacts PB1bc1 deenergizes relay K3, which in turn opens contacts K3ac1 to interrupt the power supply to the clutch release solenoid L10; opens contacts K3ac2 in the cash-register-controlled "start record" circuit; closes contacts K3bc1 to supply operating power to the recorder motor 601; and closes contacts K3bc2 to shunt out resistor 805 and increase the potential supplied across conductors 800 and 801.

The closing of contacts PB1ac1 will complete a circuit over relay contacts K1bc3 to energize relay K8, which will close contacts K8a2 to K8a7 (Fig. 43B) to complete circuits from conductor 800 over relay contacts K1bc3 to the punch selector magnets PS1 to PS6 related to channels 1 to 6. The release of the punch selecting levers by the operation of the punch selector magnets causes the bail 639 to close contacts SC7a1 to energize the punch clutch trip magnet L9. This will cause the punching mechanism to cycle and the tape to be perforated in channels 1 to 6 with the desired code. The punching will continue as long as the Leader Advance push button PB1 is operated. When the push button is released, relay K3 will be reenergized and relay K8 will be deenergized.

In order to prevent erroneous punching, which might occur if the Leader Advance push putton PB1 were operated only momentarily and not long enough to insure proper operation of the punch selector magnets, relay K8 closes a holding circuit for itself over contacts K8ac1 and SC6b2, which remains closed until 90 degrees of the operation of the punching mechanism, thereby maintaining relay K8 operated until punch selection has taken place, even though the push button PB1 may have been released.

It is to be noted that the six-hole Leader Advance code is merely the one used in the exemplary embodiment and that any other code may be used merely by having the necessary ones of the contacts of relay K8 close circuits to the proper punch selector magnets, or, if no code punching is required, then relay K8 can close a circuit directly to the punch clutch trip magnet L9, which will cause the punch to operate to feed the tape through the recorder and punch only feed holes in the tape.

With a proper leader on the tape, the apparatus is now ready to handle the recording of a transaction in which the "#" data is read from a tag by the reader and the related amount and other data are obtained from an operation of the cash register. In this operation, the tape will first be punched with an End of Frame symbol to indicate that the previous transaction recorded on the tape, if any, has been completed, and then the tape will be punched with a "#" symbol to identify that the following data is "#" data. These two symbols are obtained by proper programming of the reader and recorder operations. After the "#" symbol has been punched, the data is read from the tag and punched on the tape to complete the "#" data portion of the transaction. The reader then signals the cash register, which is operated in a Merchandise operation to set up the amount and other sales data related to the transaction. The programming of the punching of this data is such that the Merchandise symbol is next punched on the tape, followed by the data set on rows 9, 8, 7, 6, 5, 4, 3, and 2 of the cash register keyboard, in that order. When the punching of the data from the cash register takes place, certain controls become effective to cause the reader to return to home position, and the apparatus is ready to record another transaction.

The first step in the recording of the data of the transaction is to place the tag in the reader until the tag engages the tag stops. In this position, the tag will cause contacts SC23a1 (Fig. 43C) to close in a circuit from conductor 800, over indicator-controlled contacts CR10bc2 of the cash register, which are controlled by transaction indicator for row 1 and are closed in all positions except the "#" position of the indicator, over "#"-key-controlled contacts CR11b1 in the cash register, which are controlled directly from the "#" key in the transaction row 1 and are closed except when a "#" key is depressed, over point 809, contacts SC20a1, point 810, and reader-controlled contacts SC21b1, which are closed until the twenty-seventh operation of the reader, to point 811, where it branches, one branch going over closed relay contacts K22bc3 to the "#" key lock-up solenoid L11, and the other branch going to the reader motor bar switch PB2a1 to condition the motor bar circuit so that an operation of the motor bar can initiate a tag-reading operation.

The operation of the solenoid L11 opens contacts L11b1 to remove a shunt from across the 850-ohm resistor in series with solenoid L11 to allow the resistor to become effective to reduce the current through the solenoid while the solenoid remains energized.

It is to be noted that the insertion of the tag into the reader immediately causes the "#" key of the cash register to be locked up, and, since the Merchandise key has already been locked up, the cash register cannot be operated to enter "#" data or Merchandise data at this time. The other keys in the transaction row may be operated to cause cash register operations which may or may not require punching of the tape, depending upon the data desired on the tape in the particular system in which the apparatus is to be used.

With the tag in place in the reader, the next operation is to operate the motor bar PB2 of the reader. This closes contacts PB2a1 and continues the circuit from point 811 over the indicator-controlled contacts CR10b1 of the cash register, which are controlled by the transaction indicator and are closed in all positions except the "#" position, and over the "#"-key-controlled contacts CR11bc2 in the cash register, which are controlled directly from the "#" key in the transaction row of keys and are closed except when a "#" key is depressed, to the alining pin solenoid L20, which operates and moves the alining pins forward to engage the tag.

If the tag is improperly positioned and the alining pins cannot pass through the holes 92 and 93, contacts L20a1, L20ac2 will not be closed, and contacts L20bc2 will not open. This will prevent the reader from operating, and the tag can be removed and can properly be located in the chute.

When the tag is in proper position, the alining pins can pass through the locating holes 92 and 93 in the tag to properly aline the tag relatively to the sensing means. The pins will also serve to lock the tag in reading position in the reader to prevent premature removal of the tag from the chute. The movement of the pins into the holes in the tag will allow contacts L20a1 and L20ac2 to close and will cause contacts L20bc2 to open.

Contacts L20bc2 interrupt the circuit to the tag advance solenoid L21 (Fig. 43C) to prevent any tag-feeding operations while the alining pins are in the holes in the tag.

Contacts L20ac2 prepare a circuit from point 809 over contacts L21b1 to the tag stop arm solenoid L22, which circuit will be completed when either relay K22 or K1 operates.

Contacts L20a1 complete the circuit from point 811 over relay contacts K22bc3 to the control relays K20 and K9, causing them to operate. Relays K20 and K9 prepare the reader and the recorder for a tag reading operation.

When relay K20 operates, it operates its various contacts as follows:

Contacts K20a7 close and complete a holding circuit for solenoid L20 from point 810 to maintain the solenoid energized even after the motor bar has been released.

Contacts K20a4 close a holding circuit for relays K20 and K9 and the "#" key locking solenoid L11, which circuit extends from conductor 800 over cash-register-controlled contacts CR20b1, which remain closed until 175 degrees in the cycle of operation of the cash register and reclose at 200 degrees in the cycle of cash register operation. This holding circuit maintains relays K20 and K9 and solenoid L11 energized after the reader motor bar PB2 has been released and until a cash register operation takes place following a tag-reading operation. This circuit, by maintaining the "#" key locked, also insures that a "#" operation of the cash register cannot immediately follow a tag-reading operation.

Contacts K20ac6 close a circuit over relay contacts K22bc1 to energize disabling yoke solenoid L24 to free the sensing pin control arms 470 to the control of the cam line.

Contacts K20bc6 open to deenergize solenoid L12 to unlock the Merchandise key, thereby enabling the keys of the cash register to be operated to set up data for a Merchandise operation at any time during or after the tag-reading operation.

Contacts K20a8 (Fig. 43B) close a circuit over contacts L22bc1 to contacts K20ac1 and K20ac2, which also close to by-pass program selector switches CRA and CRB of the cash register. Contacts K20ac2 and K20ac1 extend circuits from contacts K20a8 over terminals 212 and 213 of plugboard 203 and over plugboard connectors 812 and 813 to terminals in sections 210 which are connected to the wipers of levels SSIA and SSIB of the stepping switch, which levels are to be effective in a tag-reading operation, which circuit continues over #20 position in levels SSIA and SSIB and over conductor 714 and contacts K1bd4 and K5b1 to the "operate" relay K1.

Contacts K20bc1 and K20bc2 open to interrupt the circuits to the program selector switches CRA and CRB.

Contacts K20a3 (Fig. 43A) prepare another energizing circuit to relay K3, which circuit extends over relay contacts K22ac4 and will be completed when reader reset relay K22 operates.

Contacts K20b5 (Fig. 43C) interrupt one energizing circuit for relay K22 to prevent relay K22 from being energized along with the reader clutch solenoid L23 over the clutch solenoid energizing circuit and to prevent the clutch-operating circuit from being energized over the energizing circuit for relay K22.

When relay K9 operates, its contacts operate as follows:

Contacts K9ac1 (Fig. 43B) close in the circuit to the reader clutch solenoid L23.

Contacts K9a2, K9a3, K9ac4, and K9ac5 close, and contacts K9bc4 and K9bc5 open in the circuits which are used to record the End of Frame and "#" symbols automatically under control of the tag reader.

Contacts K9bc1 open to disconnect conductor 714 from the circuit to the reader solenoid clutch.

In the operation of the reader, the End of Frame and "#" symbols are punched in the tape automatically before the tag itself is read. This is accomplished by properly programming the reader and the recorder, which operate in the following manner:

The circuit which is completed over contacts L22bc1 and relay contacts K20a8, K20ac1, and K20ac2, position #20 of levels SSIA and SSIB of the stepping switch, conductor 714, and contacts K1bd4 energizes "Operate" relay K1, which closes a holding circuit for itself from conductor 800 over contacts K5b1 and K1ad4. Contacts K1ad4 also prepare a circuit to stepping switch contacts SS1a2, which becomes effective as the stepping switch operates.

Contacts K1bd4 open to interrupt the energizing circuit for relay K1 and also to disconnect conductor 714 from the holding circuit for relay K1 which has been closed over contact K1ad4. Contacts K9bc1, which are open at this time, prevent the circuit which is completed over the #20 position of the stepping switch and conductor 714 from being extended to the reader clutch solenoid L23.

Contacts K1ac2 close a circuit from conductor 800 over punch-controlled contacts SC6b2 and relay contacts K8bc1 to energize the stepping switch magnet SS1. Contacts SC6b2 in this circuit open in each punching operation.

Contacts K1bc2 open in the "homing" circuit for the stepping switch, which circuit includes the "Off-Normal" contacts SS1a4 and the self-interrupting contacts SS1b3 to prevent resetting of the stepping switch at this time.

Contacts K1bc3 open the circuit to the Leader Advance push button PB1 and relay K3, deenergizing relay K3, which in turn allows contacts K3bc1 to close and supply power to the reader and recorder operating motors 484 and 601, and opens contacts K3ac1 to disable the circuit to the cash register clutch release solenoid L10. This disabling of the clutch release solenoid L10 prevents the cycling of the cash register while the reader and the recorder are operating and enables the keys of the cash register to be operated to set up the next transaction thereon while the reading operation is taking place.

Contacts K1bc3 (Fig. 43A) also open the circuit to contacts K8a2 to K8a7 to prevent punching of the Leader Advance code in this operation when relay K8 is energized in order to advance the stepping switch.

Contacts K1b1 (Fig. 43A) disconnect relay K8 from the punch clutch trip magnet L9 operating circuit over contacts SC6b2 to prevent the relay from being held over these contacts and contacts K8ac1 when relay K8 is energized to control the stepping of the stepping switch.

Contacts K1a5 (Fig. 43C) close to complete the circuit to the tag stop arm solenoid L22, which circuit was previously prepared by the closing of contacts L20ac2. The operation of solenoid L22 removes the stops from the tag chute.

Contacts K1ac3 (Fig. 43A) close to prepare a circuit to reset control relay K4, which circuit is in parallel with the indicator-controlled contacts CR10a3 in the cash register, which are closed only in the "#" position of the transaction indicator in row 1 of the cash register.

Contacts K1b6 (Fig. 43C) open to prevent premature operation of reset relay K22.

When stop arm solenoid L22 operated, it closed contacts L22ac1 to provide a holding circuit for itself from conductor 800 over contacts L22ac1 and L21b1 to maintain the solenoid L22 energized even after solenoid L20 has returned to unoperated condition.

The operation of solenoid L22 opened contacts L22bc1 (Fig. 43B) to interrupt the circuit over relay contacts K20a8 to contacts K20ac1 and K20ac2 and thereby to the wipers of levels SSIA and SSIB of the stepping switch. The circuit over contacts K20ac1 and K20ac2 now is connectable to conductor 800 over contacts K1ad4 and stepping switch contacts SS1a2, contacts SS1a2 serving to interrupt the circuit to the wipers before they move from contact to contact, thereby preventing arcing at the contacts.

When the stepping switch magnet SS1 was energized by the closure of contacts K1ac2, it operated to close the above-noted contacts SS1a2 and also to close contacts SS1a1.

Closure of contacts SS1a2 at this time completes the circuit over #20 position of the levels SSIA and SSIB and over conductor 714 and the contacts SS1a1, which are also closed at this time, to the relay K8, which is energized and opens contacts K8bc1 in the circuit to the stepping switch magnet SS1, deenergizing the magnet and allowing the switch to shift the wipers to the #1 contacts in levels SSIA and SSIB.

The deenergization of the stepping switch magnet SS1 allows contacts SS1a1 to open to deenergize relay K8, which in turn allows contacts K8bc1 to reclose and restore the energizing circuit for the stepping switch magnet SS1 over the punch-controlled contacts SC6b2.

The reenergization of the stepping switch magnet SS1 recloses contacts SS1a2, which complete the circuit over contacts K1ad4, SS1a2, K20ac2, K20ac1, and the wipers of levels SSIA and SSIB of the stepping switch, and over the #1 positions in these levels which are connected over plugboard connectors 815 and 816 to the tag End of Frame section 721 of the recorder plugboard, and over relay contacts K9ac5 and K9a3, to punch selector magnets PS7 and PS8 to cause these magnets to be energized and release their punch-selecting levers. The connections from contacts K9ac5 and K9a3 extend to the punch selector magnets PS7 and PS8 because in the embodiment being described the End of Frame symbol has been preselected as consisting of perforations in channels 7 and 8 of the tape. If in other embodiments it is desired that perforations in any two other channels provide the End of Frame symbol, then the connections from relay contacts K9ac5 and K9a3 can be changed to the proper punch-selecting magnets.

It is to be noted that, in order to simplify the wiring diagram, the wiring connections between the levels SSIA and SSIB and SSIIA and SSIIB of the stepping switch and the sections 715 and 716 of the plugboard, which are fully shown in Fig. 42, have been omitted from Fig. 43B, and the plugboard connectors as 815 and 816 have been shown as extending from the stepping switch itself.

The release of the punch-selecting levers causes the operation of bail 639 to close the contacts SC7a1 to energize the punch clutch trip magnet L9 and set the punching mechanism into operation to perforate the tape in channels 7 and 8, to record the End of Frame symbol.

In the operation of the punching mechanism, contacts SC6b2 will open at 90 degrees of the punch-operating cycle and will deenergize the stepping switch magnet SS1, opening contacts SS1a2 and also allowing the wipers to move to their #2 position.

At 230 degrees of the punch-operating cycle, contacts SC6b2 will reclose, and the stepping switch magnet will be reenergized, reclosing the circuit over contacts SS1a2 to the wipers of the stepping switch.

In the #2 position of the stepping switch, the recorder is programmed to punch the "#" symbol. The circuit extends from the #2 position over plugboard connectors 819 and 820 to terminals in section 722 of the plugboard, which terminals are connected over contacts K9ac4 and K9a2 to punch selector magnets PS2 and PS4. These punch selector magnets release their related punch-selecting levers.

The released punch-selecting levers close contacts SC7a1 to energize the punch clutch trip magnet L9 to initiate a punching cycle in which the tape is perforated in channels 2 and 4 to record the "#" symbol. As in the case with the End of Frame symbol, perforations in channels 2 and 4 on the tape have been chosen to represent the "#" symbol in the present embodiment. If it should be desired to have perforations in some other combination of two channels represent the "#" symbol, then the switches K9ac4 and K9a2 can be connected to the appropriate punch selector magnets.

At 90 degrees in the cycle of the punching operation, contacts SC6b2 in the punching mechanism open to deenergize the stepping switch magnet SS1, which opens contacts SS1a2 and also moves the wipers to position #3 of the stepping switch. In this program, the #3 position is the "tag read" position, which initiates the actual tag-reading operation.

At 230 degrees in the cycle of the punching operation, contacts SC6b2 reclose to energize the stepping switch magnet SS1, which recloses contacts SS1a2, which complete two circuits.

One circuit extends from conductor 800 over relay contacts K1ad4, SS1a2, and K20ac2, terminal in section 212 of plugboard 203, plugboard connector 812, wiper and position #3 of level SSIA, plugboard connector 823, terminal in section 723 of the recorder plugboard, and contacts K9ac1 and SC22b1 to energize reader clutch solenoid L23 to start the first cycle of the reader to read the first column of the tag.

Contacts SC22b1, which are located in the reader, are controlled from the reader cam line and are opened as the cam line moves out of home position in this first operation of reading the tag. It is to be noted that contacts SC6a1 parallel contacts in the circuit over contacts K9ac1 to the reader clutch solenoid L23. Contacts SC6a1, which are located in the punching mechanism and are closed from 90 to 230 degrees in the cycle of the punching operation, close during the punching operation which records the data read from a column of the tag and reclose the circuit to the reader clutch magnet to trip the reader for a further reading operation.

While the reader is operating to read the various columns on the tag, it is necessary that the stepping switch be kept energized to prevent the wipers from moving from position #3. The other circuit closed by contacts SS1a2 takes care of this condition, the circuit extending from conductor 800 over contacts K1ad4, SS1a2, K20ac1, terminal 213 of plugboard 203, plugboard connector 813, wiper and position #3 of level SSIB, plugboard connector 824, to the other "tag read" terminal in section 723 of the recorder plugboard, conductor 825a, and contacts K8bc1 and K1ac2 to the stepping switch magnet SS1, and maintaining the energizing circuit for the stepping switch magnet SS1 effective even though contacts SC6b2 in the punching mechanism open during the punching of the data which is read from the tag.

In the first operation of the reader cam line, the five sensing pins for the first column at the left of the tag are allowed to move to sensing position. Since the same coding is used for data on the tag as is used for recording of data on the tape, two of the five sensing pins will pass through holes in this column of the tag and will close their related ones of the contacts SC25a1 to SC25a5.

As explained earlier, these contacts SC25a1 to SC25a5 are common to the sensing pins of all the columns of the sensing means and are connected to the section 211 of the plugboard 203 of the cash register, from which section five plugboard connectors 825 extend to the punch-selecting section 209 of the plugboard 203 of the cash register to enable the contacts to control the selection of the punches.

The connections between the terminals of section 211 and 209 of the plugboard 203 in the instant embodiment connect contacts SC25a1 to punch selector magnet PS1, contacts SC25a2 to punch selector magnet PS2, contacts SC25a3 to punch selector magnet PS3, etc. This causes the data in the various columns on the tag to be recorded in channels 1 to 5 on the tape. It is to be understood that the invention is not limited to this arrangement of interconnections and that other arrangements can be used if desired.

Contacts SC24a1 are operated by the cam 494 in the reader and close from 285 to 345 degrees in the cycle of operation of the reader and, when closed, complete the circuit over the selected contacts of the group SC25a1 to SC25a5 to energize the selected punch selector magnets to release their punch-selecting levers.

The released punch-selecting levers close contacts SC7a1 to energize the punch clutch trip magnet L9 to initiate a punching operation to punch the tape according to the perforations in the first column on the tag.

At 90 degrees in the punching cycle, contacts SC6a1 close in the circuit to the reader clutch solenoid L23 to initiate the second reading operation. In this operation, the reader cam line makes a further operation, which restores the sensing pins for column 1 to ineffective position and frees the sensing pins for column 2 so that they can selectively close contacts of the group SC25a1 to SC25a5 according to the perforations in column 2 on the tag. During this operation of the reader, contacts SC24a1 close to energize the selected punch-selector magnets to release punch-selecting levers, which in turn initiate an operation of the punching means to reproduce the data of column 2 on the tag.

The operations of the reader to read the columns of the tag will continue until all the desired columns of the tag have been read. As explained earlier, the cam 480 can be adjusted on the reader cam line so that the reader can read any number of columns up to twenty-five before the cam operates the "end of tag" contacts SC23a1. In the embodiment being described, twenty-three columns are to be read, and the "end of tag" contacts SC23a1 (Fig. 43C) are to operate in the twenty-fourth operation of the reader cam line.

When column 23 is read, the punch selector magnets are energized, and an operation of the punching mechanism takes place as above described. In this cycle of operation of the punching mechanism, contacts SC6a1 close to energize the reader clutch solenoid L23 to cause the twenty-fourth operation of the reader cam line.

In the twenty-fourth operation of the reader, the cam 480 closes "end of tag" contacts SC23a1 early in the cycle. The closure of the contacts SC23a1 completes an energizing circuit for reader reset relay K22, causing it to be energized, the circuit including contacts SC22a2, which are controlled from the cam 481 on the reader cam line and are closed except in the home position of the reader cam line.

The energization of relay K22 opens contacts K22bc1 in the circuit to disabling yoke solenoid L24 to deenergize the solenoid and allow the yoke to engage the arms to hold all the sensing pins in their retracted position. Since the sensing pins are prevented from moving forward, none of the contacts SC25a1 to SC25a5 will close to energize punch selector magnets; hence contacts SC7a1 will not be closed to initiate a cycle of operation of the punching mechanism, and the contacts SC6a1 will not trip the reader clutch solenoid L23, and further operation of the tag reader is arrested. It should be noted that at this time alining pin solenoid L20 is still energized and that the alining pins still extend through the tag to prevent the tag from being removed or a new tag from being inserted in the reader.

In addition to bringing about the arresting of further operation of the reader, relay K22 operates other contacts as follows:

Contacts K22ac1, which are in parallel with contacts SC23a1 and K1b6, close to hold relay K22 energized after the "end of tag" contacts SC23a1 have opened and after relay K1 has been deenergized. This holding circuit will be maintained until contacts SC22a2 are opened in the twenty-eighth, or home, position of the reader cam line.

Contacts K22a2 close in the circuit to tag stop arm solenoid L22 to maintain the solenoid energized and the stop arms retracted even after the relay K1 has been deenergized.

Contacts K22ac3 close to provide a holding circuit to alining pin solenoid L20 over contacts SC21b1 to maintain the solenoid energized. Contacts SC21b1 are not opened until the twenty-seventh operation of the cam line and maintain the alining pin solenoid energized until this time even after relay K20 has been deenergized.

Contacts K22bc3 open in the circuit from point 811 to the relays K20 and K9 to interrupt the energizing circuit for the relays and allow their energization to be controlled by the holding circuit over contacts K20a4 and the cash-register-controlled contacts CR10bc2, which open at 175 degrees of a cycle of operation of the cash register.

Contacts K22ac4 close the circuit over contacts K20a3 to energize relay K3, which, at contacts K3ac1, renders the clutch release solenoid L10 operable, and contacts K3bc1 interrupt the power to the reader and recorder motors 484 and 601.

Contacts K22bc4 open to interrupt the energizing circuit for relay K3, which extends over relay contacts K1bc3 and the Leader Advance push button contacts PB1bc1 to prevent relay K3 from being energized over this circuit when relay K1 is deenergized.

The next step in recording the "frame" of data related to the transaction is to set up on the keyboard of the cash register the necessary sales data related to the tag which was just read. This data may be set up during the tag-reading operation or after the tag has been read.

The programming of the apparatus is very flexible and can be arranged to punch all or part of the data set up on the cash register and in any order, and, if desired, the program can be arranged to include the punching of fixed data in addition to that set up on the cash register.

In the instant embodiment, the entire data set up on the cash register in a Merchandise operation will be punched on the tape, the order of punching being from rows 1, 9, 8, 7, 6, 5, 4, 3, and 2.

Since the cash register is to control the program of further punching according to the significance of the data set up on the keyboard, as controlled by the transaction key which is operated in row 1, the terminals in sections 207 and 208 of the plugboard 203 which are related to the Merchandise positions of the program-selecting switches CRA and CRB are connected by plugboard connectors, as 817 and 818, to the terminals in section 210 of the plugboard which are connected to the wipers for the program controlled by levels SSIA and SSIB.

After the data has been set up on the keyboard of the cash register, one of the Merchandise keys—say "I Mdse" key—is operated. The operation of the "I Mdse" key trips the key lock line and contacts CR17a1 will be closed by the tripped key lock line. Since the reading of the tag has been completed and contacts K3ac1 are closed, clutch release solenoid L10 will be energized to initiate an operation of the cash register.

In the first part of the cash register operation, the selector switches CR1a1—CR1a2 to CR9a1—CR9a2 and CRA and CRB will be set according to the data set on the keys.

At 175 degrees in the cycle of the cash register operation, contacts CR20b1 open to cause the reader to be restored to home position and also cause the operation of the recorder to punch the further data under control of the cash register.

When contacts CR20b1 open, they open the holding circuit for relays K20 and K9 and the "#"-key-locking solenoid L11. Deenergization of solenoid L11 unlocks the "#" key of the cash register, and deenergization of relay K20 causes contacts K20a3 to open to deenergize relay K3, which in turn closes contacts K3bc1 to supply operating power to the reader and recorder motors 484 and 601. At this time, the recorder is set in operation to record the data set on the cash register selector switches, and the reader is cycled into its home position.

The recording operation will be considered first.

When relay K20 was deenergized, its contacts K20bc1 and K20bc2 closed, and contacts K20ac1 and K20ac2 opened to allow program selector switches CRA and CRB in the cash register to control the further steps in the program. Contacts K20bc1 and K20bc2 complete the circuits from conductor 800 over contacts K1ad4, SS1a2, K20bc1, and K20bc2 over position #8 in the program selector switches CRA and CRB over terminals in sections 207 and 208 of plugboard 203 and over plugboard connectors 817 and 818 to terminals in section 210 of the plugboard which are connected to the wipers of levels SSIA and SSIB of the stepping switch, which wipers have remained in their #3 position. The circuit continues over position #3 of level SSIA and plugboard connector 823, to the terminal in section 723 of the recorder plugboard, which is connected to contacts K9bc1, which are closed at this time, since relay K9 is deenergized, over conductor 714, contacts SS1a1, which are closed at this time, since the stepping switch was held energized during the tag-reading operation, to energize relay K8, which opens its contacts K8bc1 to deenergize the stepping switch magnet SS1.

Deenergization of the stepping switch magnet SS1 opens contacts SS1a2 to interrupt the circuit to the wipers of the stepping switch and opens contacts SS1a1 to deenergize relay K8. The deenergization of the magnet also allows the wipers to move to their #4 position.

The deenergization of relay K8 allows contacts K8bc1 to reclose the circuit to the stepping switch magnet SS1 to reenergize the magnet and reclose contacts SS1a2, which completes the circuit to the #4 positions of the levels SSIA and SSIB.

Since in this program the data in row 1 of the cash register is to be read first, plugboard connectors 821 and 822 will connect the #4 positions of the levels SSIA and SSIB to terminals in the portion of the section 719 of the recorder plugboard for reading out row 1 of the cash register, which terminals are connected over relay contacts K4bc1 and K4b6 to the wipers of the switches CR1a1 and CR1a2, which have been set according to the data set up in row 1 of the keyboard. The selector switches CR1a1 and CR1a2, which are set to their #8 position, continue the circuits over the selected wires of the groups of wires 200 to 201 to the sections 202 and 204 of the plugboard, which, as explained earlier, are connected to terminals in section 209 of the plugboard according to the required encoding, which in this case continues the circuits to the punch selector magnets PS1 and PS4 to cause the two holes corresponding to this data to be punched in channels 1 and 4 on the tape. The selected punch selector magnets will release their related punch-selecting levers to close contacts SC7a1 and energize the punch clutch trip magnet L9 to cycle the punching mechanism and punch the digit 8 or the Merchandise I symbol in the tape.

In the punching operation, the contacts SC6b2 will open to deenergize the stepping switch magnet SS1, which allows the wipers to move to the #5 position. Since row 9 is the next row to be used in controlling the recorder in the punching sequence selected for this program, the #5 positions of the levels SSIA and SSIB of the stepping switches are connected over plugboard connectors 830 and 831 to the portion of the section 719 of the recorder plugboard, which is connected to the wipers of the selector switches CR9a1 and CR9a2, which switches complete circuits to the punch selector magnets to cause the data in this row to be punched. In the punching of the data, contacts SC6b2 will open to deenergize the stepping switch to advance its wipers to the #6 position.

Recording of the data from the remaining rows of the keyboard will be effected as the stepping switch moves through positions #6 through #12, which are connected by suitable plugboard connectors to the terminals of section 719, which are connected to the wipers for cash register selector switches CR8a1—CR8a2 to CR2a1—CR2a2, respectively, in descending order. After recording the data which has been set up in row 2 of the cash register, the punching sequence of this particular program has been completed, and the stepping switch advances to position #13, which is effective in this program to reset the recorder to its home position.

In position #13 of level SSIB, the circuit is continued over plugboard connector 832 to a terminal in the reset section 724 of the recorder plugboard, which terminal is connected over contacts K4bd4 to relay K4 and energizes this relay.

Relay K4 closes a holding circuit for itself over contacts K4ad4 and K1ac3.

Contacts K4a3 close energizing reset relay K5.

Relay K5 opens contact K5b1 to deenergize relay K1.

Contacts K1ac3 open to deenergize relay K4, which in turn deenergizes relay K5.

Contacts K1ad4 open to interrupt the circuit over levels SSIA and SSIB of the stepping switch.

Contacts K1bc3 close to energize relay K3 as soon as relay K22 is deenergized in the reader-restoring operation, to disable the reader and the recorder motors.

Contacts K1ac2 open to break the energizing circuit to the stepping switch magnet SS1, allowing the wipers to move from the #13 position and also allowing contacts SS1b3 to close.

Contacts K1bc2 in the "homing" circuit for the stepping switch render the circuit effective over the self-interrupting contacts SS1b3 and the Off-normal contacts SS1a4 to cause the stepping switch magnet SS1 to be operated repeatedly to drive the switch to home position, where contacts SS1a4 open to arrest further operation of the switch and leave the wipers in the #20 position.

The recorder is in its home position, in which position it is ready to record data in another tag-reading operation or a "#" operation under control of the cash register.

It will be obvious from the foregoing explanation that the number of rows of the cash register and the particular sequence in which they are to be used to control the punching of data can readily be set up by making suitable plugboard connections from the terminals of sections 715, 716, 717, and 718, as determined by the stepping switch positions, to the desired ones of the terminals in section 719 which are connected to various ones of the wipers of the cash-register-controlled switches on which the data is set.

It is also obvious that, if it is desired to punch certain fixed data at any point in the program, it is only necessary to make plugboard connections directly from the program positions to the punch-selector magnet outlets in section 725 of the recorder plugboard according to the data to be punched. As the stepping switch reaches this part of the program, it will directly complete circuits to the punch selector magnets according to the coding arranged by the plugboard connectors.

While the recorder was punching the data set up on the cash register, the reader was restored to home position, or starting condition, as follows:

When relays K20 and K9 were deenergized at the start of the recording operation, contacts K20b5 were closed to energize reader clutch solenoid L23 over a circuit from conductor 800 over contacts K22ac1, and contacts SC22a2, which are controlled by the cam 481 on the reader cam line and remain closed until the twenty-eighth operation of the cam line moves it into home position.

Contacts K20bc6 reclose to reenergize the Merchandise key lock solenoid L12 to lock the Merchandise keys to prevent another merchandising operation before a "#" operation.

When the cam line is in its twenty-seventh, or next-to-last, operation, contacts SC21b1 are opened by cam 482 to interrupt the holding circuit for the alining pin solenoid L20 from point 810 over contacts K22ac3, releasing the solenoid and allowing the alining pins to be withdrawn from the tag.

The deenergization of solenoid L20 allowed contacts L20bc2 to close to complete a circuit over contacts L22ac1 to energize the tag advance solenoid L21, causing the tag advancing means to operate and move the tag in the chute from reading position to the position below reading position.

When solenoid L21 was energized, it opened contacts L21b1 in the energizing circuit for the stop arm solenoid L22, causing it to be deenergized and open contacts L22ac1, which in turn deenergized solenoid L21.

When solenoid L22 was deenergized, it allowed the stops to move forward into blocking position in the tag chute.

In the twenty-eighth, or home, position of the cam line, cam 481 allows the contacts SC22a2 to open to release relay K22 and open the reader clutch solenoid circuit to cause the reader to remain in this, its home position. At this time, the reader is ready to be operated in another tag-reading operation.

In the recording operation explained above, the tape will have been punched with an End of Frame symbol, a "#" symbol, the merchandise-identifying data on the tag, and a Merchandise symbol followed by the sales data which was set on rows 9 through 2 of the cash register, in that order.

If the power supply circuit should be opened accidentally or the power supply should fail during a reading operation, the solenoids L20 and L24 will be deenergized to withdraw the alining pins and the sensing pins from the tag to allow the tag to be withdrawn from the chute. When power is restored, a circuit over contacts K1b6, reader-controlled contacts SC22a2, and contacts K20b5 will energize the reader reset relay K22 and also energize the reader clutch solenoid L23, to cycle the reader until contacts SC22a2 open in the twenty-eighth, or home, position of the cam line. During this restoring operation, contacts K22bc4 are open to prevent relay K3 from being energized to interrupt power to the reader motor.

The data recorded on the tape in any interrupted reading operation will be incomplete, and a new tag-reading operation with the same tag will have to be made.

If the tag is lost or is mutilated so badly that it cannot be read, the necessary "#" data can be recorded on the tape by setting the data up on the cash register and operating the cash register under control of the "#" key in row 1.

This recording of "#" data under control of the cash register requires that a different program be used from that in which the "#" data was read from a tag.

In the disclosed embodiment of the invention, only the amount keys, rows 2 through 6 of the keyboard, will be used to control the recording of "#" data. However, if it is necessary to record a number of more than five digits, successive entries can be made in successive operations of the cash register under control of the "#" key to accomplish the complete number recording. A limiting condition of the multiple-entry process is that all entries must be of equal length and must be entered on the same rows of keys. As an example, one may wish to record a number having twelve digits. To do this, three "#" operations must be performed, each one involving four rows of keys and each one utilizing the necessary keys in the same four rows on the keyboard. An alternate method would be to perform four "#" operations using three rows of keys and using the same rows of keys on each entry. Another possible method having little practical value, but offered for the sake of explanation, would be to make twelve "#" operations each using the keys in the same row of keys for each entry.

Recording of a ten-digit number could be accomplished by two "#" operations using five keys each; recording of a six-digit number could be accomplished by two "#" operations using three keys each, etc. For numbers having more than five digits, the number of digits not being evenly divisible by 2, 3, 4, or 5, recording of the "#" data can be accomplished only by "#" operations with depression of a single digit key at a time, with enough successive operations to record the entire data. The wiring of the recorder plugboard determines how many keyboard rows will be used for each "#" operation of the cash register and also the sequence in which the rows will be read, and, once programmed, no deviation can be made from using this many rows without changing the wiring on the recorder plugboard. Consequently, if the recorder has been programmed to record "#" data from rows 2 to 6 on the cash register, all of these rows and no others must be utilized during each "#" operation.

Normal operation will be to record the "#" data set up in the cash register rows 2 through 6 in descending order, starting with row 6, recording one digit in each row down to and including row 2.

In order to explain this type of operation, the entry of "#" data involving ten digits followed by the entry of Merchandise data will be described.

The entry of "#" data under control of the cash register will require a different punching program from that used when the "#" data was read from the tag, so levels SSIIA and SSIIB of the stepping switch will be used to supply this program.

The "9" or "#" position contacts of the program selector switches CRA and CRB are connected from terminals in sections 207 and 208 of the plugboard over plugboard connectors 835 and 836 to the II program terminals in section 210 of the cash register plugboard, which terminals are connected to the wipers of levels SSIIA and SSIIB of the stepping switch. Plugboard connectors 837 and 838 connect the #1 position of these levels to terminals in the register "end of frame" section 720 of the recorder plugboard; plugboard connectors 839 and 840 connect the #2 positions of these levels to terminals in section 719 of the readout portion of the recorder plugboard, which terminals are connected to row 1 wipers in the cash register; positions #3, #4, #5, #6, and #7 of the stepping switch are similarly connected by plugboard connectors to other terminals in section 719, which are connected to the wipers for rows 6, 5, 4, 3, and 2 of the cash register; and position #8 of level SSIIB is connected by a plugboard connector 841 to a terminal in reset section 724 of the recorder plugboard.

The first five digits of the "#" data which are to be recorded are set up on the cash register keyboard, and the "#" key in row 1 is operated.

At this time, relay K3 is in an energized condition, so, when contacts CR17a1 are closed by the key lock line, solenoid L10 will be energized to initiate an operation of the cash register. In the first half of the cash register operation, the data-representing selector switches as CR1a1—CR1a2 to CR6a1—CR6a2 and the program selector switches CRA and CRB will be set according to the data set on the keyboard.

When the "#" key was operated, it closed contacts CR11ac2 to energize the alining pin solenoid L20 to cause the alining pins to be projected into the tag chute in the reader to prevent the proper insertion of a tag therein, and, during the cash register operation, indicator-controlled contacts CR10ac2 close to maintain the solenoid energized until a subsequent Merchandise operation of the cash register.

The "#" key operation also opened contacts CR11bc2 to disable the reader motor bar PB2 to prevent circuits from being completed over contacts PB2a1 to relays K20 and K9 and to the "#"-key-locking solenoid L11 at this time.

Indicator-controlled contacts CR10b1 in this same circuit open in the "#" operation to maintain the circuit disabled until a subsequent Merchandise operation of the cash register.

Indicator-controlled contacts CR10bc2 open in the "#" operation of the cash register and deenergize solenoid L12 to unlock the Merchandise key.

Contacts CR11b1 are opened upon depression of the "#" key and open the circuit to the tag stop arm solenoid L22.

Indicator-controlled contacts CR10a3 will close in the "#" operation and will prepare a holding circuit for reset relay K4, which circuit, when it becomes effective, will remain effective until the cash register is operated in a Merchandise operation.

At 175 degrees in the cash register cycle and after all the above cash-register-controlled switches and contacts have been operated, the cash register start-record contacts CR20a2 will be closed and will remain closed until 200 degrees in the cash register cycle. The closure of these contacts will complete a circuit from conductor 800 over contacts K3ac2, CR4b1, which are controlled by the total lever and are closed when the total lever is in its "Add" position, contacts CR20a2, K20bc2, and K20bc1 to wipers of program selector switches CRA and CRB of the cash register, and over terminals in sections 207 and 208 and plugboard connectors 835 and 836 to terminals in section 210 of the plugboard which are connected to the wipers of levels SSIIA and SSIIB of the stepping switch.

The stepping switch is in its #20, or "home," position, so the circuit is continued over conductor 714 and contacts K1bd4 to energize relay K1.

As before, relay K1 will close a holding circuit for itself over contacts K1ad4, which contacts also will connect stepping switch contacts SS1a2 to conductor 800.

Contacts K1bc2 will open in the homing circuit for the stepping switch.

Contacts K1ac2 will close to energize the stepping switch magnet.

Contacts K1bc3 will open to deenergize relay K3 and also prevent the punching of the lead-in code when relay K8 is energized.

Contacts K1b1 disconnect relay K8 from the circuit including contacts SC6b2 to prevent these contacts from having any effect on the energization and deenergization of relay K8.

Contacts K1bd4 disconnect relay K1 from conductor 714, over which it was energized.

When the stepping switch magnet SS1 is energized, contacts SS1a1 close to complete a circuit from the #20 position of the levels SSIIA and SSIIB of the stepping switch over conductor 714 and contacts SS1a1 to relay K8, energizing relay K8, which in turn opens contacts K8bc1 to deenergize the stepping switch magnet SS1.

Deenergization of the stepping switch magnet SS1 opens contacts SS1a1 to deenergize relay K8 and also allows the wipers to move to their #1 position.

The deenergization of relay K8 allows its contacts K8bc1 to reclose and reenergize the stepping switch magnet SS1.

Reenergization of the stepping switch magnet SS1 closes contacts SS1a2 to complete the circuit over the wipers of levels SSIIA and SSIIB of the stepping switch and over #1 position of the switches and plugboard connectors 837 and 838 and contacts K4bc2 and K4b5 to the punch selector magnets PS7 and PS8 to cause the End of Frame symbol to be punched.

At 90 degrees in the cycle of the punching mechanism, when punching the End of Frame symbol, contacts SC6b2 will open to deenergize the stepping switch magnet SS1 and allow its wipers to move to position #2.

At 230 degrees in the cycle of operation of the punching mechanism, contacts SC6b2 reclose to energize the stepping switch magnet to reclose contacts SS1a2 to complete a circuit over the wipers in levels SSIIA and SSIIB in their #2 position and over plugboard connectors 839 and 840 and contacts K4bc1 and K4b6 to the wipers for selector switches CR1a1 and CR1a2 of the cash register, which wipers will now be in position to cause the "#" symbol to be punched on the tape.

During the punching of the "#" symbol, contacts SC6b2 open to deenergize the stepping switch magnet to move the wipers for levels SSIIA and SSIIB to the #3 position, and thereafter the contacts SC6b2 reclose to reenergize the stepping switch magnet to close contacts SS1a2 to complete the circuit over the wipers in position #3 of the stepping switch. As explained earlier, position #3 will read data from row 6 of the cash register according to the setting of the selector switches CR6a1 and CR6a2 and will cause this data to be punched. In a similar manner, the stepping switch will operate through positions #4, #5, #6, and #7 to record the data which has been set up in rows 5, 4, 3, and 2 of the cash register.

When the data in row 2 of the cash register is being recorded, the stepping switch will move to position #8, or reset position in this program, and will complete a circuit over plugboard connector 841, a terminal in section 724, and contacts K4bd4 to energize relay K4.

Relay K4 closes a holding circuit for itself over contacts K4ad4 and the indicator-controlled contacts CR10a3, which are closed because the transaction indicator is in its "#" position. This circuit will maintain relay K4 energized until the cash register is operated in a Merchandise operation or some other operation than a "#" operation.

Contacts K4a3 close to energize relay K5, which in turn opens contacts K5b1 to deenergize relay K1.

Contacts K4bd4 open to prevent relay K5 from being held energized over the holding circuit for relay K4.

The resetting operation progresses as described earlier to bring the stepping switch back to home position. In this operation, relay K4 remains energized, and relay K5 is deenergized as soon as the stepping switch moves off the reset position.

The next operation of the transaction is to set the remainder of the "#" data in rows 6, 5, 4, 3, and 2 of the cash register keyboard and operate the "#" key.

This second "#" operation of the cash register in setting up the "#" data will be the same as the first except that in positions #1 and #2 of the stepping switch the End of Frame and "#" symbols will not be punched.

It will be recalled that relay K4 remains energized at the end of the first "#" operation. Hence contacts K4bc2 and K4b5 will be open and K4ac2 will be closed, and, instead of completing circuits to punch selector magnets, the circuit over level SSIIA is connected over conductor 714 and contacts SS1a1 to relay K8 to deenergize the stepping switch and cause it to step to position #2. In position #2, a similar condition exists because contacts K4b6 and K4bc1 have been opened to interrupt the circuits to the punch selector magnets and contacts K4ac1 have been closed to connect position #2 in level SSIIA to conductor 714 and over SS1a1 to energize relay K8 to cause the stepping switch to advance to #3 position.

In positions #3, #4, #5, #6, and #7 of the stepping switch, the circuits are directed to the wipers of selector switches CR6a1—CR6a2, etc., to record the rest of the "#" data.

When the stepping switch is in the #8, or reset, position, the circuit is completed directly over contacts K4a3 to energize relay K5, which in turn deenergizes relay K1 and causes the parts of the recorder to be restored to home position.

After the cash register has been operated the number of times necessary to cause all the required "#" data to be punched on the tape, the next step in recording the "frame" of data of a transaction is to operate the cash register in a Merchandise operation to record sales data which is related to this "#" data.

The keys in the various rows of the keyboard are operated according to the sales data related to the "#" operation, and, when the Merchandise key—say, "I Mdse" key—is operated, contacts CR17a1 will close to energize clutch release solenoid L10 and initiate a cycle of operation of the cash register. In the first half of this cycle, the selector switches CR1a1—CR1a2 to CR9a1—CR9a2 and CRA and CRB will be set according to the data set up on the keys, and the indicator-controlled contacts will be operated, since the indicator for row 1 is moved from "#" position.

Contacts CR10ac2 will open to deenergize the alining pin solenoid L20 to allow the alining pins to be withdrawn from the tag chute in the reader. Contacts CR10bc2 close to cause the Merchandise key locking solenoid L12 to be energized. Contacts CR10a3 open to deenergize relay K4. Contacts CR10b1 open to render the reader motor bar PB2 operable.

The same punching program is used for controlling the recording of Merchandise data regardless of whether the Merchandise operation follows a tag-reading operation, as explained earlier, or follows one or more "#" operations of the cash register.

When contacts CR20a2 close, at 175 degrees in the cash register cycle, the start record circuit is completed from conductor 800 over contacts K3ac2, CR4b1, CR20a2, K20bc2, and K20bc1 to the program selector switches CRA and CRB and over the #8 position of these switches and plugboard connectors 817 and 818 to the wipers of levels SSIA and SSIB of the stepping switch, which are in their #20 position, and over conductor 714 and contacts K1bd4 to energize relay K1.

Relay K1 operates contacts K1ac2 to close the circuit to the stepping switch magnet SS1 to energize this magnet, opens K1bc3 to deenergize relay K3 to render the recorder motor operable, and operates its other contacts, as explained earlier, to render the recorder operable.

The energization of the stepping switch magnet SS1 closes contacts SS1a1 to cause relay K8 to be energized to open contacts K8bc1, which deenergizes the stepping switch magnet. The deenergization of the stepping switch magnet allows the stepping switch to move to its #1 position and allows contacts SS1a1 to open to deenergize relay K8, which allows contacts K8bc1 to reclose and reenergize the stepping switch magnet.

It will be recalled that, when the tag reader was used to enter the "#" data, positions #1, #2, and #3 of this program were used to cause the End of Frame symbol and the "#" symbol to be recorded and the tag-reading operation to be initiated, and it was not until the #4 position that sales data was recorded under control of the cash register.

When the stepping switch moved to its #1 position, the circuit was continued over plugboard connector 815 and over contacts K9bc5 to conductor 714 and over contacts SS1a1 to energize relay K8.

Energization of relay K8 will open contacts K8bc1 to release the stepping switch, so that it can move its wipers to position #2.

Similarly, in position #2, level SSIA is connected over plugboard connector 819 and over contacts K9bc4 to conductor 714 and over contacts SS1a1 to energize relay K8. Energization of relay K8 opens contacts K8bc1 to deenergize the stepping switch magnet, which steps its wipers to position #3 and also opens contacts SS1a1 to deenergize relay K8, which in turn closes contacts K8bc1 to reenergize the stepping switch magnet.

In position #3, the circuit is completed over plugboard connector 823 and contacts K9bc1 to conductor 714 and over contacts SS1a1 to energize relay K8, which deenergizes the stepping magnet and causes the stepping switch to move to its #4 position. Deenergization of the stepping magnet opens contacts SS1a1 to deenergize relay K8 and cause the stepping magnet to be reenergized.

It is to be noted that, since relay K9 of the reader was not energized at this time, the stepping switch was stepped through positions #1, #2, and #3 without causing the recorder to operate to punch any data on the tape.

In positions #4 through #12 of the program, when the stepping switch passes through these positions, the data in rows 1, 9, 8, 7, 6, 5, 4, 3, and 2 will be punched on the tape, as in the Merchandise operation previously described.

In position #13, the reset circuit will be completed, as described earlier, over level SSIB, plugboard connector 832, contacts K4bd4, to energize reset relay K4 to bring about the resetting of the recorder to its home condition.

At the end of recording the data for this transaction, the tape will have been punched with an End of Frame Symbol, a "#" symbol, and the data in rows 6 to 2 of the cash register as a result of the first "#" operation of the cash register; will have been punched with the data in only rows 6 to 2 of the cash register in the second "#" operation of the cash register; and will have been punched with the data in rows 1, 9, 8, 7, 6, 5, 4, 3, and 2 in the Merchandise operation of the cash register.

It is believed that the coordination and interrelation of the three units of the apparatus—the register, the reader, and the recorder—will be clear from the above description of the circuit diagram.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus for recording related data of different significance, the combination of a recording mechanism for recording said data; means for sensing cards on which data of one signficance is recorded in columns, said sensing means sensing the card column by column and controlling the recording mechanism to record the data of said one significance; a plurality of switching means settable according to data of said one significance and also according to related data of another significance; a further control means settable to provide controls according to the significance of the data set on the switching means; and programming means controlled by the further control means and operable to select predetermined ones of the switching means and render them effective one after another in predetermined sequence to control the recording mechanism, and also operable to provide the necessary controls for coordinating the control of the recording mechanism by the sensing means and by the plurality of switching means in a plurality of recording sequences by which data of said one significance, which is selectively recorded under control of the sensing means or the plurality of switching means, will always be followed by data of said other significance, which is recorded under control of said switching means, whereby the proper relation will be maintained between the recorded data of said one significance and said other significance.

2. In an apparatus for recording frames of information containing data of one significance followed by data of another significance, the combination of a recording mechanism for recording said data; a first entry means including sensing means for sensing cards having data of said one significance thereon and for controlling the recording mechanism to record this data; a second entry means including a plurality of switching means which are settable to represent data and can control the recording mechanism to record the data, each setting of the switching means being capable of representing data of said one or said other significance, and including control means which are settable to indicate the significance of the data which is set on the switching means; and programming means controlled by the control means in the second entry means and operable to select predetermined ones of the switching means and render them effective one after another in predetermined sequence to control the recording mechanism, and also operable to provide the necessary controls for coordinating the control of the recording mechanism by the sensing means and by the switching means in a plurality of recording sequences by which data of said one significance, which is selectively recorded under control of the first entry means or the second entry means will always be followed in the frame of information by data of said other significance, which is recorded under control of said second entry means.

3. In an apparatus for recording related data of different significance, the combination of a punching mechanism for recording said data; means for sensing cards on which data of one significance is recorded in columns, said sensing means sensing the card column by column and controlling the punching means to record the data of said one significance; a plurality of selector switches settable according to data of said one significance and according to data of another significance; a further control means settable to provide controls according to the significance of the data set on the selector switches; programming means controlled by the further control means and operable to provide the necessary controls for coordinating the control of the punching mechanism by the sensing means and by the plurality of selector switches in a plurality of punching sequences, a first of said punching sequences causing the punching mechanism to be controlled first by said sensing means according to data having said one significance and then to be controlled by the selector switches according to data having the other significance, and a second of said punching sequences causing the punching mechanism to be controlled by said plurality of selector switches according to data having said one significance; a first auxiliary control means controlled by the programming means and operated at the end of said second punching sequence to modify the second punching sequence to prevent certain data from being punched if said second punching sequence is repeated, said first auxiliary control means being restored to unoperated condition in the said first punching sequence which follows said second punching sequence, whereby certain data is not recorded if said second punching sequence is repeated; and second auxiliary control means controlled by the programming means and operable to modify the first punching sequence to eliminate the control of the punching mechanism by the sensing means if said first punching sequence follows said second punching sequence.

4. In a recording apparatus, the combination of a recording mechanism of the step-by-step type; means for sensing a record card having data perforated in columns thereon, said sensing means being operable step by step to read the card column by column and to control the recording mechanism to cause the recording of the data as it is read; means in the recording mechanism which is operable as an incident to the recording of data for one column, for causing a further step of operation of the sensing means to cause the sensing means to sense the next column; a plurality of selector switches settable according to further data to be recorded; a programming means operable in a plurality of steps to provide the necessary controls for coordinating the control of the recording mechanism by the sensing means and by the plurality of selector switches according to the desired recording sequence and capable of controlling the sequence in which data set on the various selector switches is recorded; means in the recording mechanism which is operable as an incident to the recording of data under control of said selector switches to advance the programming means through successive steps of operation; control means to initiate an operation of the programming means which, in turn, initiates an operation of the sensing means to read the desired columns on the card and cause the recording mechanism to record the read data; means for arresting further stepping of the programming means while the card is being sensed; settable means to terminate the operation of the sensing means after any predetermined number of columns of the card have been read; and means to cause the stepping operation of the programming means to be resumed to render selected ones of the selector switches operable one after another in predetermined sequence under control of the programming means to cause the data which is read from the card and other related data which is set up in the selector switches to be recorded in proper sequence.

5. In a recording apparatus, the combination of a punching mechanism of the step-by-step type; means for receiving an insertable record card in reading position, said record card having data perforated in columns thereon; means for reading the card column by column and controlling the punching mechanism to cause the punching of the data which is read; means operable to lock the card in reading position; a key-controlled mechanism including a plurality of switches settable according to further data to be punched; a programming means operable in a plurality of steps to provide the necessary controls for coordinating the control of the punching mechanism by the reading means and by the switches of the key-controlled mechanism according to the desired punching sequence; control means including means to render the card locking means operable to lock the card in reading position and including means to initiate an operation of the programming means which, in turn, causes the reading means to operate to read the desired columns on the card and cause the punching mechanism to punch the read data; means to interrupt the operation of the programming means and the reading means after a desired number of columns of the card have been read; and means in the key-controlled mechanism and operable, when an operation of the key-controlled mechanism follows a card reading operation, to release the card locking means to allow the card to be removed from reading position and to cause the operation of the programming means to be resumed to cause selected ones of the settable switches to control the punching mechanism in the desired sequence to record the data as set thereon in the operation of the key-controlled mechanism; said programming means causing the read data and related data set up in the key-controlled mechanism to be recorded in proper sequence and preventing the reading of a further card until the key-controlled mechanism has been operated to provide the related data.

6. In an apparatus for recording frames of information containing data of one significance followed by data of another significance, the combination of a recording mechanism for recording said data; a first entry means including sensing means for sensing cards having data of said one significance thereon and for controlling the recording mechanism to record this data; a second entry means including a plurality of switching means which are settable to represent data and can control the recording mechanism to record the data, each setting of the switching means being capable of representing data of said one or said other significance, including control means which are settable to indicate the significance of the data which is set on the switching means, and including keys for controlling the setting of the control means, one of said keys controlling the setting of the control means when the data set on the switching means is of said one significance and other of said keys controlling the setting of the control means when the data set on the switching means is of said other significance; interlocking means between said first and said second entry means to lock said one key against operation when a card is inserted into the sensing means of the first entry means and to block the insertion of the card into the sensing means of the first entry means when said one key is operated in said second entry means, said interlocking means being rendered ineffective by the second entry means when the second entry means is operated under control of any of said other keys; means normally locking said other keys against operation; and means operable under control of said first entry means and under control of said second entry means to unlock said other keys when said first entry means operates or when said second entry means operates under control of said one key, said interlocking means and locking means enforcing the proper sequential operation of said first and said second entry means to insure that in the recording of each frame of information, data of said one significance always precedes data of said other significance.

7. In an apparatus for recording frames of information containing data of one significance followed by data of another significance, the combination of a tape-punching mechanism for punching frames of said data sequentially along a tape; a first entry means including sensing means for sensing cards having data of said one significance thereon and for controlling the punching mechanism to record this data; a second entry means including a plurality of switching means which are settable to represent data and can control the punching mechanism to punch the data, each setting of the switching means being capable of representing data of said one or said other significance, including control means which are settable to indicate the significance of the data which is set on the switching means, and including keys for controlling the setting of the control means, one of said keys controlling the setting of the control means when the data set on the switching means is of said one significance and other of said keys controlling the setting of the control means when the data set on the switching means is of said other significance; means for preventing an operation of said first entry means when said second entry means is operated under control of said one key; means in said second entry means for maintaining said preventing means operable until the second entry means is operated under control of one of said other keys; means for locking said one key when a card is in sensing position in said first entry means and when said first entry means has operated to sense a card; means in said second entry means for releasing the locking means for said one key in an operation of the second entry means under control of one of said other keys following an operation of said first entry means; means normally locking said other keys against operation; and means operable under control of said first entry means and under control of said second entry means to unlock said other keys when said first entry means operates or when said second entry means operates under control of said one key, said preventing means and locking means cooperating to enforce the proper sequential operation of said first and said second entry means to insure that data of said one significance always precedes data of said other significance in the recording of each frame of information.

References Cited in the file of this patent

UNITED STATES PATENTS

| | | |
|---|---|---|
| 2,343,414 | Johnson | Mar. 7, 1944 |
| 2,394,604 | Ford | Feb. 12, 1946 |
| 2,647,581 | Gardinor et al. | Aug. 4, 1953 |